US 6,935,111 B2
(10) Patent No.:
(45) Date of Patent: Aug. 30, 2005

(12) United States Patent
Dantlgraber

(54) DRIVE DEVICE, IN PARTICULAR FOR THE LOCKING UNIT, THE INJECTION UNIT OR THE EJECTOR OF AN INJECTION-MOULDING MACHINE FOR PLASTICS

(75) Inventor: Jörg Dantlgraber, Lohr am Main (DE)

(73) Assignee: Bosch Rexroth AG, Lohr am Main (DE)

( * ) Notice: Subject to any disclaimer, the term of this patent is extended or adjusted under 35 U.S.C. 154(b) by 265 days.

(21) Appl. No.: 10/276,965

(22) PCT Filed: Apr. 28, 2001

(86) PCT No.: PCT/EP01/04804

§ 371 (c)(1),
(2), (4) Date: May 15, 2003

(87) PCT Pub. No.: WO01/89801

PCT Pub. Date: Nov. 29, 2001

(65) Prior Publication Data

US 2004/0037915 A1 Feb. 26, 2004

(30) Foreign Application Priority Data

| May 23, 2000 | (DE) | ........................................ | 100 25 068 |
| Sep. 1, 2000 | (DE) | ........................................ | 100 42 986 |
| Dec. 13, 2000 | (DE) | ........................................ | 100 61 992 |
| Jan. 20, 2001 | (DE) | ........................................ | 101 02 602 |
| Mar. 10, 2001 | (DE) | ........................................ | 101 11 593 |
| Mar. 21, 2001 | (DE) | ........................................ | 101 13 808 |

(51) Int. Cl.$^7$ ................................................ F15B 7/00
(52) U.S. Cl. .......................................... 60/565; 60/545
(58) Field of Search .................................. 60/565, 545

(56) References Cited

U.S. PATENT DOCUMENTS

| 4,030,299 A | 6/1977 | Reuschel | |
| 5,261,810 A | * 11/1993 | Kamp et al. | ............. 425/451.9 |
| 5,345,766 A | * 9/1994 | Leonhartsberger et al. | ... 60/565 |
| 6,439,875 B1 | * 8/2002 | Morita et al. | ................ 425/556 |

FOREIGN PATENT DOCUMENTS

| DE | 4111594 | 10/1992 |
| EP | 0508277 | 10/1992 |
| WO | 9211993 | 7/1992 |

OTHER PUBLICATIONS

Patent Abstracts of Japan, vol. 11, No. 82, (M–571), Mar. 12, 1987, & JP 61 237617 (Meiki Co Ltd), Oct. 22, 1986.

(Continued)

*Primary Examiner*—Edward K. Look
*Assistant Examiner*—Michael Leslie
(74) *Attorney, Agent, or Firm*—Martin A. Farber

(57) ABSTRACT

A drive device which is used in particular for the closing unit, the injection unit or the ejectors of an injection molding machine for plastics and which has a drive element which can be moved axially by an electric motor, and a hydraulic unit which can be moved in the same direction as the drive element by moving the latter. In drive devices for the applications, it is important to first of all perform a rapid regulating movement and then exert high forces. In a known drive device having these features, the hydraulic unit is a hydraulic cylinder which is adjusted by the electric motor via a stroke spindle during the regulating movement and to which pressure medium is fed via a valve for exerting a high force. In this known drive device, in addition to the electrical installation, a complete hydraulic system is also necessary. In addition, high reaction forces act on the stroke spindle. This is avoided wherein the hydraulic unit is a power transmission means having two pistons, which are movable relative to one another and differ from one another in the size of their effective areas, and having an intermediate part which together with the pistons encloses a pressure space filled with a pressure fluid, if the small piston having the smaller effective area is mechanically connected to the drive element, if the hydraulic unit can be moved as an entity for the regulating movement, and if, for exerting a high force by the large piston having the larger effective area, the intermediate part can be locked against displacement relative to a fixed frame.

58 Claims, 33 Drawing Sheets

OTHER PUBLICATIONS

Figure 1:
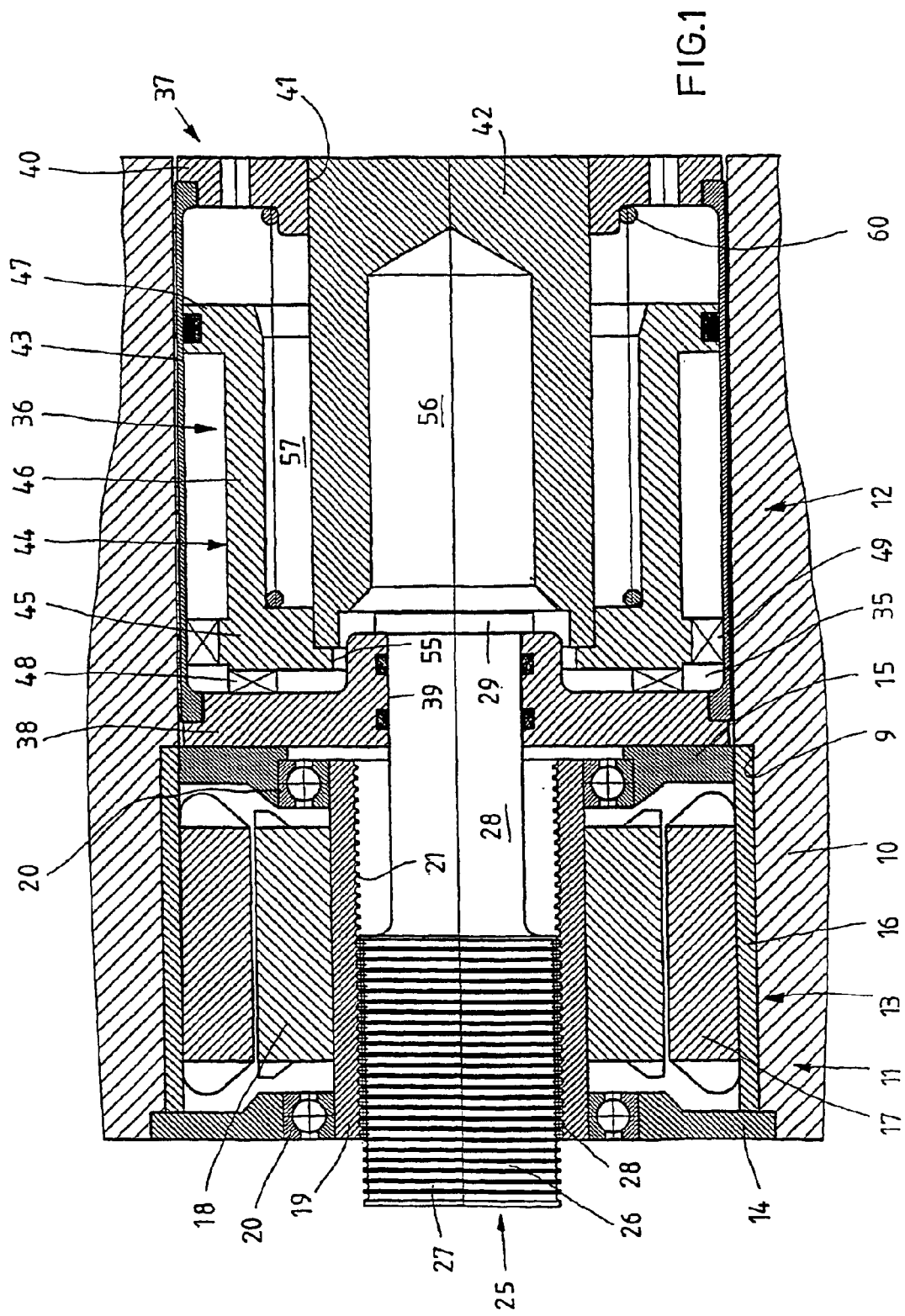

Patent Abstracts of Japan vol. 018, No. 636 (M–1715)Dec. 5, 1994– & JP 06 246806 A (Meiki Co. Ltd), Sep. 6, 1994.
Patent Abstracts of Japan vol. 2000, No. 15. Apr. 6, 2001– & JP 2000 334799 A (Mitsubishi Heavy Ind Ltd) Dec. 5, 2000.

* cited by examiner

DRIVE DEVICE, IN PARTICULAR FOR THE LOCKING UNIT, THE INJECTION UNIT OR THE EJECTOR OF AN INJECTION-MOULDING MACHINE FOR PLASTICS

The invention relates to a drive device which is to be used in particular for the closing unit or the injection unit or the injectors of an injection molding machine for plastics.

Inside the closing unit of an injection molding machine for plastics, the drive device moves the movable platen of the machine. Such a drive device has to fulfill two important different requirements. Firstly, it is to move the platen as quickly as possible for closing and opening the mold, so that the cycle time for the production of a molding can be kept short. Secondly, it is to be able to lock the platen and thus the entire mold against the high injection pressure with high force. On the one hand, therefore, regulating movements are to be performed at high speed; on the other hand, high forces are to be exerted without substantial movement. Such requirements, apart from at the closing unit, may also arise at the ejectors or the injection unit of an injection molding machine for plastics. For example, during the injection of plastic into the mold, the plasticizing screw is moved at relatively high speed in the direction of the mold until the mold is completely filled with plastic. If the plastic melt located in the mold is subsequently subjected to a "dwell pressure", the drive has to apply a high force without substantial movement of the plasticizing screw.

U.S. Pat. No. 4,030,299 discloses a purely hydraulic drive for the movable platen of an injection molding machine for plastics, this hydraulic drive also containing a hydraulic power transmission means. The latter has a movable piston of small effective area, a further movable piston of large effective area and a cylinder which together with the pistons encloses a pressure space filled with a pressure fluid. The cylinder is arranged in a fixed position on the frame of the injection molding machine. In addition, the drive includes hydraulic cylinders which move the movable platen for closing and opening the mold. In the opened state of the mold, the volume of the pressure space of the hydraulic power transmission means is minimal. If the movable platen is now moved by the hydraulic cylinders for closing the mold, the large piston of the hydraulic power transmission means is carried along, in the course of which the volume of the pressure space of the hydraulic power transmission means is increased and pressure medium flows from a reservoir via a contraction valve into the pressure space. The small piston of the hydraulic power transmission means is subsequently moved into the pressure space and thereby produces a high pressure which produces a high closing force via the large effective area of the large piston. The small piston is moved hydraulically by the feeding of pressure fluid. Thus, in the drive device according to U.S. Pat. No. 4,030,299, there are various hydraulic drive components for the regulating movement of the movable platen and for exerting a high force. During the regulating movements of the platen, a large amount of pressure fluid flows back and forth between the pressure space and the reservoir, a factor which makes correspondingly large valves and fluid passages necessary.

A drive device having the above-mentioned features has been disclosed by DE 41 11 594 A1. In this drive device, a hydraulic cylinder having a large effective area is firmly connected to the movable platen. The unit comprising movable platen and hydraulic cylinder can be moved by an electric motor via a drive mechanism, which comprises a stroke spindle and a spindle nut, in order to open and close the mold quickly. The high closing force is applied by the admission of pressure to the hydraulic cylinder movable with the platen. In the process, the entire reaction force is dissipated to the machine frame via the spindle and the spindle nut. The injection molding machine for plastics according to DE 41 11 594 A1, apart from being equipped with the components of the electric drive, is also equipped with a complete hydraulic system including oil reservoir, pump, valves and hydraulic cylinder.

SUMMARY OF THE INVENTION

The object of the invention is to develop a drive device of the above-mentioned type in such a way that a quick regulating movement is possible with little outlay on the one hand and a large force effect can also be achieved on the other hand.

The set object is achieved by the fact that, according to the invention, the drive device having the features above-mentioned also includes a hydraulic power transmission means is therefore used in whose pressure space, at least during the regulating movement and the subsequent exerting of a high force, a certain volume of a pressure fluid is trapped, if volumetric changes on account of a pressure change are disregarded. Other hydraulic components are in principle not required for a drive device according to the invention. According to the invention, the small piston of the hydraulic power transmission means is mechanically connected to the drive element, which can be moved axially by the electric motor. Furthermore, according to the invention, the hydraulic unit can be moved as an entity for the regulating movement of an element to be driven, as a result of which the speed of the large piston mechanically coupled to the element to be driven is equal to the high speed of the drive element axially moved by the electric motor. In order to be able to exert a high force, the intermediate part of the hydraulic power transmission means is locked against a displacement relative to a fixed frame, so that, by further movement of the small piston by a relatively small amount of travel, a high pressure can be built up in the pressure space of the power transmission means, and this high pressure produces a high force at the large effective area of the large piston. In this case, only a proportion of the force corresponding to the effective area of the small piston is to be absorbed via the drive element.

According to another feature of the invention in order to be able to move the hydraulic unit as an entity, there is preferably a coupling device with which the intermediate part and the large piston of the hydraulic unit, during the regulating movement, are coupled to one another in a fixed position.

According to another feature of the invention in an especially advantageous manner, the coupling device comprises a spring which is secured in position between the large piston and the intermediate part. When the hydraulic power transmission means comes into effect, said spring continues to be compressed for a short length of travel, so that no additional actuator is necessary for releasing the coupling between the large piston and the intermediate part of the power transmission means. In a configuration according to another feature of the invention the hydraulic unit, during the regulating movement, directly follows the small piston, since the spring does not first have to be loaded to a greater extent by a pressure build-up in the pressure space in order to be able to transmit the force required for the regulating movement. In a configuration according to another feature of the invention a short space-saving type of construction of the hydraulic unit is possible, since the space required axially for accommodating the spring can also be used in another way.

Other features of the invention relate to constructional configurations of the hydraulic power transmission means which are likewise advantageous especially with regard to a compact type of construction.

For good guidance of the large piston, it is advantageous if a large guidance length is available. This is achieved by the configuration according to another feature of the invention. In this case, the combination of the configurations according to other features of the invention is especially advantageous, in which combination the guidance section is also available for accommodating the spring of the coupling device.

The coupling by a spring constitutes a frictional connection between the intermediate part and the large piston, it being possible for this coupling to be released by applying a force which is above a limit force. However, it may also be favorable in certain cases if, according to another feature of the invention the intermediate part and the large piston are coupled to one another in a positive-locking manner by the coupling device, it then being possible for the coupling device to be released by an actuator.

According to another feature of the invention in order to be able to move the hydraulic unit as an entity, a coupling device may also be provided between the drive element which can be moved by the electric motor or between the small piston and the intermediate part of the hydraulic unit, this coupling device being released when a high force is to be exerted and to this end the small piston is to plunge further into the pressure space. The coupling device is preferably a clutch, so that, during the locking movement, the drive part is not additionally loaded by the force required for overcoming the friction of a friction clutch and high accelerations of the hydraulic unit are also possible. In such a construction, in principle no highly preloaded spring arranged between the large piston and the intermediate part is required for the sequence of movement. A spring preloaded to a small extent and arranged in such a way is advantageous, since this spring can produce a certain preloading pressure at a level of, for example, 5 bar in the pressure space and the latter can thereby be effectively vented.

In an especially preferred manner, however, a coupling device is provided between the drive element or the small piston, on the one hand, and the large piston of the hydraulic unit, on the other hand, with which coupling device the large piston and the small piston are coupled directly to one another in a fixed position for a regulating movement and which is released when a high force is to be exerted and to this end the small piston is to plunge further into the pressure space.

The intermediate part is advantageously carried along by the large piston via a spring during the regulating movement. Here, too, the coupling device is preferably a clutch, in particular an electromagnetic clutch. The latter preferably acts in the axial direction, that is to say in the direction of movement of the power transmission means.

Also the coupling device between the drive element or the small piston, on the one hand, and the intermediate part or the large piston, on the other hand, is preferably a hydraulic clutch. In this case, pressure fluid, during the regulating movement, is trapped in a space between the two parts coupled to one another. A displacement of pressure fluid from the space is allowed in order to be able to move the two parts relative to one another.

Furthermore the coupling device between the drive element or the small piston, on the one hand, and the intermediate part or the large piston, on the other hand, is an in particular hydraulic slip clutch, that is to say a clutch in which a movement can be transmitted via a trapped fluid volume up to a certain limit force. An advantage of such a clutch is its automatic mode of operation. Advantageous configurations of a hydraulic slip clutch can be found in patent claims 18 to 20.

A coupling device between the small piston and the large piston is preferably located in a cavity (clutch space) of the large piston, into which cavity the small piston extends. The effective area of the small piston for the power transmission may be located in a blind hole which is located on the other side of the cavity and from which there then has to be a fluidic connection to a space at a large effective area of the large piston, or, alternatively may be formed in a simple manner by a step of the small piston and be located in the pressure space in front of the cavity of the large piston.

As a further feature, the locking of the intermediate part of the hydraulic power transmission means relative to a fixed frame, this locking being provided for building up a high force, is preferably effected by friction grip, since the intermediate part can then be locked at any desired point without special provisions and no setting work is required when changing the mold and during an accompanying change in the closing travel. For producing the friction grip, pressure is applied hydraulically to one of the two friction-grip partners. This pressure may be the pressure prevailing in the pressure space between the two pistons, in which case there then has to be a fluidic connection between the pressure space and an admission space at the friction-grip partner. In this case, the clamping force is therefore applied by the electric motor, so that no further actuator is necessary. However, the intermediate part must initially be held in a fixed position until a pressure-required for the clamping has built up in the pressure space. This may be effected by the spring secured in place between the large piston and the intermediate part if it is preloaded to an appropriately high degree.

However, the pressure in the pressure space and thus also a friction grip only build up when the machine component to be moved has been moved up to a stop. If, a pressure can be built up in the admission space at the one friction-grip partner by feeding external pressure medium, that is to say pressure medium from a hydraulic circuit provided for producing the friction grip, the intermediate part can be locked at any point irrespective of the position of the machine component. This is especially favorable for the production of moldings by "injection-compression molding", in which a molding is first of all injection-molded with the mold halves not completely closed and is then compressed by closing the mold halves. If provision is made for applying pressure to the one friction-grip partner by feeding external pressure medium, this friction-grip partner is preferably arranged in an axially fixed position on the machine frame, so that, when the individual hydraulic components of the hydraulic circuit are fastened to the frame, pressure medium does not have to flow back and forth, for example, via a flexible hose between the hydraulic unit and the hydraulic components. The fastening of the hydraulic components to the frame instead of a fastening to the hydraulic unit has the advantage that the mass to be accelerated and braked and thus the energy input are lower.

In an especially advantageous manner, the friction grip is made possible by the intermediate part of the hydraulic unit having a tube section which can be elastically extended radially outward by internal pressure for producing a friction grip between the intermediate part and a wall of the bore of the fixed machine frame. This elastically extensible tube section may even be guided with slight play in the bore. As a low internal pressure, it can easily be displaced in the bore; at a high pressure, it becomes clamped and can transmit axial forces. To transmit such an axial force, a relatively large wall thickness is necessary, as a result of which a high pressure is necessary for deformation on the one hand and high stress occurs in the tube section on the other hand. It therefore appears to be especially favorable if individual, radially movable brake rods are arranged around a thin, elastically extensible tube section, these brake rods lying axially with slight play between stops of the intermediate part. The brake rods may be provided with a brake lining on the outer surface. If internal pressure is now applied to the tube section, it deforms and presses the brake rods against the wall of the bore. Due to a high axial rigidity of the brake rods, high axial forces can already be transmitted at a low deformation pressure.

The configuration according to another feature appears to be especially advantageous, according to which the intermediate part has a dimensionally stable inner tube section, in which the large piston is guided in a sealed-off manner, and an outer tube section which surrounds the inner tube section while forming a clearance space, pressure can be applied to the clearance space, and the outer tube section can he elastically extended radially outward by pressure applied in the clearance space. In this case, compared with a construction according to which that tube section of the intermediate part which guides the large piston is extensible, three different things are achieved. Firstly, the clamping radius and thus also the clamping force can be predetermined independently of the diameter of the large piston. Secondly, the clamping surface does not depend on the relative position of intermediate part and large piston. In addition, the sealing of the pressure space between large piston and intermediate part is not affected.

In a construction according to another feature the outer, extensible tube section may be very thin without it giving way to the inside when its outer side is being machined, a factor which would entail inaccuracies in the external size of the hydraulic unit.

At high closing forces of, for example, 1000 kN, the production of a friction grip between the intermediate part of the hydraulic unit and the frame with interlocking sheet metal stacks at the intermediate part and at the frame, which sheet metal stacks can be compressed by an external force, appears to ensure especially high operability of the drive device.

Also, the locking of the intermediate part is possible by wedges.

The intermediate part can also be locked hydraulically. Accordingly, the intermediate part can be locked relative to the fixed frame by trapping a pressure fluid volume located in a second pressure space. The volume of the pressure space changes when the intermediate part is moved. The pressure space can be connected to a supply reservoir for the pressure fluid and can be shut off from the supply reservoir by a valve arrangement. The pressure space is arranged in a simple manner in which case a cross section of similar size to the cross section of the first pressure space can readily be obtained, so that the pressure in the second pressure space is in each case approximately as high as the pressure in the first pressure space.

Finally, it is also possible, to lock the intermediate part by positive locking with the fixed frame. Such positive locking may be advantageously configured.

If the intermediate part is locked by the radial engagement of locking elements, a plurality of locking elements distributed around the periphery are advantageous, which each have to be moved radially and for which axial adjustability is advantageous. Overall, therefore, the mechanical outlay is relatively high. Locking of the intermediate part by an axial stop which can be moved in accordance with the regulating movement of the intermediate part appears to be more favorable. In this case, the force chain for axially supporting the intermediate part comprises a self-locking screw spindle. It is possible for the stop to be capable of being moved by the same electric motor with which the drive element can also be moved or, alternatively to allow the stop to be moved by a second electric motor. The stop can be moved axially after and ahead of the intermediate part in its direction of movement via a force chain in which the self-locking screw drive is located. During the regulating movement, there is advantageously a slight distance of up to five tenths of a mm between the stop and the intermediate part, so that the stop is freely movable and the screw drive is scarcely loaded and, on the other hand, the intermediate part can be immediately supported without substantial travel to the rear. The stop may also be formed by a rotationally drivable part of the screw drive, this part mashing directly with a section, provided with a thread, of the intermediate part. Here, the screw drive may be provided with appropriate play, so that it is still subjected to low loading during the regulating movement.

In order to prevent excessive heating of the pressure fluid, cooling passages in which water flows may lead through the hydraulic unit and in particular the pressure space.

The electric motor for moving the drive element may be an electric linear motor, so that a screw spindle and a spindle nut for converting the rotational movement of the rotor of an electric motor into a linear movement are not necessary.

An especially preferred construction provides that the small piston of the hydraulic unit is formed as a hollow piston, and the screw spindle of a screw drive serving to move the small piston, which screw spindle can be rotationally driven by the electric motor and is arranged in an axially fixed position, is accommodated by the hollow small piston. The small piston comprises a spindle nut which is in engagement with the screw spindle over the entire stroke and is locked against rotation. In this embodiment, the space which is required by the hydraulic unit in the direction of movement can also be used for the screw spindle, so that a drive device of especially short construction can be realized.

In principle, it is conceivable to keep the small piston closed on one side, in which case an end area on an end part of the small piston, this end part possibly being stepped in cross section relative to the rest of the small piston, or also an annular area on an outer step of the small piston may be the effective area. In this case, the small piston would also plunge into the large piston, formed as a hollow piston, in order to be able to accommodate as long a piece of the screw spindle as possible. However, the large piston is preferably formed as a hollow piston, and the small piston is preferably hollow throughout and is preferably formed as a stepped piston with a section of larger outside diameter, with which it enters the pressure space in a sealed-off manner, and with a section of smaller outside diameter, with which it enters the hollow large piston. The differential area between the two sections is the smaller effective area. The small piston may now be relatively short. Provided the screw spindle projects beyond the small piston, it is accommodated by the large piston.

In a construction of the small piston as a stepped piston which surrounds the screw spindle and is assembled with the spindle nut, the construction can be very complicated and the assembly difficult. In contrast, in the especially expedient configuration the small piston is formed by a plurality of little pistons which are arranged outside the axis of the hydraulic unit, are supported axially on the spindle nut and plunge into holes of the cylinder base. Guidance of the little pistons in the cylinder base free of jamming is permitted owing to the fact that the little pistons are only supported axially on the spindle nut. The pressure space can be sealed off independently of the spindle nut if the large piston plunges with an annular section between two axial walls of the cylinder of the hydraulic unit. For a short type of construction, the spindle nut plunges into the central passage of the cylinder base.

The temperature of the pressure fluid located in the pressure space depends on the operating period, the cycle times and the ambient temperature. In order to compensate for a volumetric change accompanying a temperature change, the pressure space of the hydraulic unit can be connected to a hydraulic accumulator. During the build-up of a high pressure in the pressure space, it is not to be possible for any pressure fluid to be displaced into the hydraulic accumulator, since otherwise large travel of the small piston would be necessary. In order to avoid this, the hydraulic accumulator, can be formed in such a way that its maximum capacity is already reached at a low pressure within the range of, for example, 5 to 10 bar. However, it is also conceivable for a valve to be arranged in the fluid connection between the hydraulic accumulator and the pressure space, with which valve the fluid connection can be shut off. The valve may be operated as a function of the pressure in the pressure space or as a function of the position of the hydraulic unit, possibly together with an electromagnetically actuable clutch.

An especially short type of construction of a drive device according to the invention is obtained by the large piston being formed as a diaphragm piston with a diaphragm. The diaphragm is advantageously of elastic construction and at the same time constitutes the coupling device with which the intermediate part and the large piston are coupled to one another in a fixed position for the regulating movement.

The diaphragm is preferably fastened at its outer margin to the intermediate part of the hydraulic unit and is provided centrally for fastening to the part to be moved. No sliding movement takes place between piston and intermediate part. The pressure space can be sealed off to the outside especially effectively. In this case, an especially effective seal is obtained by a further configuration in which no parts are moved relative to one another at the sealing points. A type of bellows is used for the sealing, provision being made to ensure that the bellows does not migrate into any gap and that it is not damaged and ultimately destroyed as a result.

Sometimes a force which is of similar magnitude to the locking force is required for opening the mold on an injection molding machine for plastics. In the case of such a requirement, the power transmission means of a drive device according to the invention is advantageously constructed so as to be double-acting, in which case at least the large piston is constructed so as to be double-acting. Two different small pistons may be used. In principle, however, one small piston is sufficient, this small piston, the large piston and the intermediate part together enclosing two closed pressure spaces which are separate from one another, are filled with a pressure fluid and are located on opposite sides of the pistons. In quite general terms, not only may travel be executed very quickly in opposite directions but a high force may also be exerted with such a drive device.

A cycle, for example, may appear as follows: travel rapidly in the one direction, lock in the same direction, travel rapidly in the opposite direction, lock in the opposite direction.

In principle, it is possible to form the two pistons as differential pistons, in which case, depending on which piston areas define a pressure space, power transmission ratios which are quite different in the two opposite directions may be obtained. However, the two pistons are preferably synchronous pistons, so that the same ratios prevail in the opposite directions.

Advantageous configurations of a double-acting drive device according to the invention are also disclosed.

So that the screw spindle does not perform any wobbling movement with its one end, it is expediently rotatably mounted at the end. However, if the screw spindle is axially fixed and the bearing part is the large piston which moves relative to the screw spindle, the axial misalignment between screw spindle and bearing part may change during a working cycle, so that, in the case of a radially fixed bearing, the screw spindle would be subjected to high alternating bending forces and could become sluggish. Provision is therefore made for the one end of the screw spindle to be mounted in a radial bearing which, if a radial force exceeds a limit force, is radially adjustable relative to a guide bush serving for the longitudinal guidance of the screw spindle.

A drive device according to the invention for closing and opening the mold on an injection molding machine for plastics is advantageously combined with a drive device for actuating an ejector or a plurality of ejectors.

If the coupling device between the small piston and the one other part of the power transmission means functions hydraulically, it is favorable if the clutch space, for the regulating movement, can be connected to a charged high-pressure accumulator. The pressure fluid in the clutch space, without movement of the small piston, can then already be prestressed to such a pressure that the other part directly follows the movement of the small piston. The clutch space, after the end of a regulating movement, is advantageously connected to a low-pressure accumulator, that is to say a hydraulic accumulator with low pressure, so that, during the effectiveness of the power transmission, no additional work has to be performed for the displacement of pressure fluid into the high-pressure accumulator. If the clutch space, during a working cycle, is alternately connected to the high-pressure accumulator and to the low-pressure accumulator or to a space relieved toward the low-pressure accumulator during a period of a working cycle, in each case a small quantity of pressure fluid, on account of the compressibility of the pressure fluid, passes from the high-pressure accumulator into the low-pressure accumulator. In principle, it is possible to pump this quantity back into the high-pressure accumulator again by a small hydraulic pump with separate drive motor and in this way keep the pressures in the hydraulic accumulators at the desired level. The outlay would probably be lower if the small piston has a pump piston section which adjoins a displacement chamber and by the reciprocal movement of which pressure medium can be drawn from the low-pressure accumulator into the displacement chamber and can be displaced from the displacement chamber into the high-pressure accumulator. The pressure medium is drawn in and displaced in an especially simple manner in each case via a check valve, as is usually the case in piston pumps. In this case, it certainly appears possible for the pressure fluid quantity delivered by the pump piston section to correspond exactly to the quantity entrained into the low-pressure accumulator from the high-pressure accumulator on account of the compressibility, but this is difficult to realize. Therefore, the delivered quantity is made slightly larger than the entrained quantity and, a spill valve is arranged between the high-pressure accumulator and the low-pressure accumulator, this spill valve opening if the pressure difference between the two hydraulic accumulators exceeds a certain magnitude.

If the power transmission means is constructed so as to be double-acting, the configuration appears especially advantageous. The first piston section is not carried along during the pressure build-up in the one direction, so that the first small pressure chamber is not further enlarged in its volume and no vacuum arises therein even without special measures. The second small pressure chamber does not adjoin the first piston section of the small piston, so that the movement of the first piston section away from the stop does not contribute to the change in the volume of the second small pressure chamber, but rather its volumetric change is determined solely by the effective area of the second piston section and remains small if the effective area is correspondingly small.

By the spring which is present according to another feature of the invention a slip clutch between the two piston sections of the small piston or between the drive element and the first piston section in the one direction is created in a simple manner.

DETAILED DESCRIPTION OF THE DRAWINGS

Figure 1A:
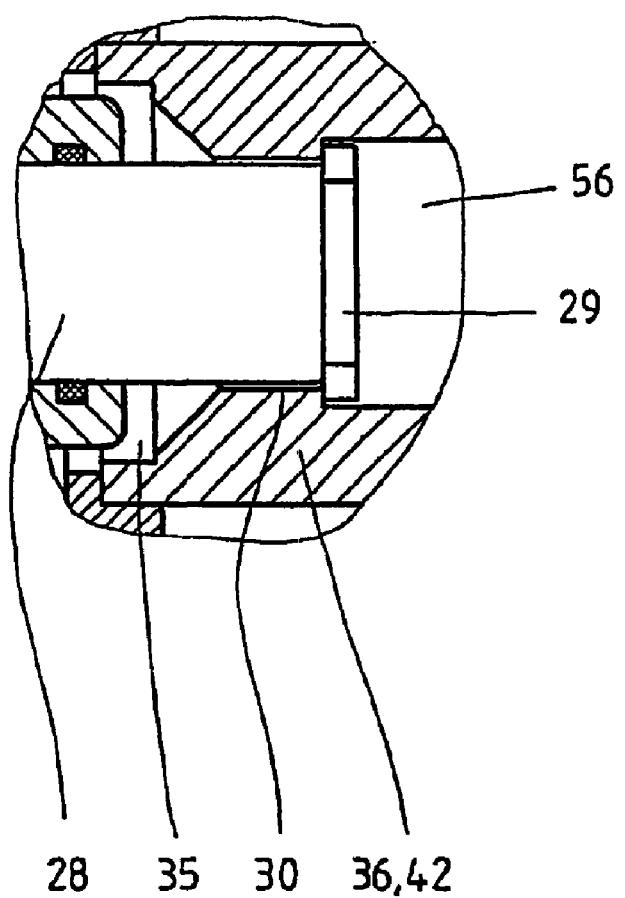
Figure 2:
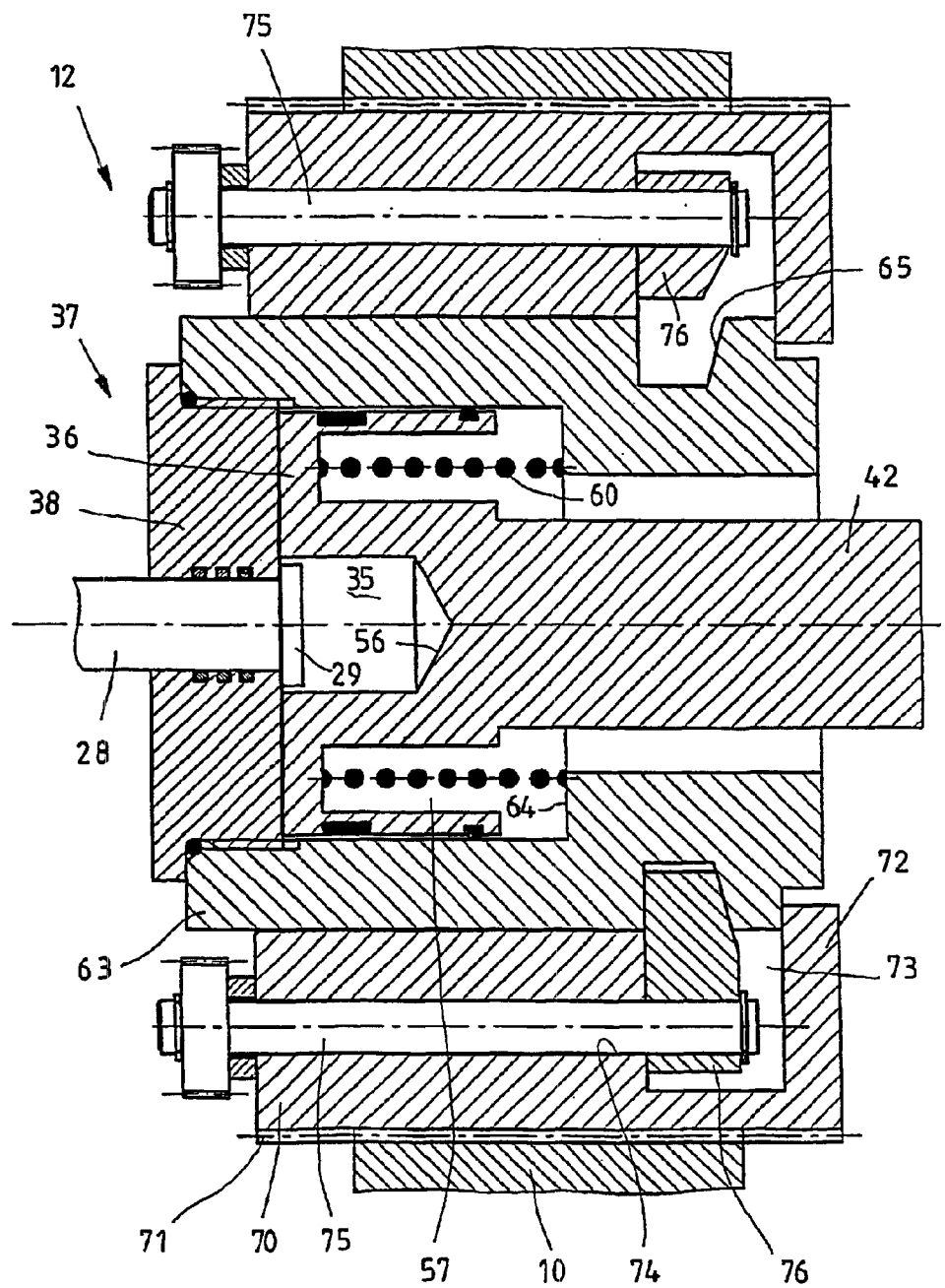
Figure 3:
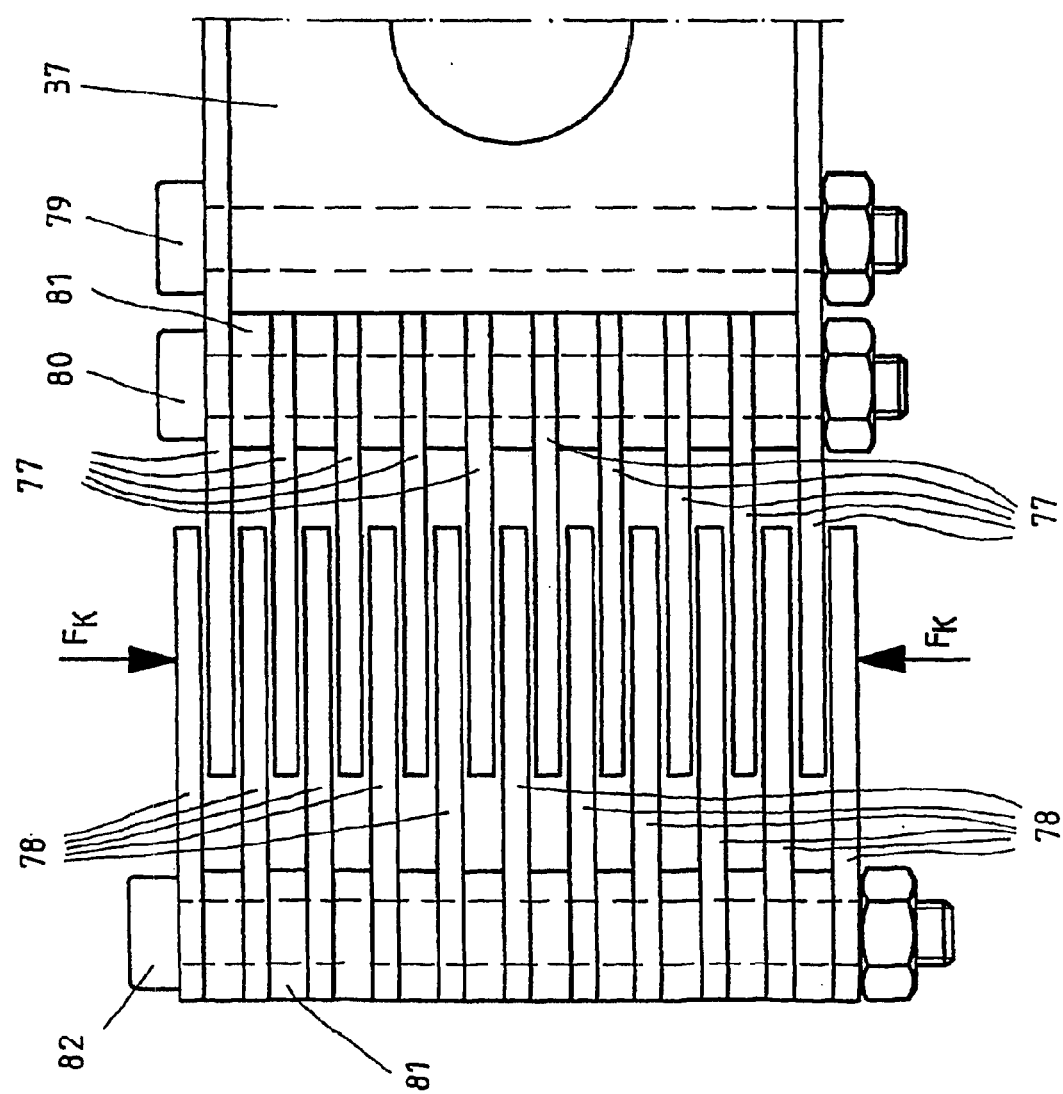
Figure 4:
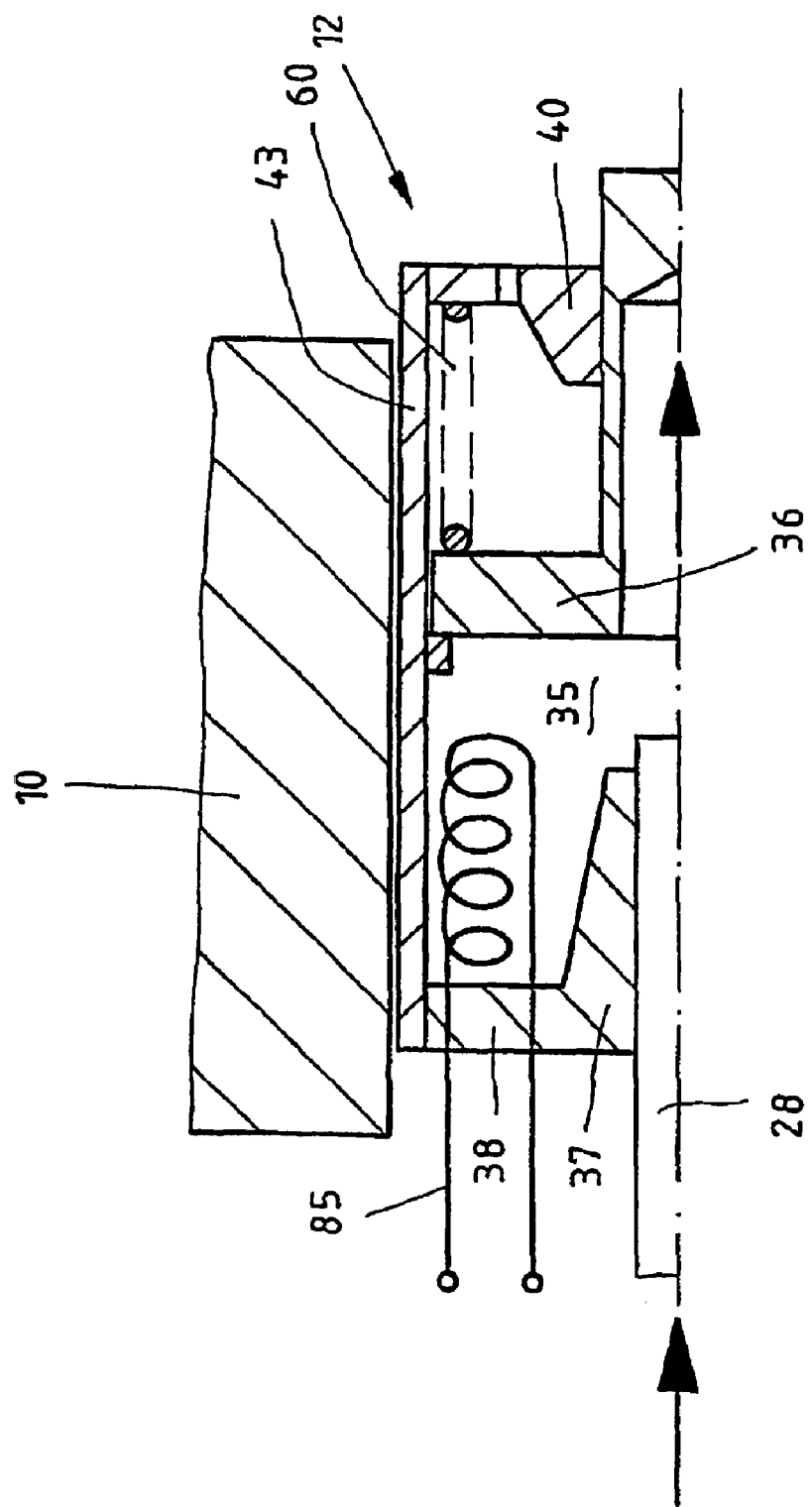
Figure 5:
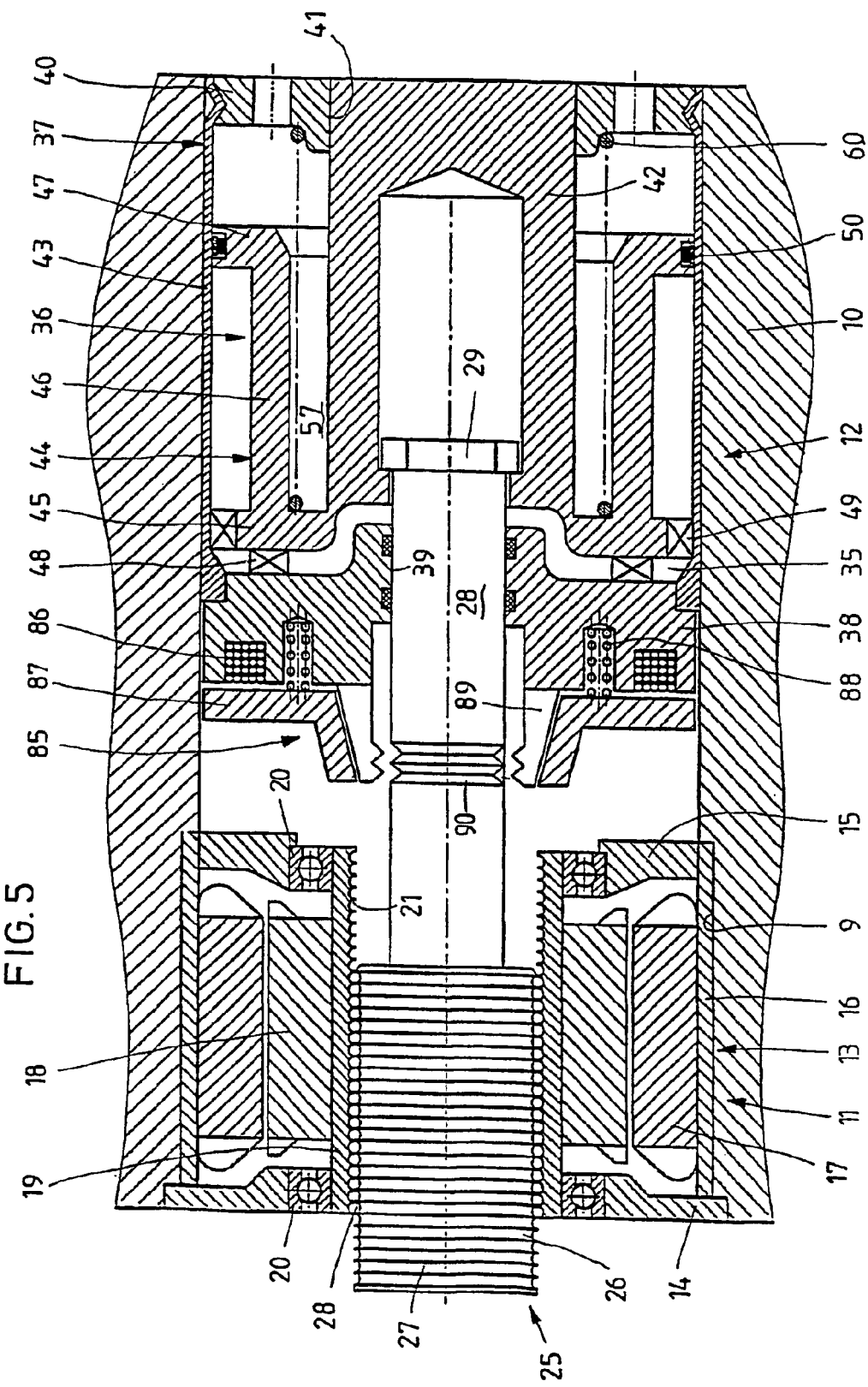
Figure 6:
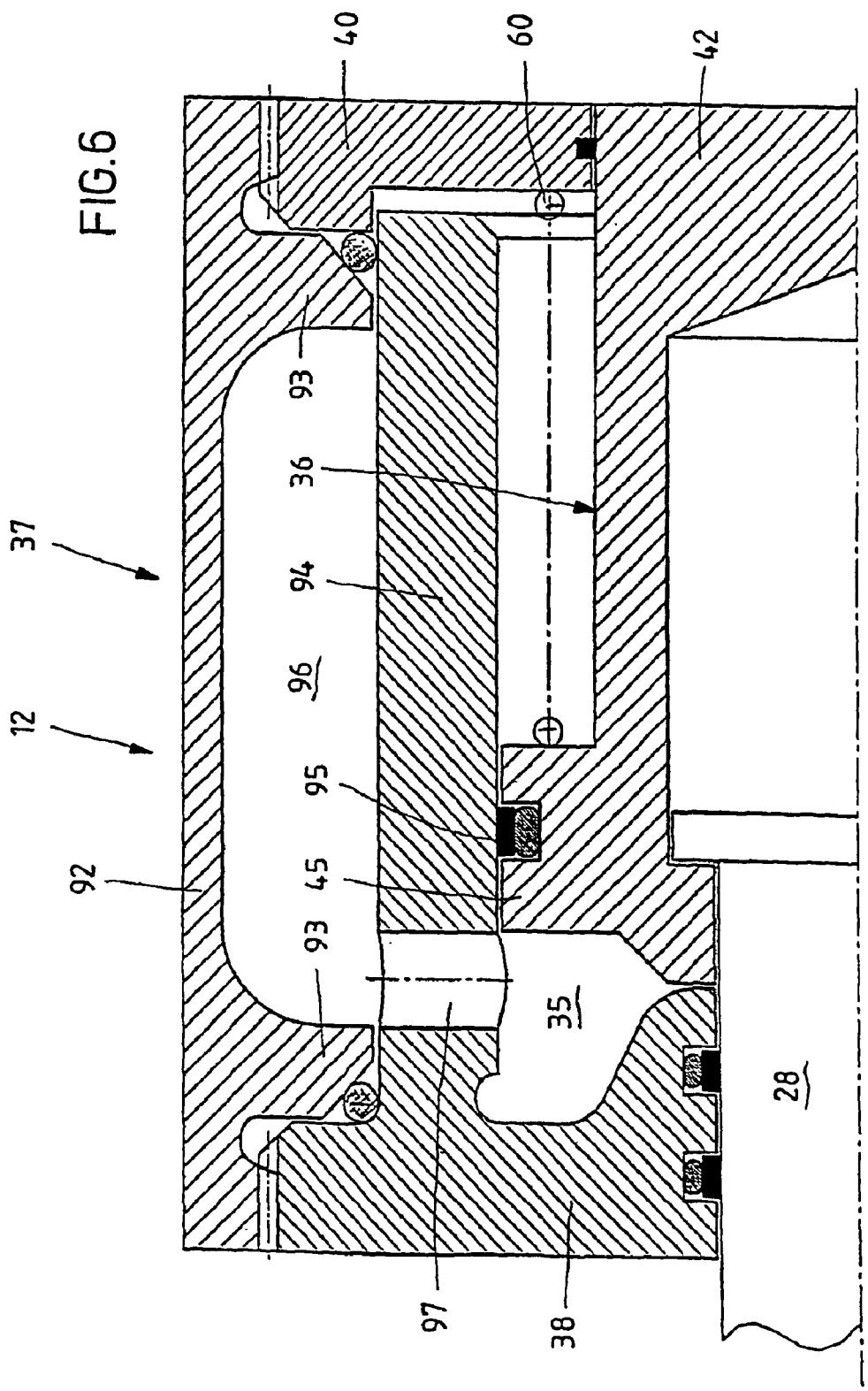
Figure 7:
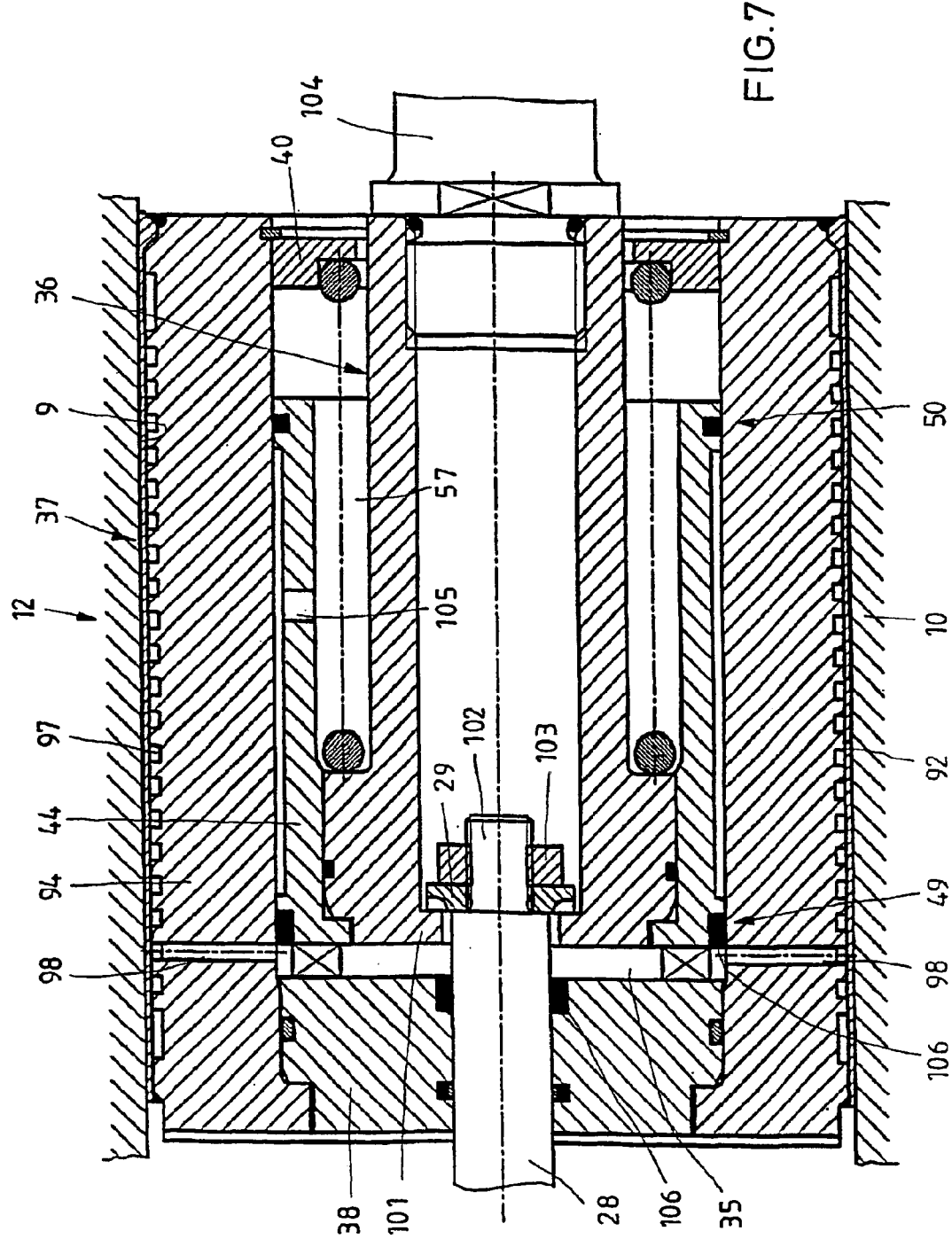
Figure 8:
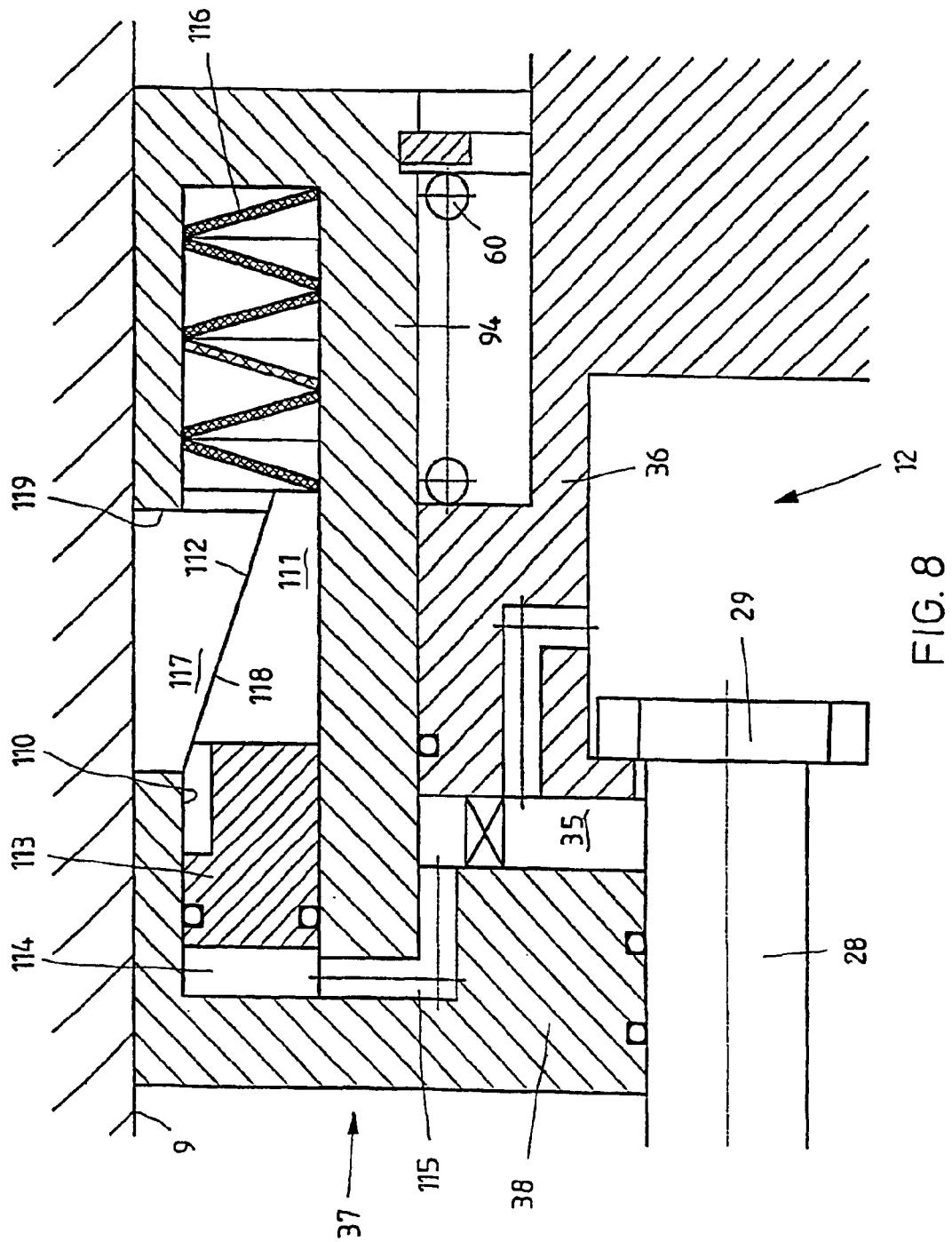
Figure 9:
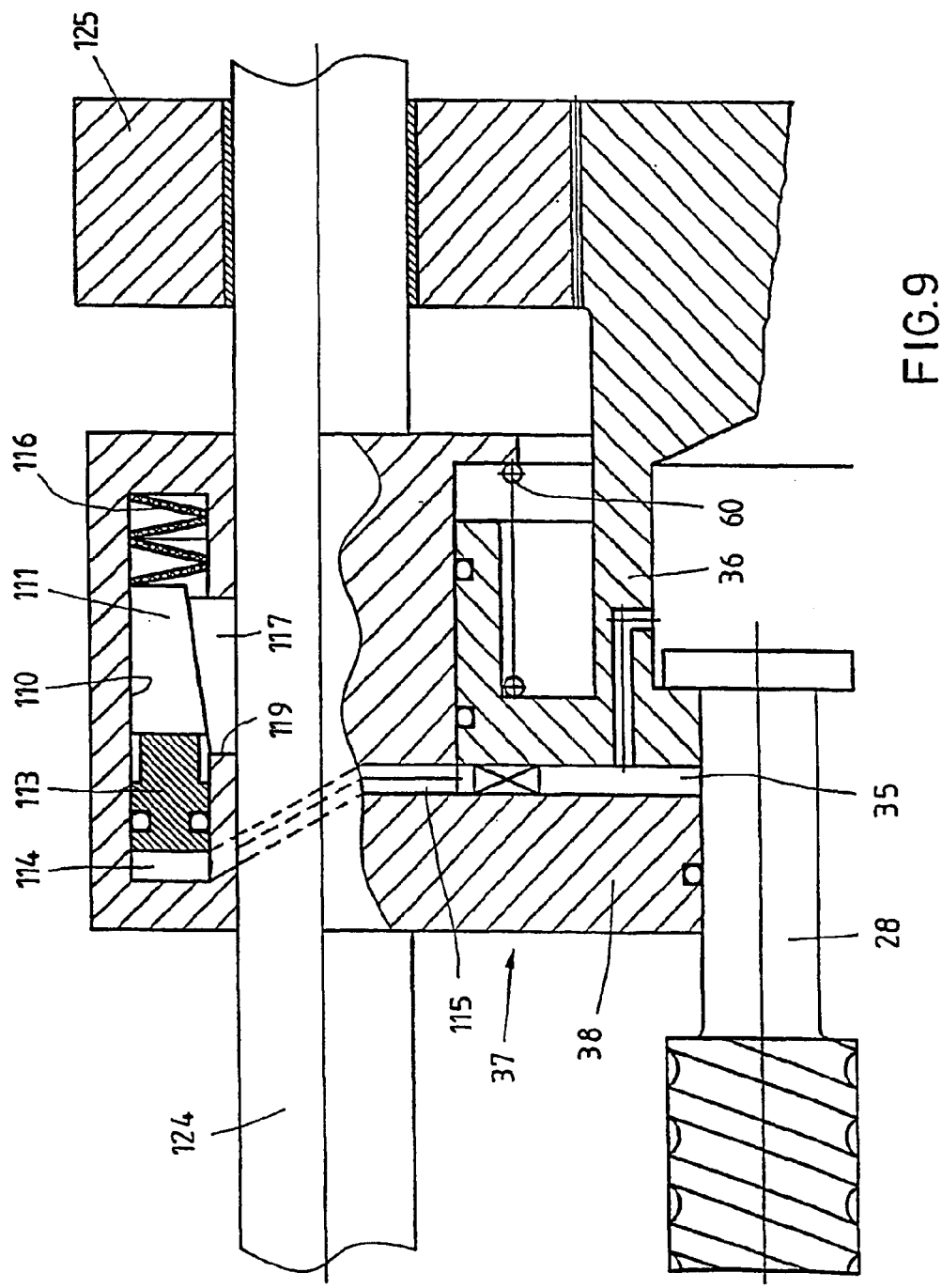
Figure 10:
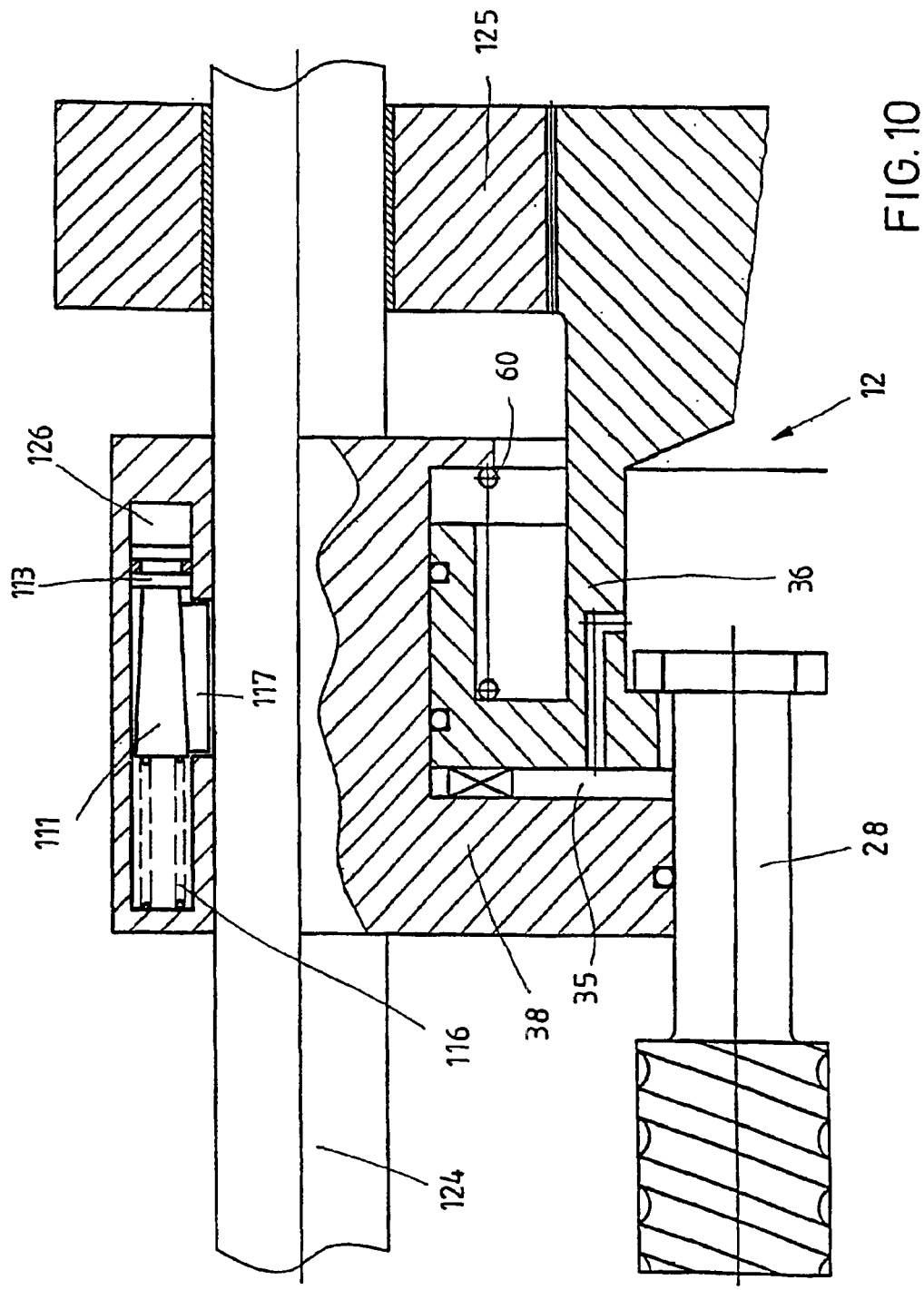
Figure 11:
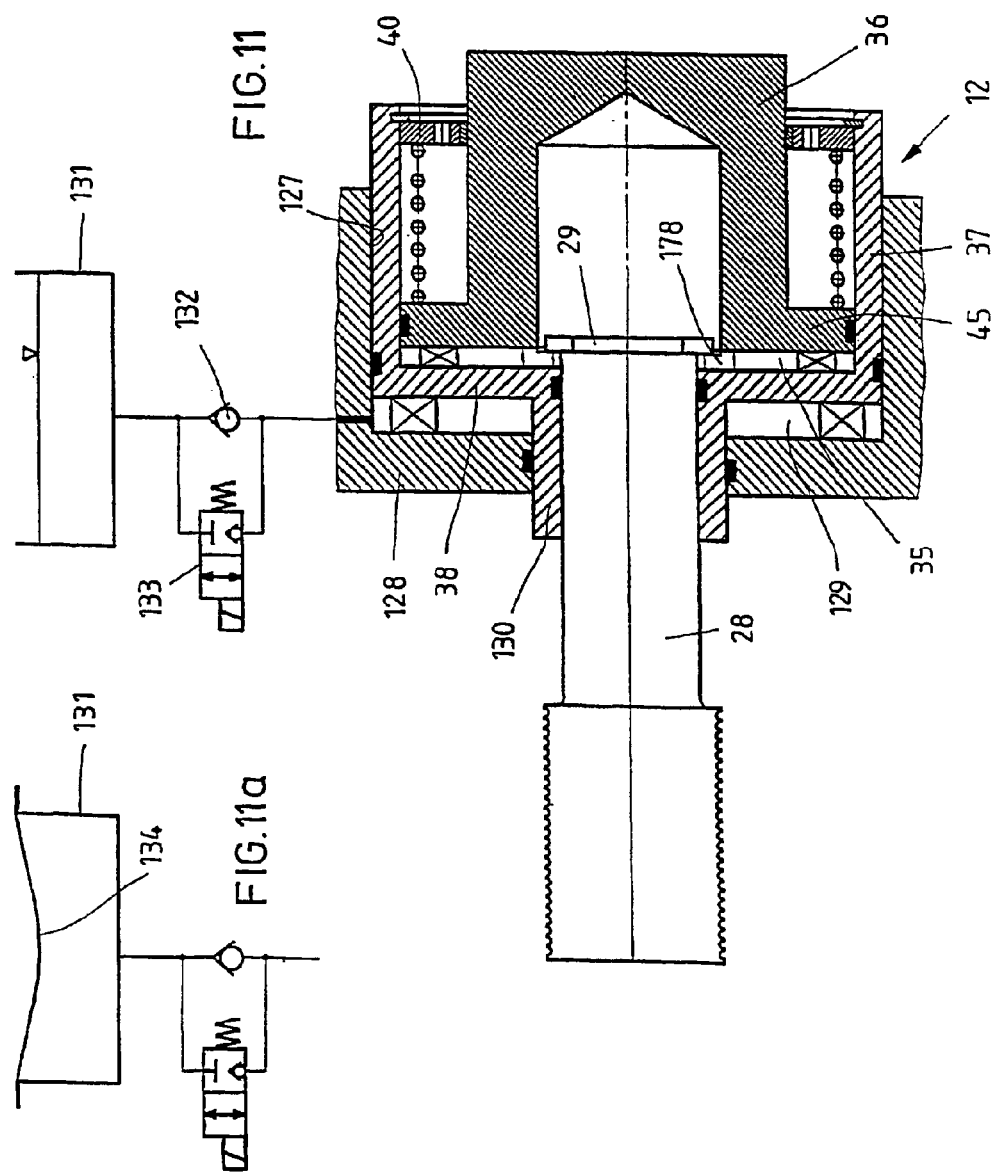
Figure 12:
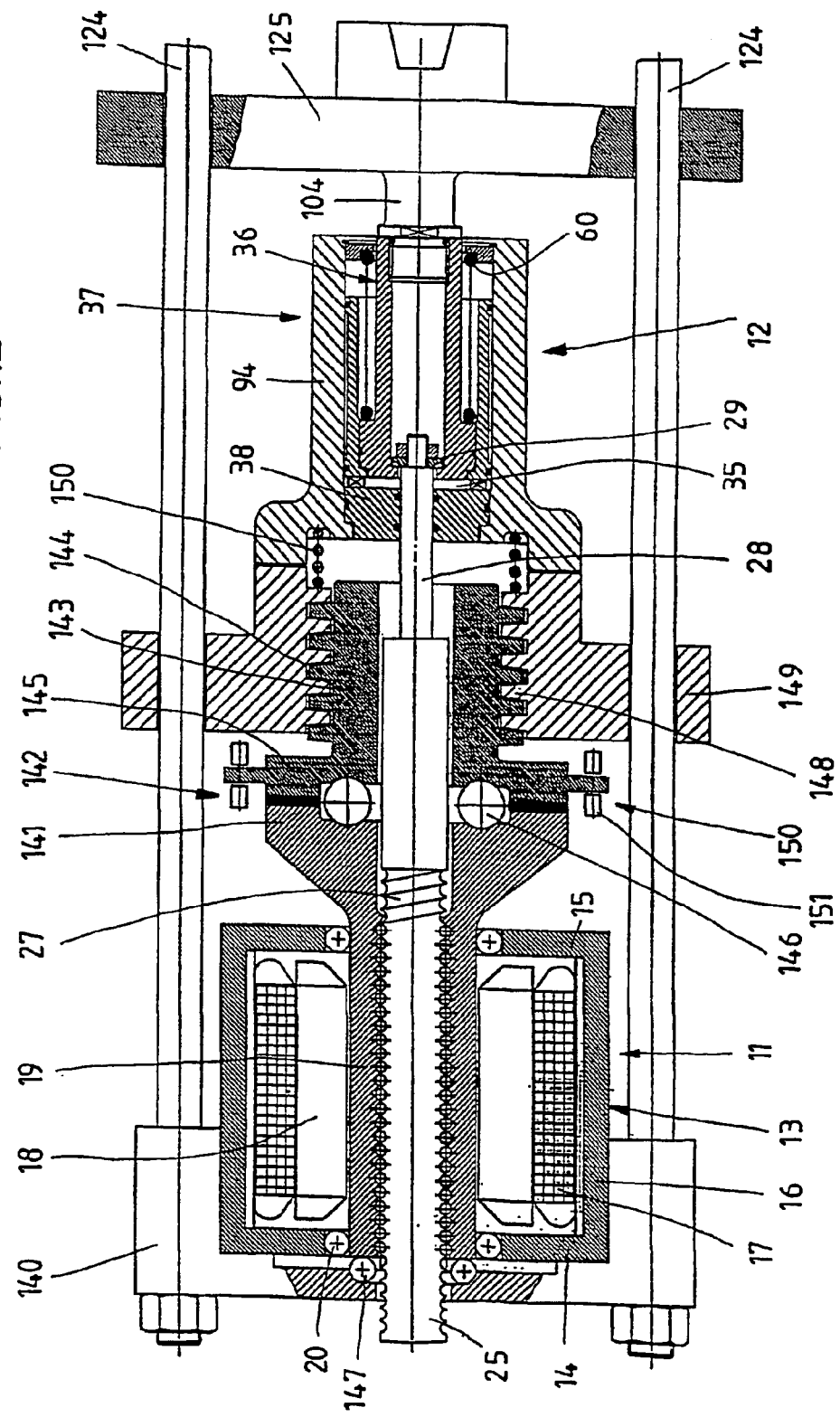
Figure 13:
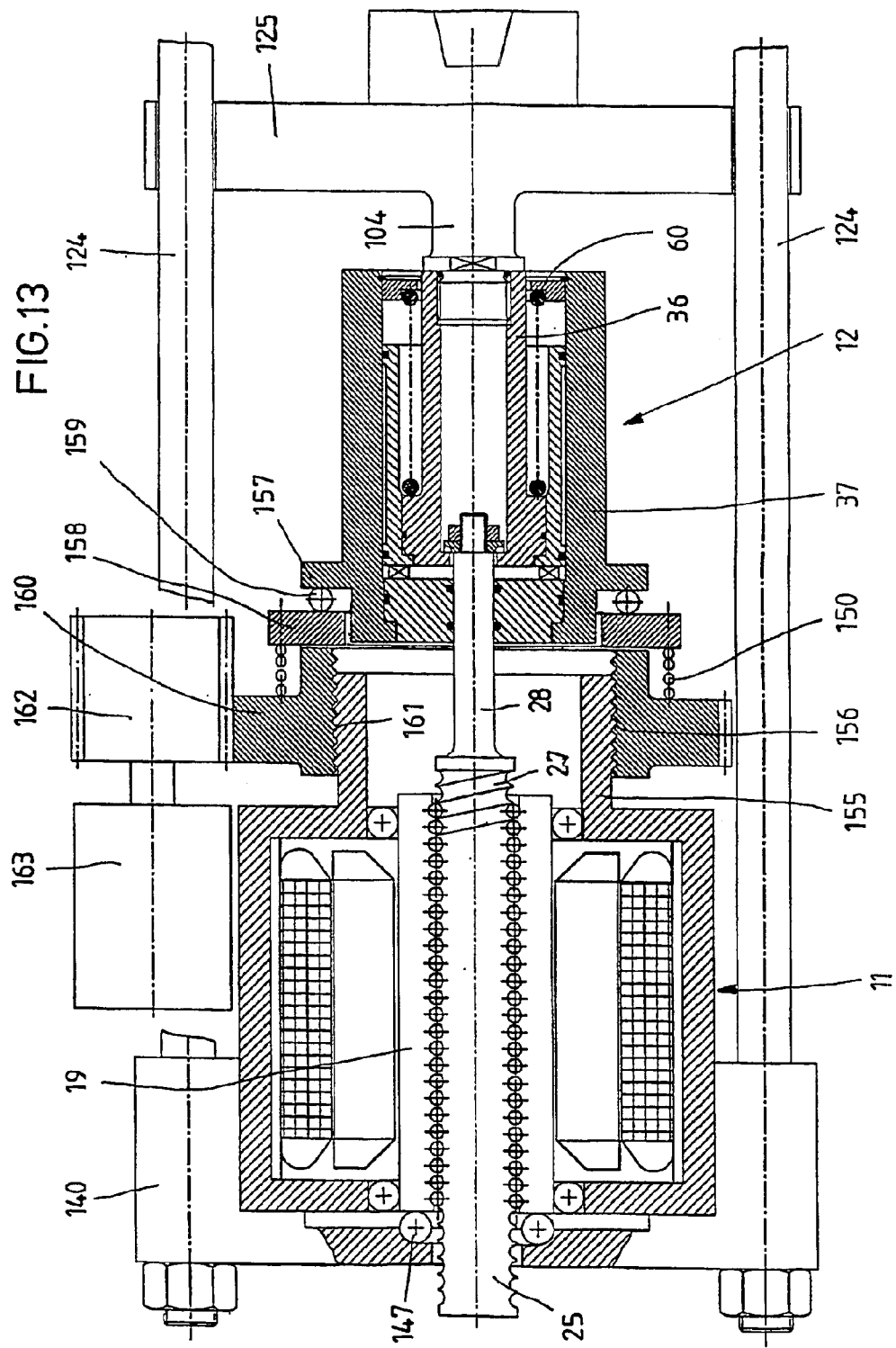
Figure 14:
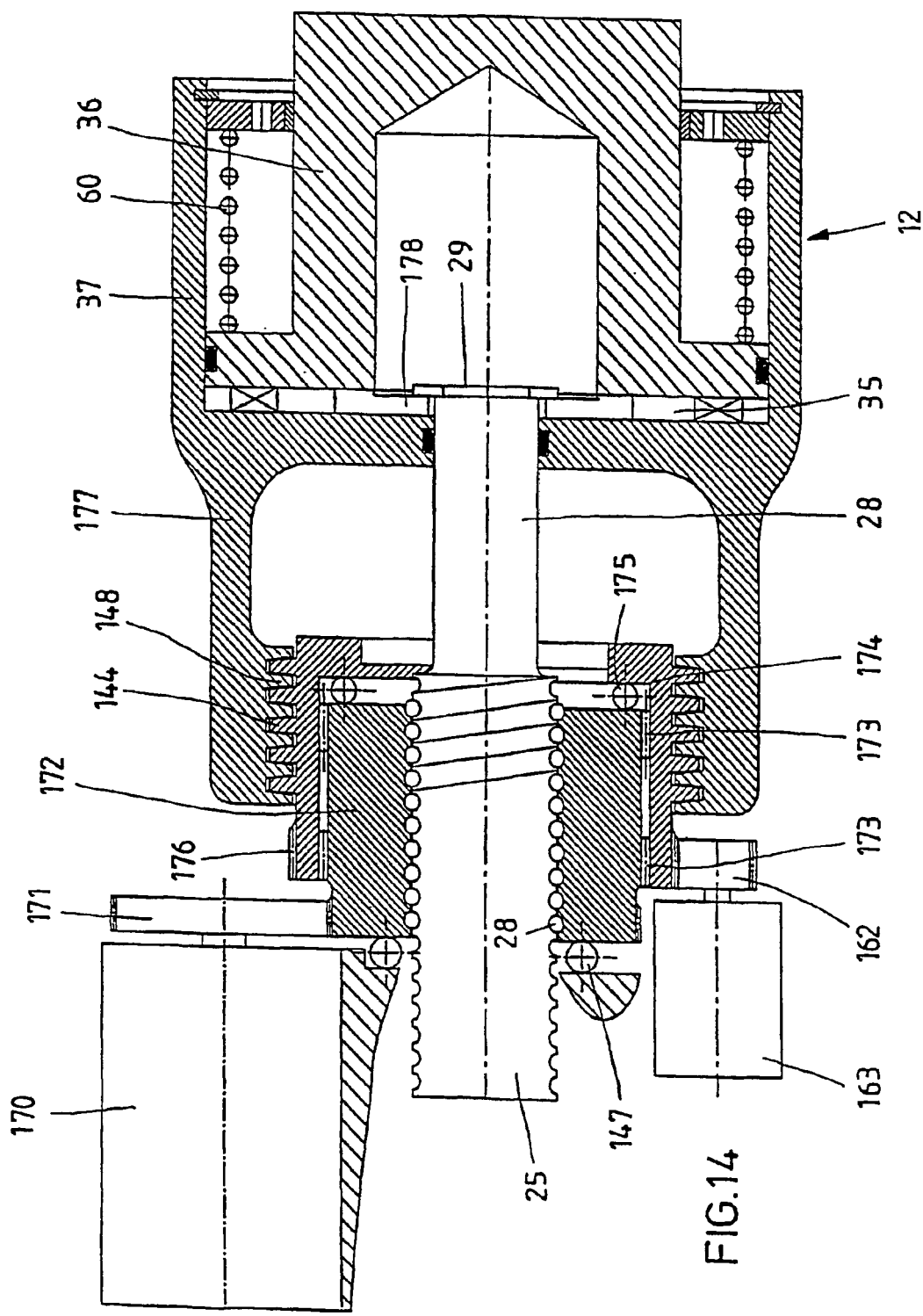
Figure 15:
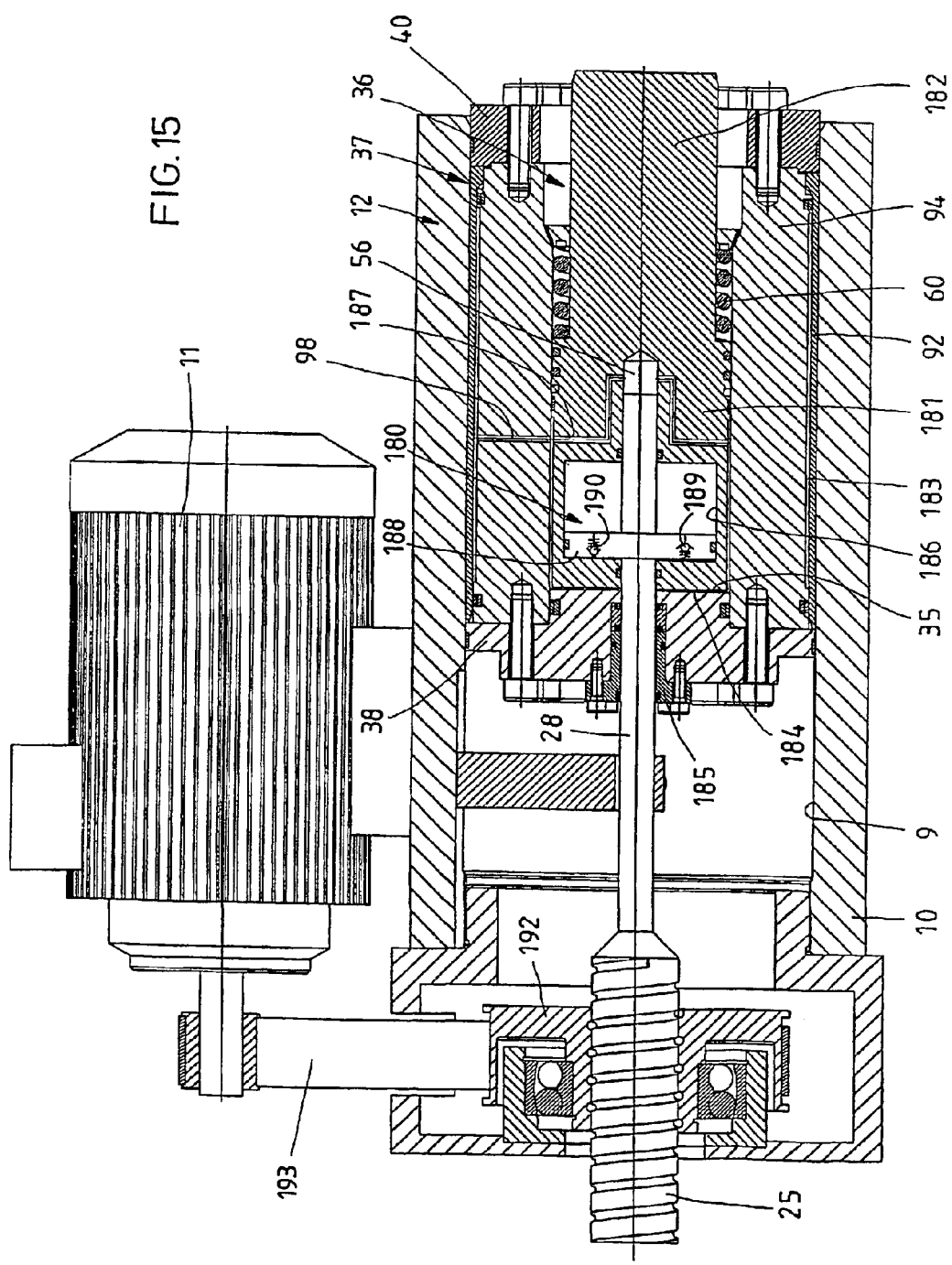
Figure 16:
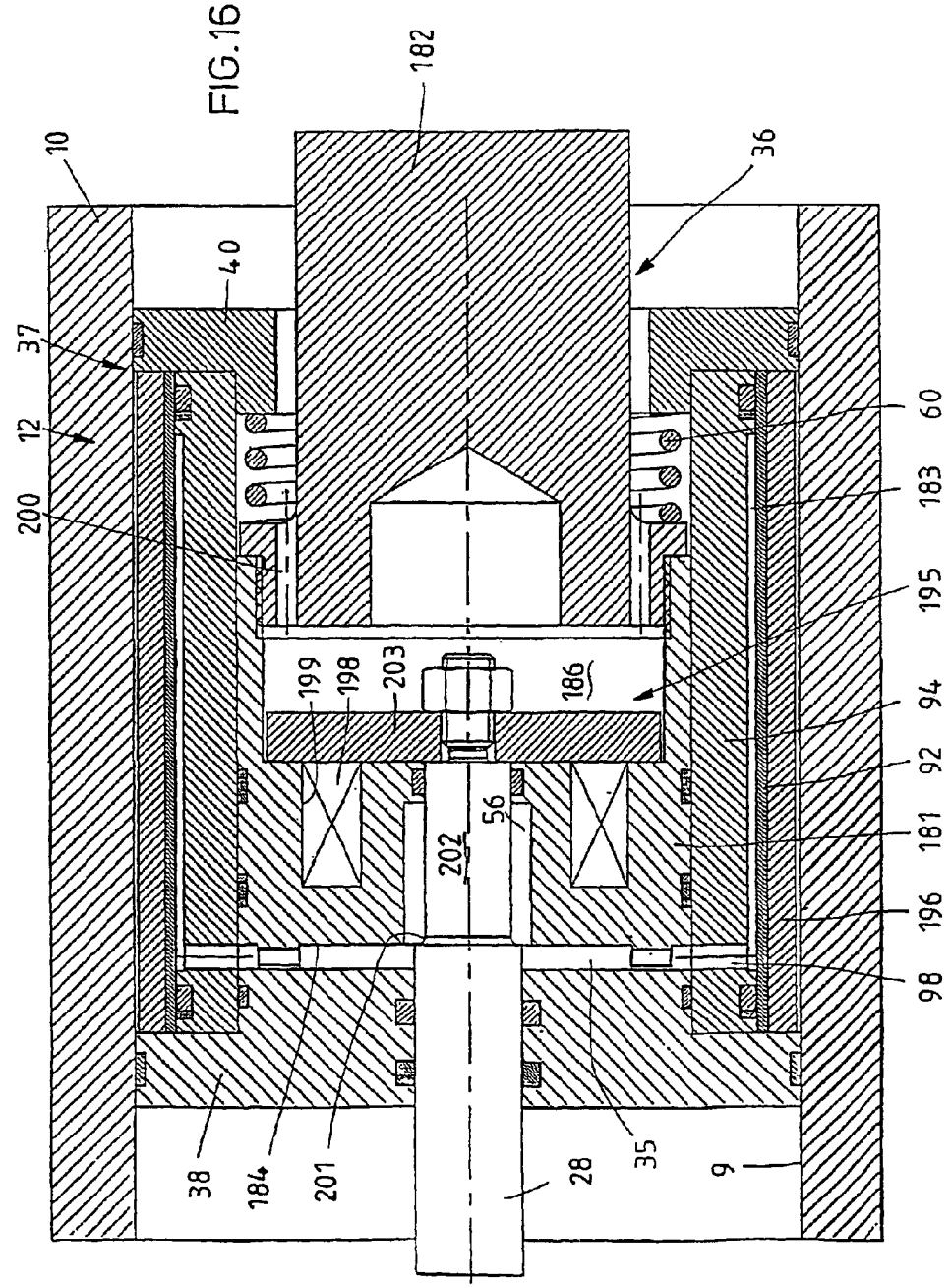
Figure 17:
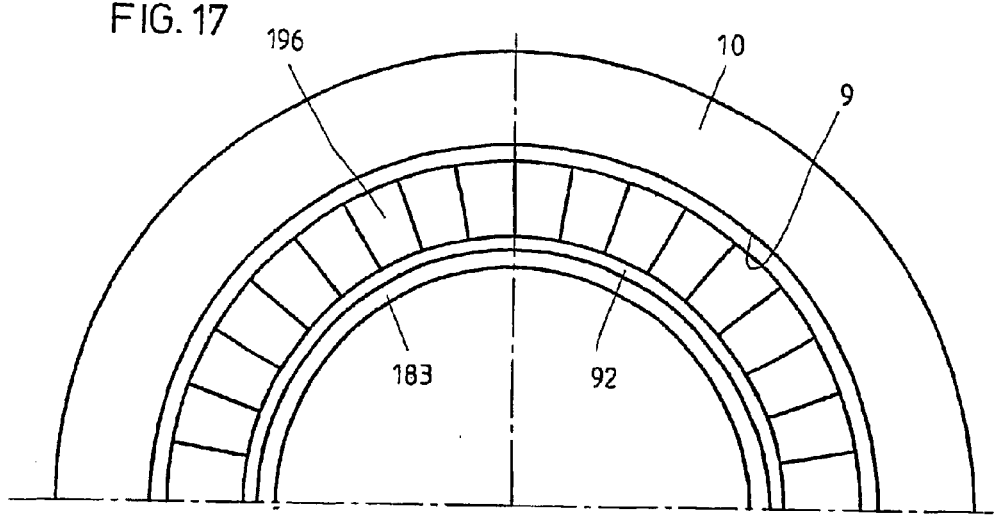
Figure 18:
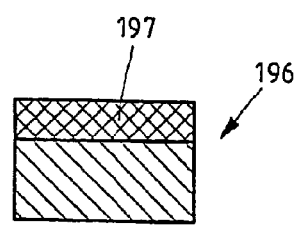
Figure 19:
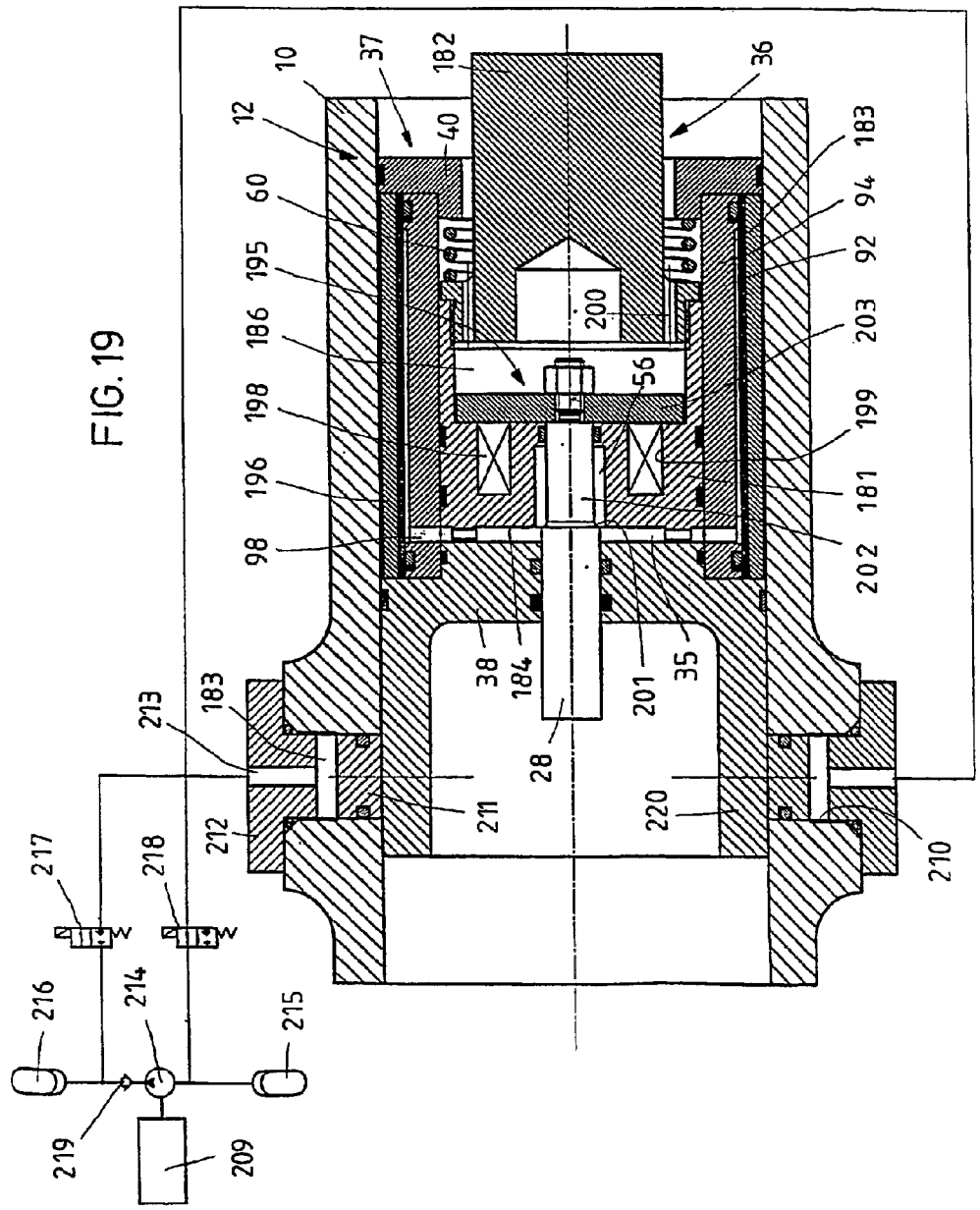
Figure 20:
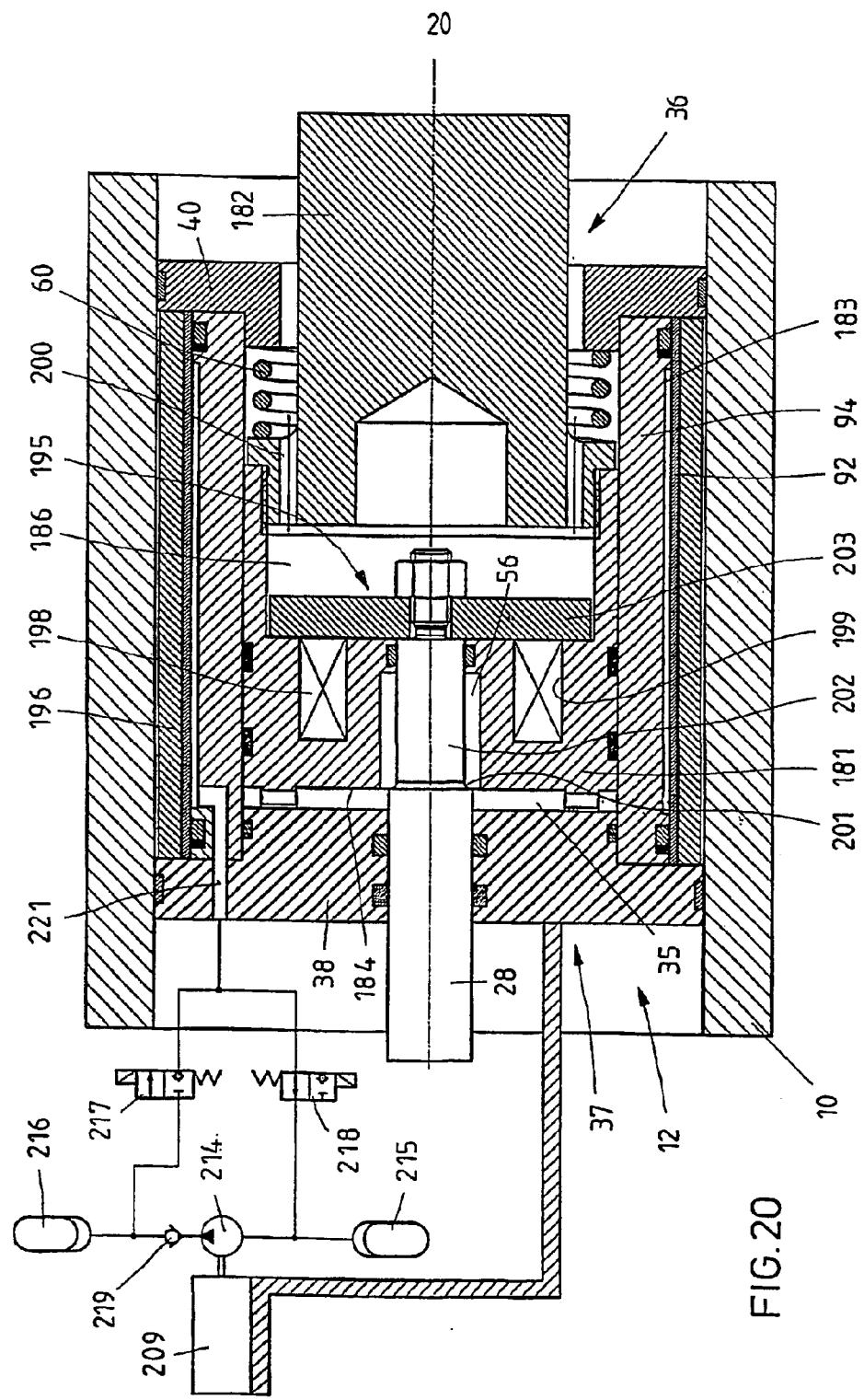
Figure 21:
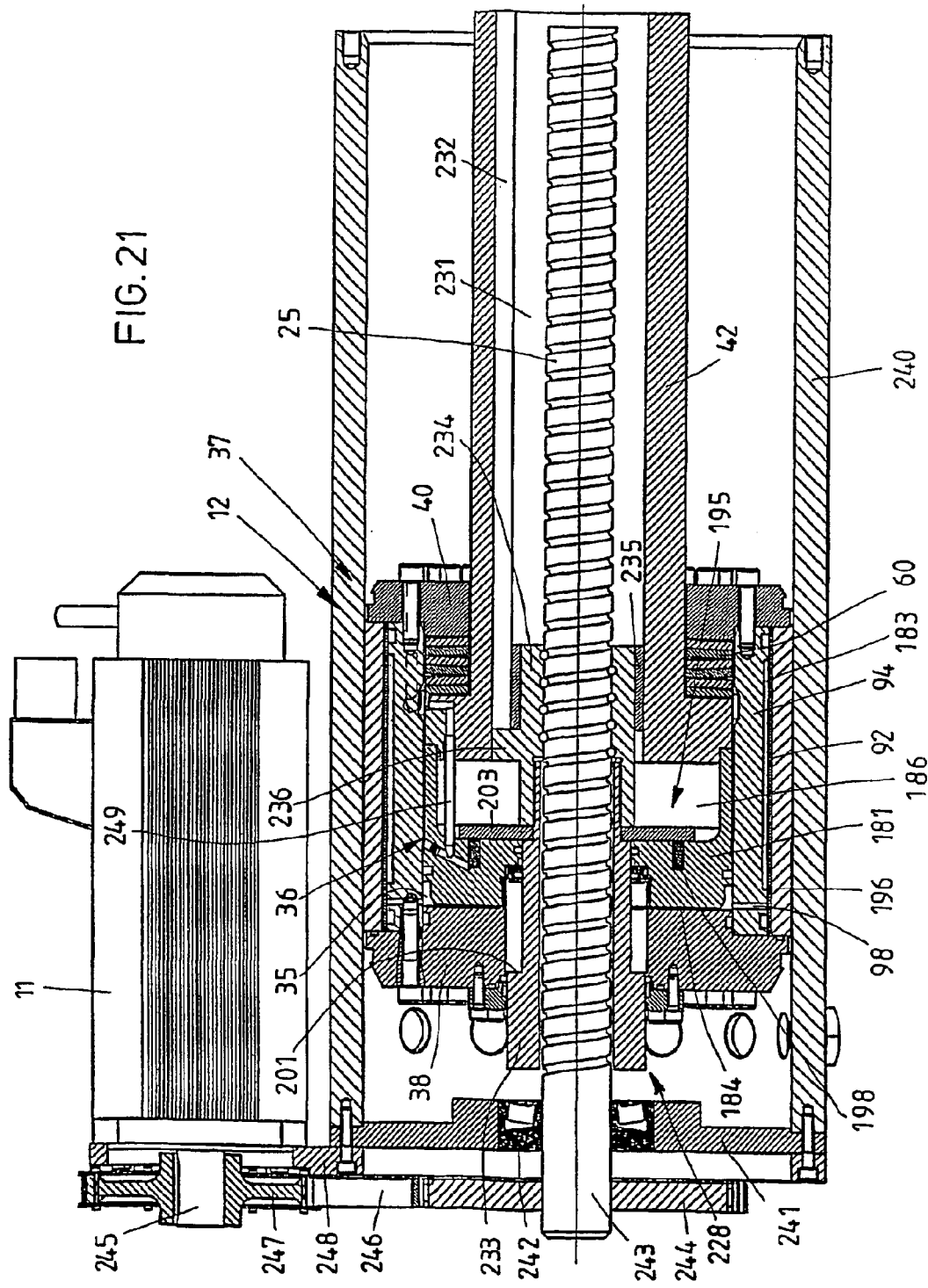
Figure 22:
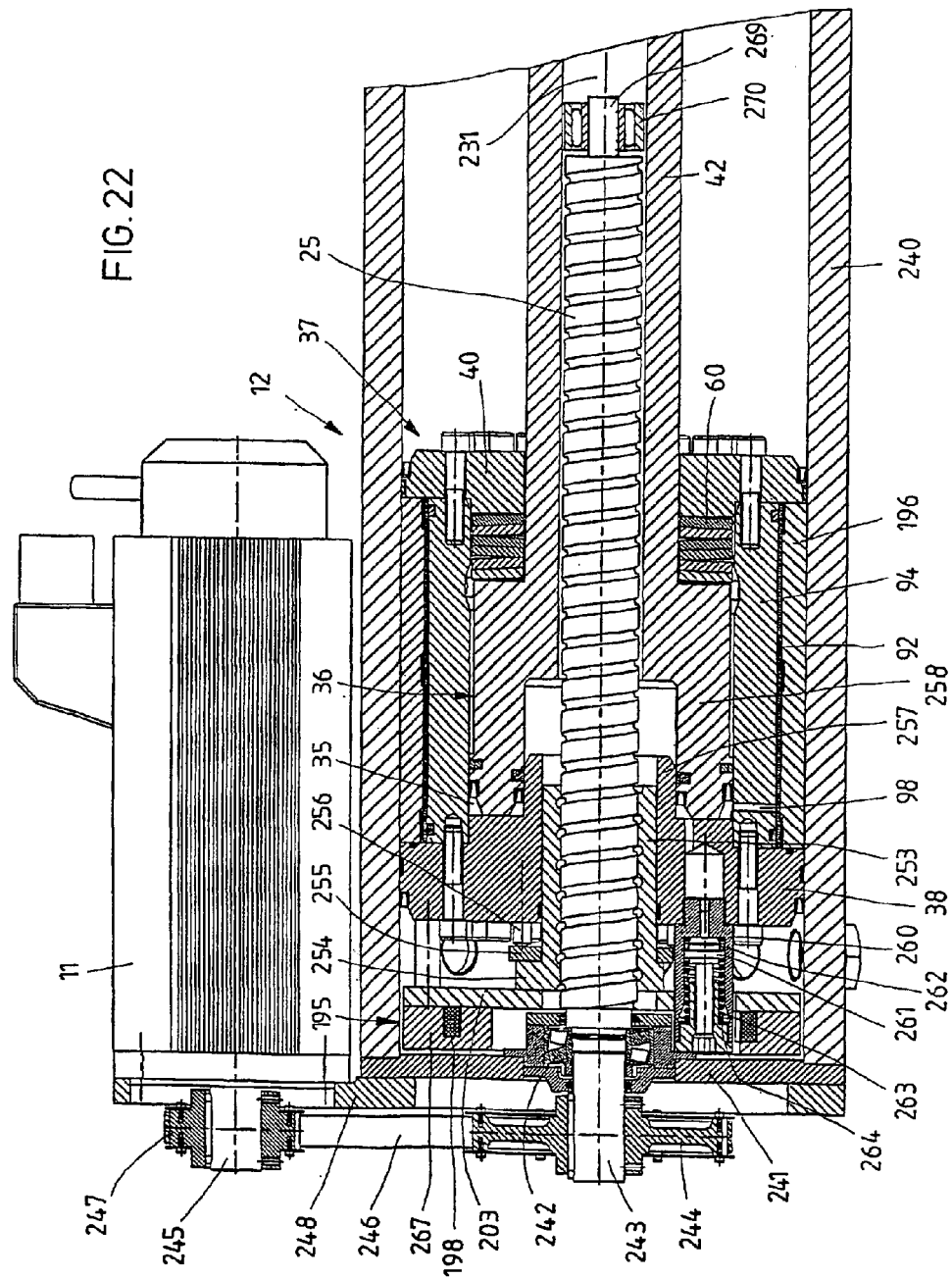
Figure 23:
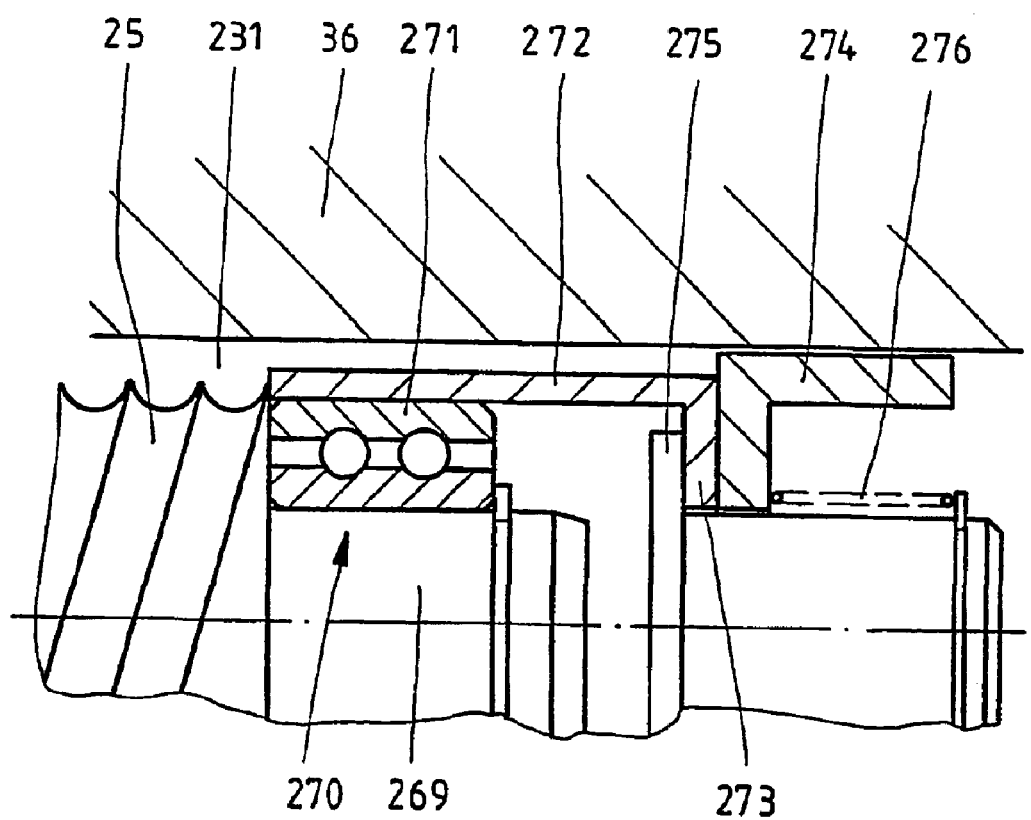
Figure 24:
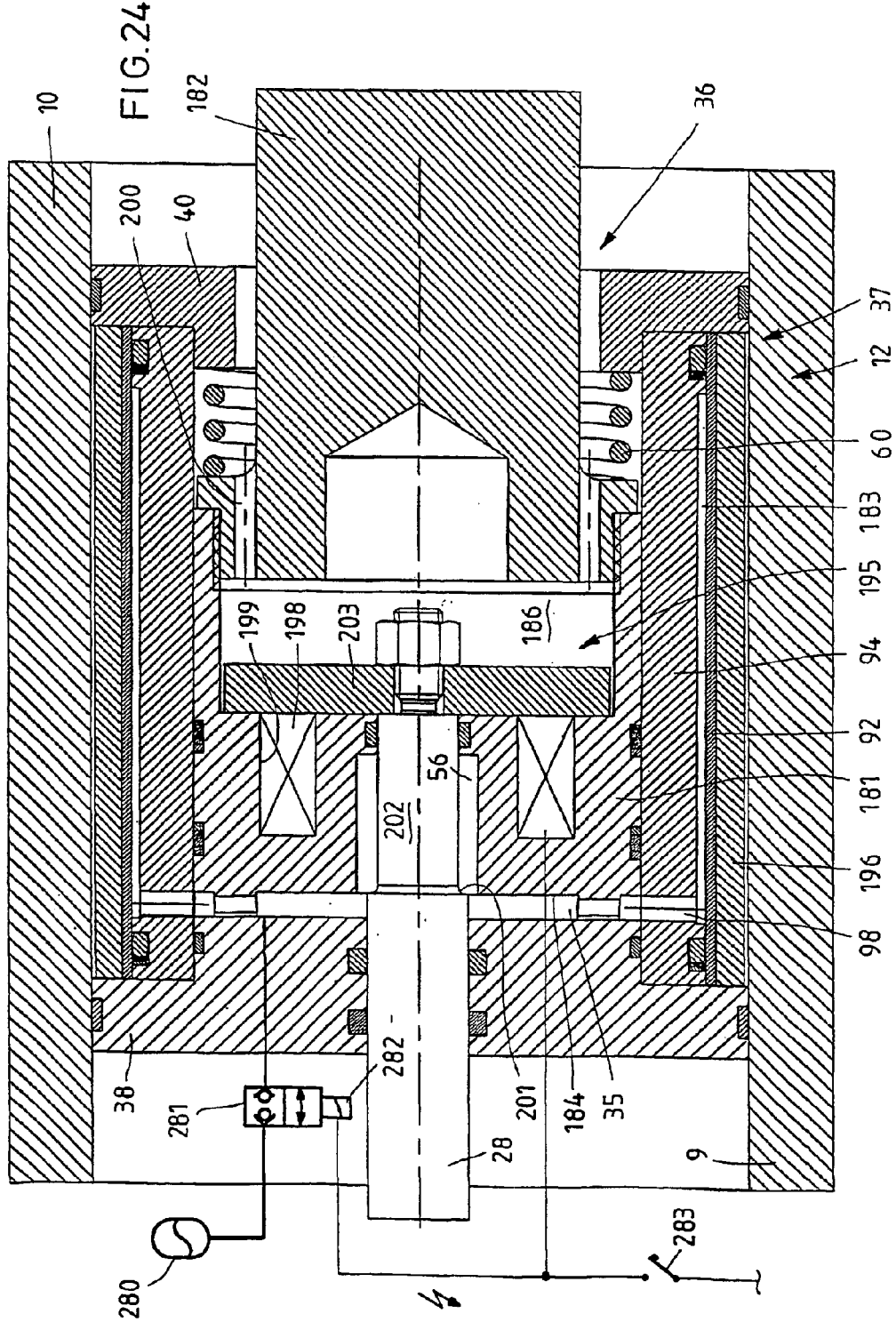
Figure 25:
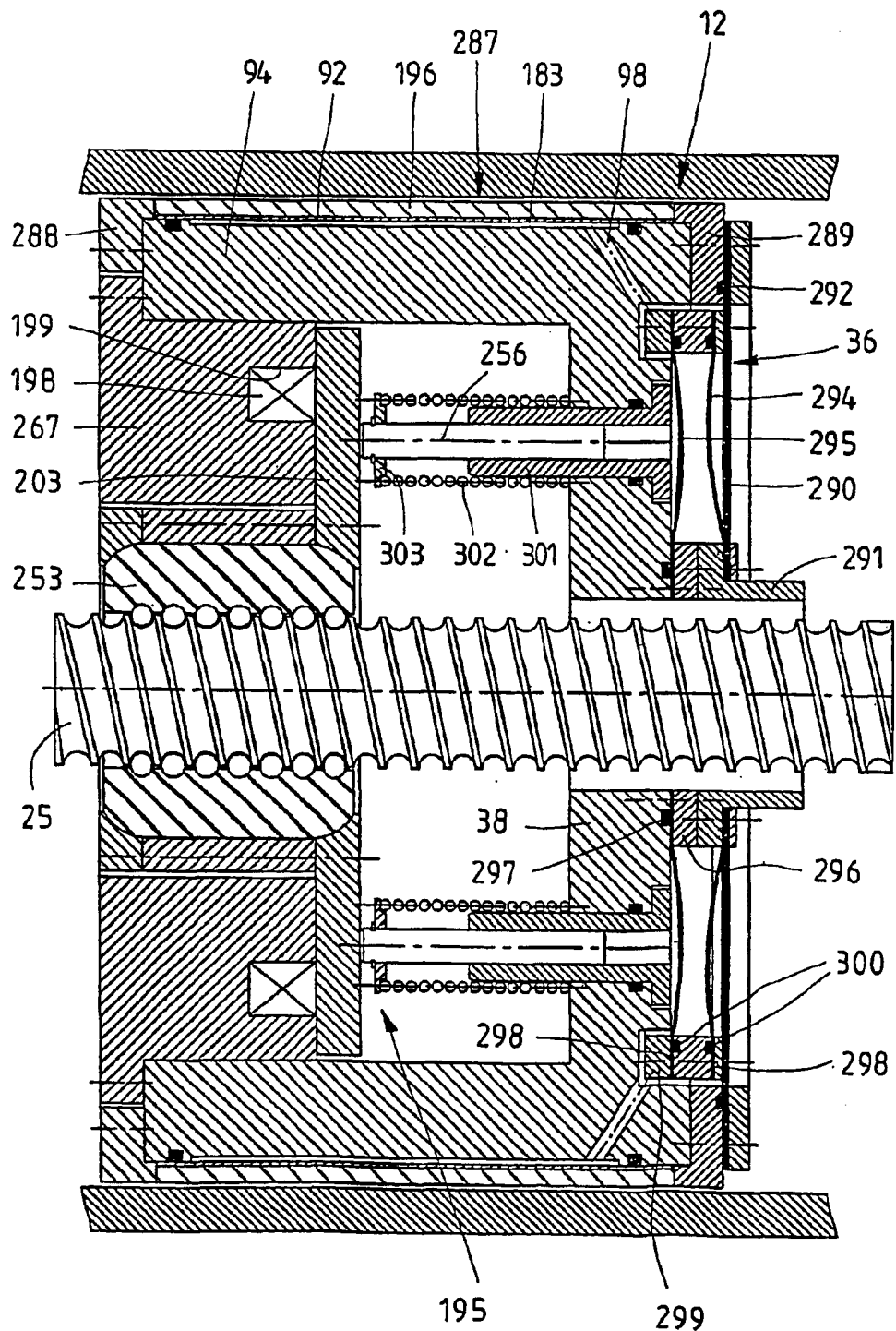
Figure 26:
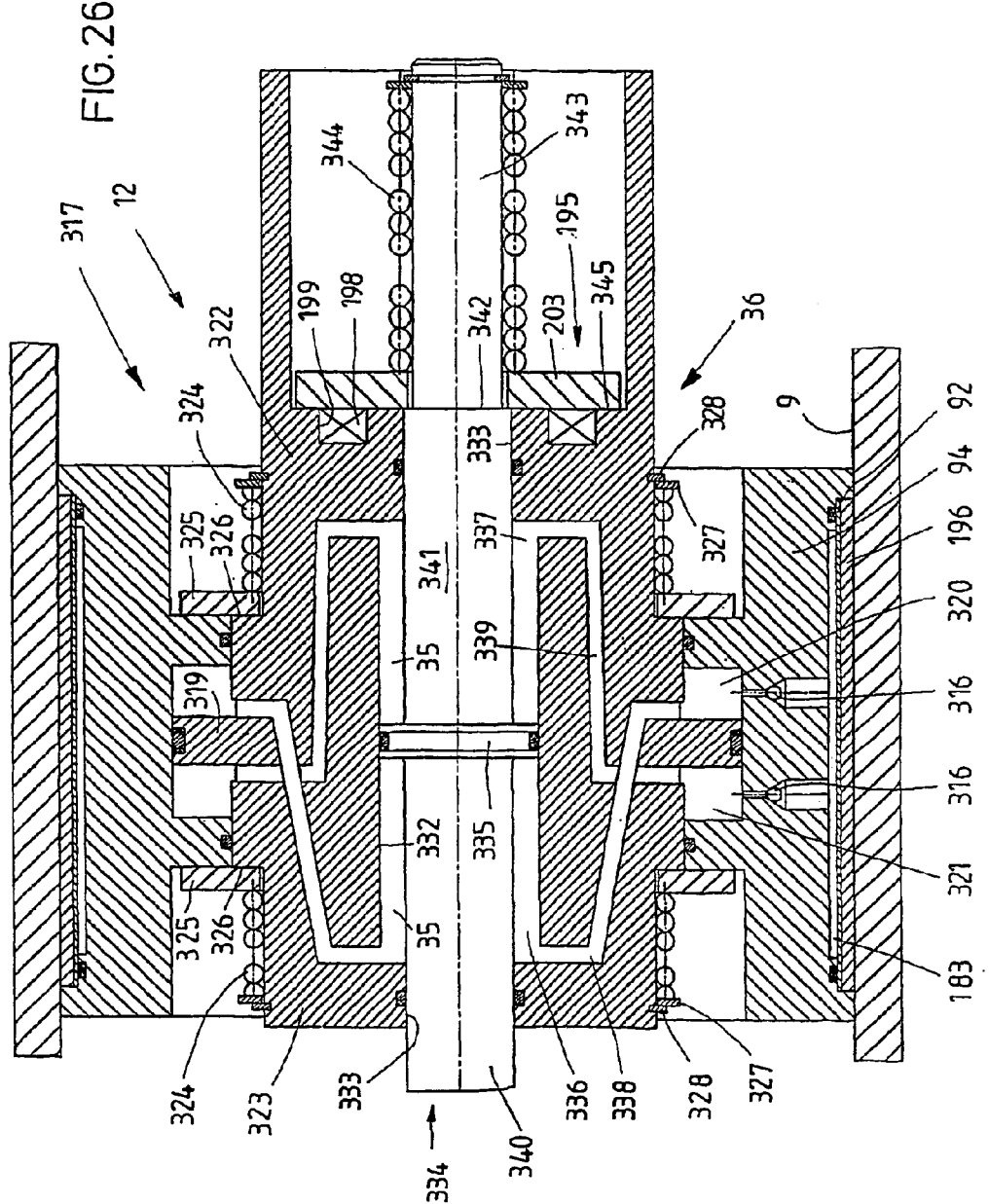
Figure 27:
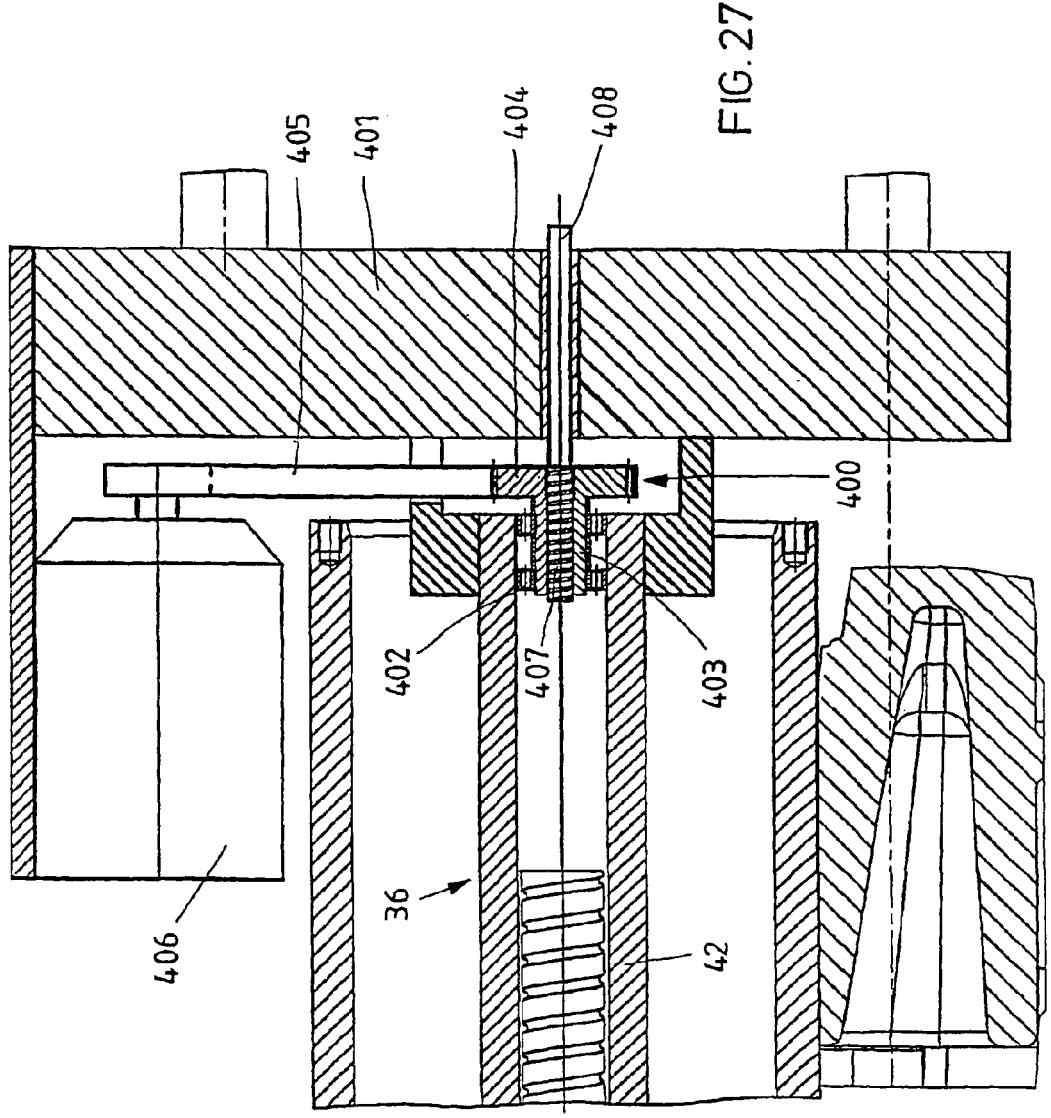
Figures 28, 29:
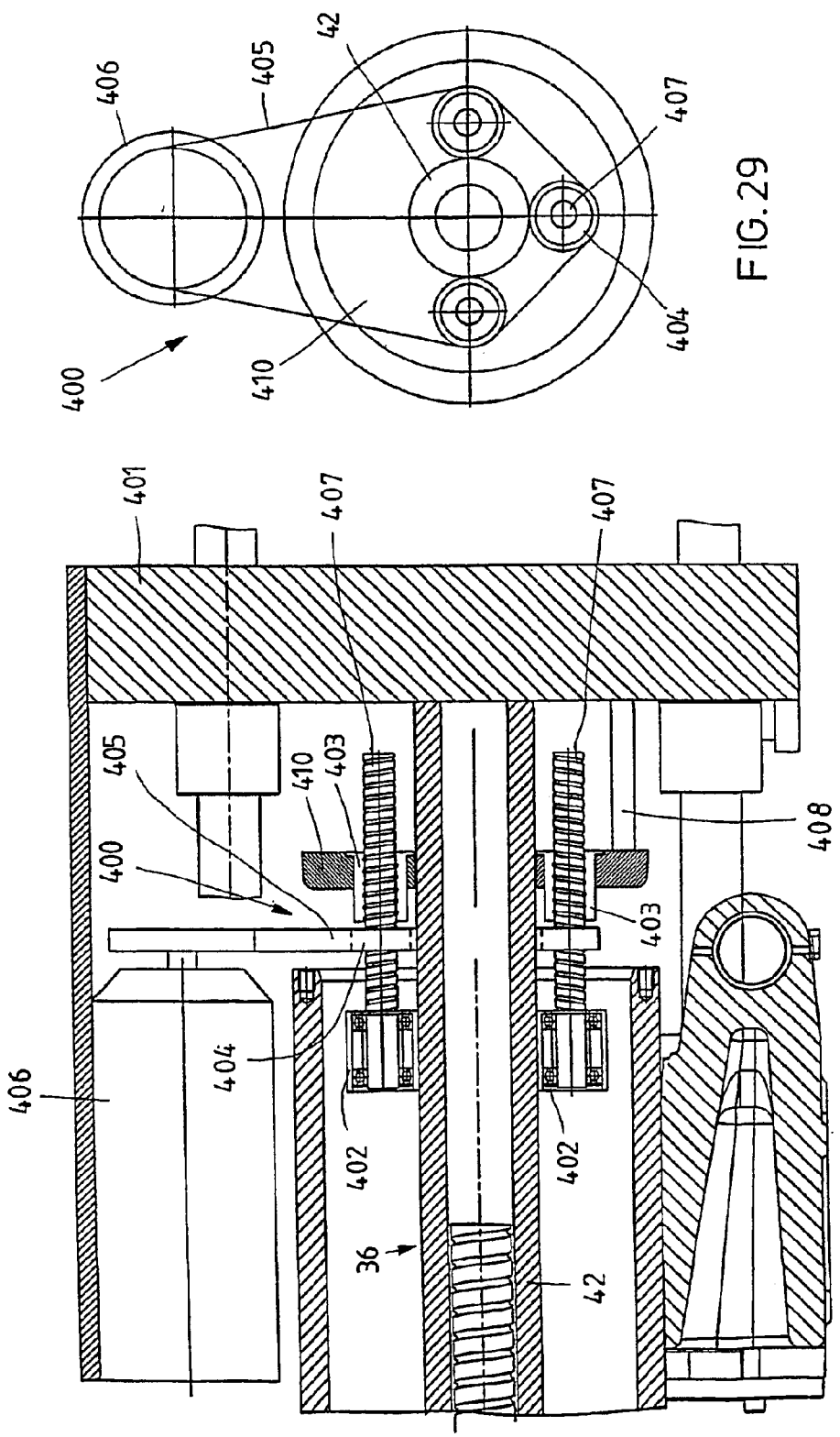
Figure 30:
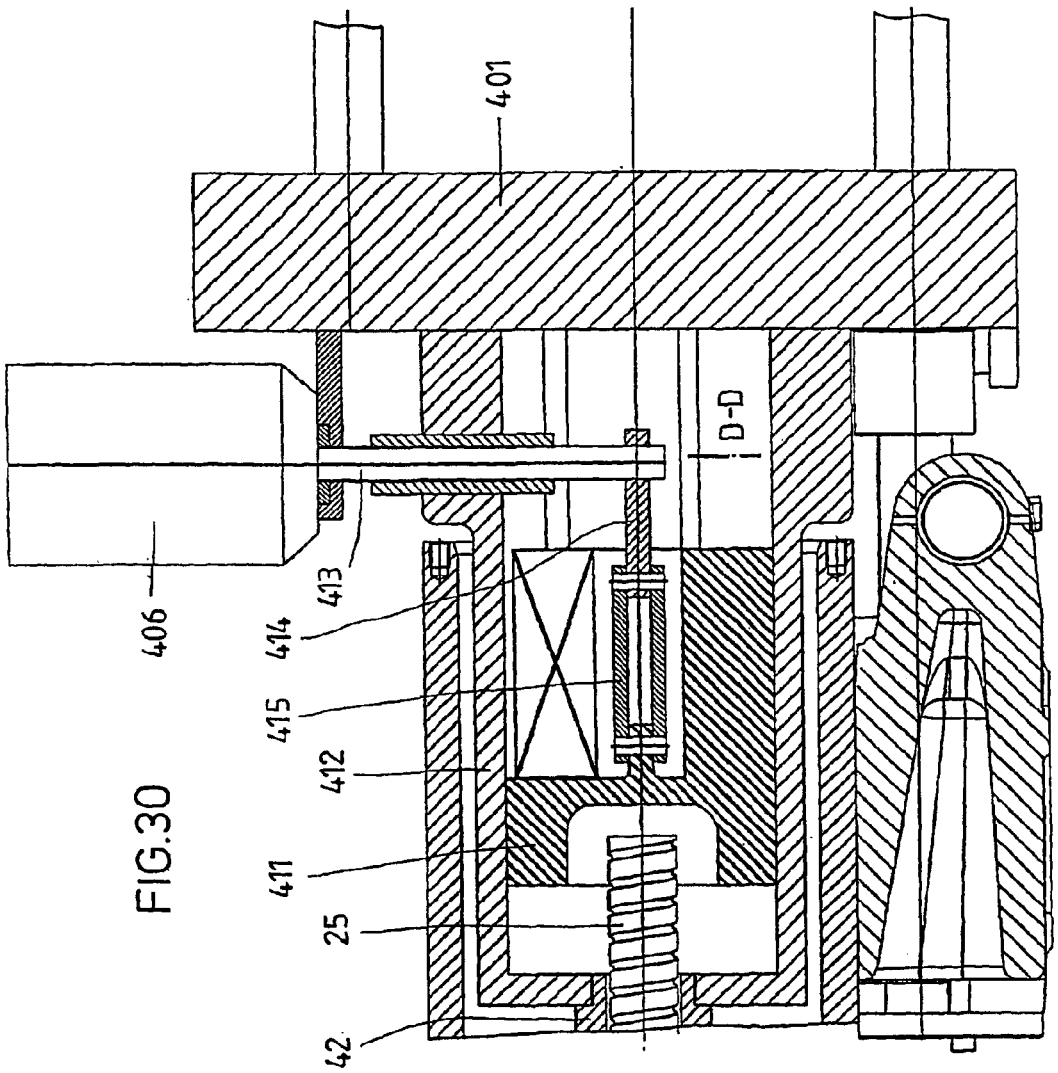
Figure 31:
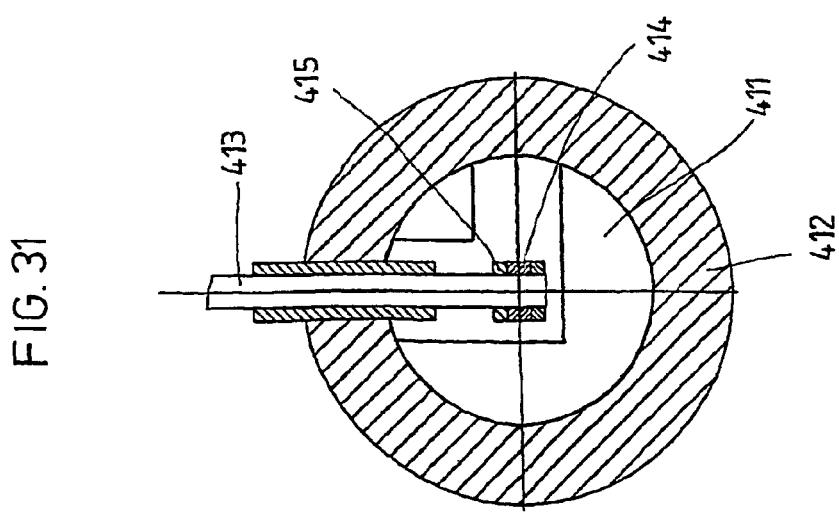
Figure 32:
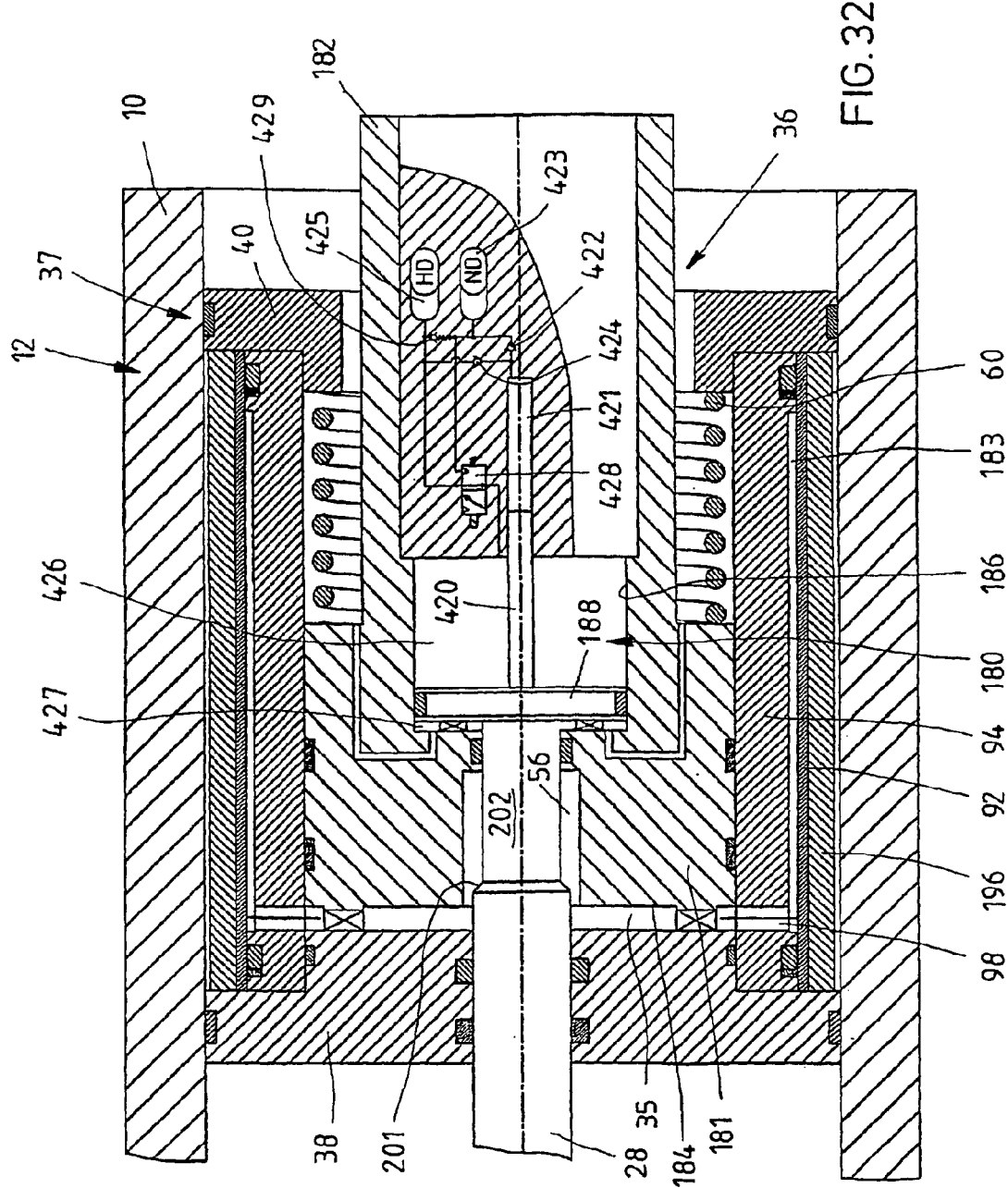
Figure 33:
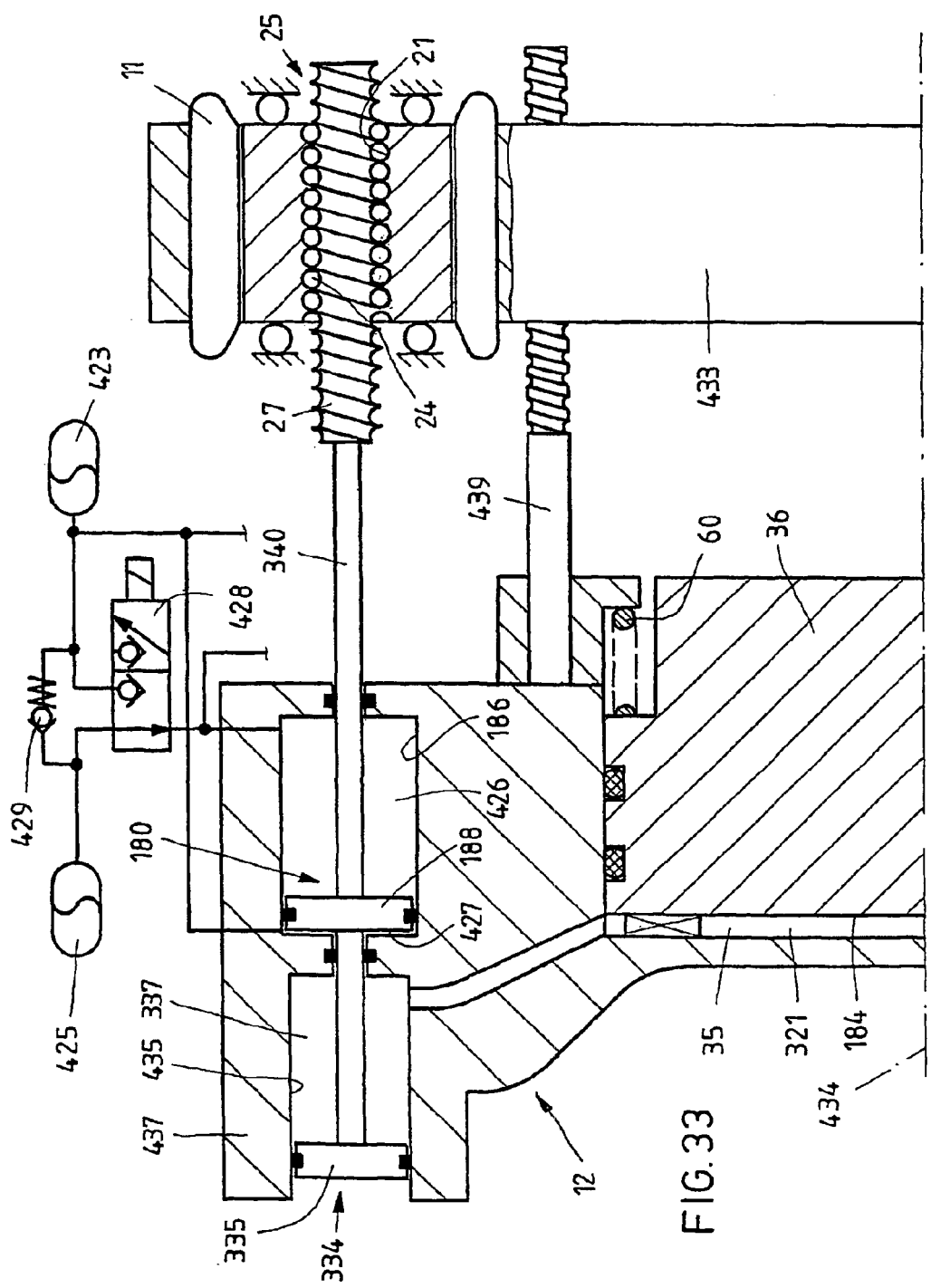
Figure 34:
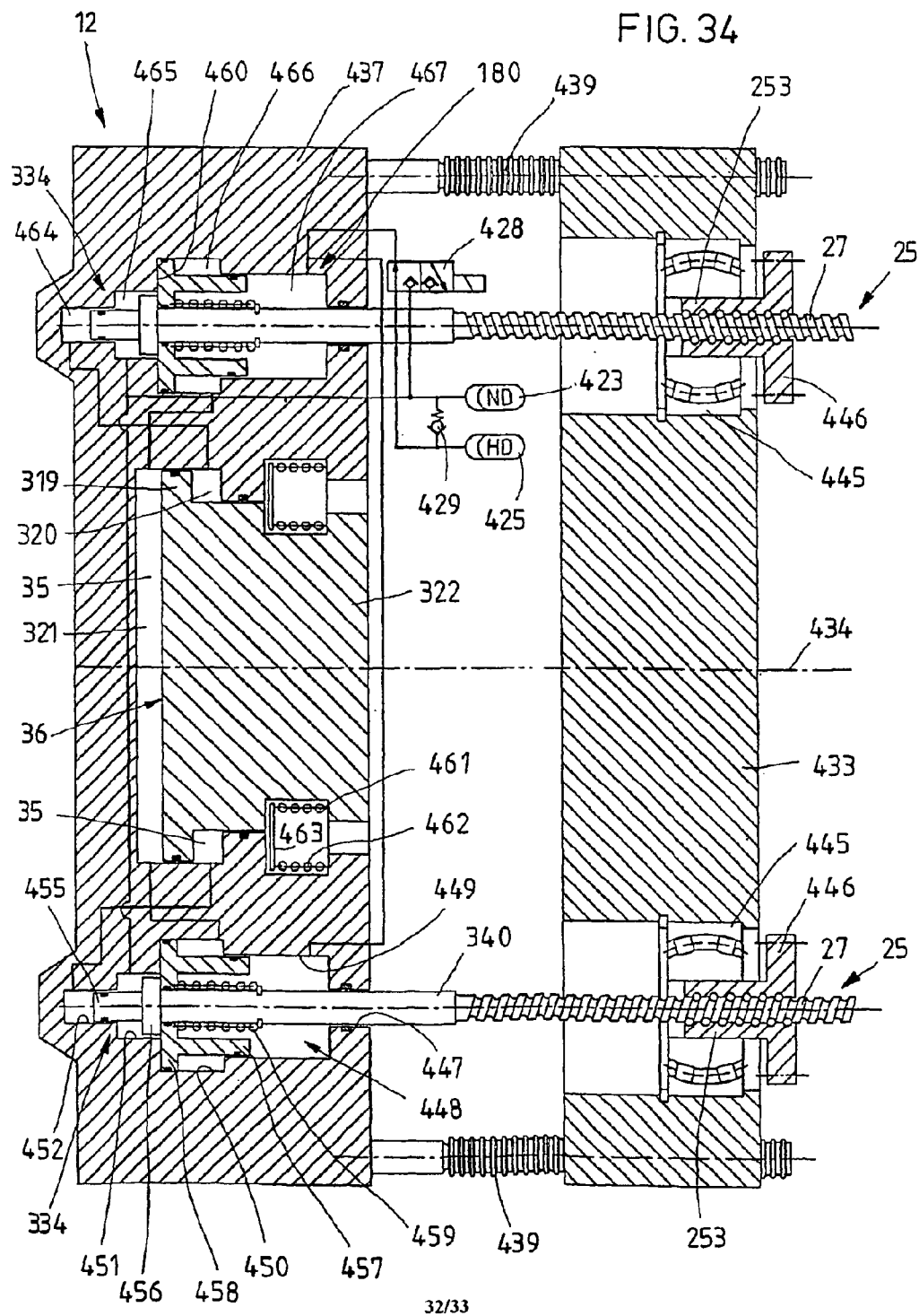
Figure 35:
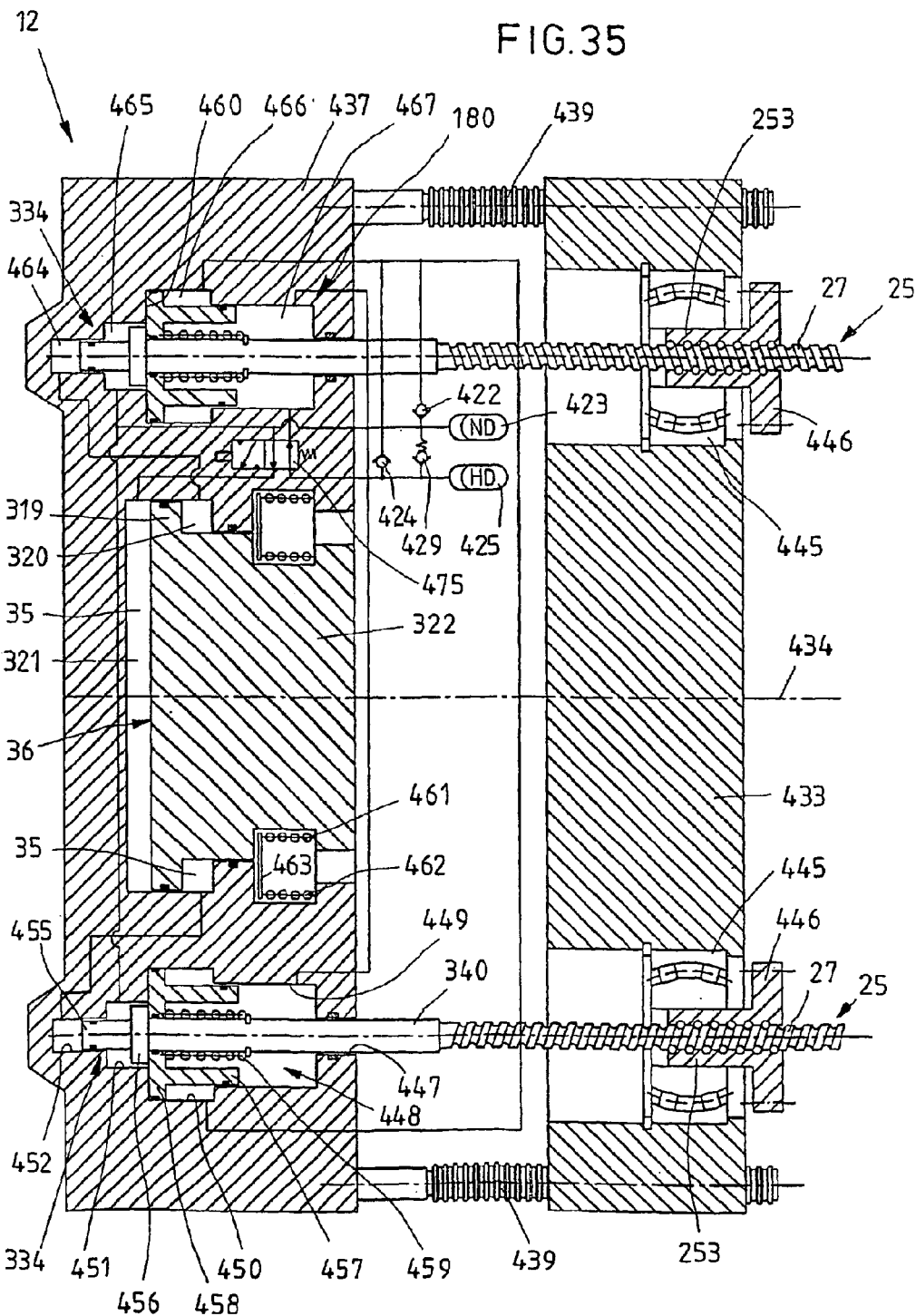

Several exemplary embodiments of a drive device according to the invention are shown in the drawings. The invention will now be explained in more detail with reference to these drawings, in which:

FIG. 1 shows a first exemplary embodiment in which the drive element is driven by a rotary electric motor via a stroke spindle, and the intermediate part of the power transmission means can be locked by radial widening by friction grip, FIG. 1a shows a variant of the first exemplary embodiment, a restoring plate acting on the large piston and not on the intermediate part of the power transmission means, FIG. 2 shows a second exemplary embodiment in which the intermediate part of the power transmission means can be locked by pivotable locking bars by positive locking, FIG. 3 shows a third exemplary embodiment in which the intermediate part of the power transmission means can be locked by a type of multiple-disk brake again by friction grip, FIG. 4 shows a fourth exemplary embodiment in which the pressure fluid is cooled by a cooling passage, FIG. 5 shows a fifth exemplary embodiment which is largely identical to the first exemplary embodiment, but in which a clutch is located between the drive element and the intermediate part of the power transmission means, FIG. 6 shows a sixth exemplary embodiment in which the intermediate part, in addition to a guide tube for the large piston, has a clamping tube which can be radially widened on a larger diameter, FIG. 7 shows a seventh exemplary embodiment, again with a clamping tube which is separate from the guide tube and which is very thin compared with the clamping tube of the sixth exemplary embodiment and rests on the guide tube in the relieved state, FIG. 8 shows an eighth exemplary embodiment in which the intermediate part of the power transmission means can be clamped by wedges in a bore of a machine part, FIG. 9 shows a ninth exemplary embodiment in which the intermediate part of the power transmission means can be clamped by wedges on spars of a machine, it being possible for the pressure in the pressure space to be applied to the wedges, FIG. 10 shows a tenth exemplary embodiment in which the intermediate part of the power transmission means, as in the ninth exemplary embodiment, can be clamped by wedges on spars of a machine, but in which spring pressure can be applied to the wedges, FIG. 11 shows an eleventh exemplary embodiment in which the intermediate part of the power transmission means can be hydraulically locked directly by a trapped pressure fluid volume, FIG. 11a shows a variant of the eleventh exemplary embodiment of the pressure-medium reservoir, FIG. 12 shows a twelfth exemplary embodiment in which the intermediate part of the power transmission means can be locked by an axial stop which follows the intermediate part, FIG. 13 shows a thirteenth exemplary embodiment in which, as in the twelfth exemplary embodiment, the intermediate part of the power transmission means can be locked by an axial stop which follows the intermediate part, it being possible for the stop to be moved by a second electric motor, FIG. 14 shows a fourteenth exemplary embodiment in which the intermediate part can be locked by a threaded part which can be rotated by a second electric motor, FIG. 15 shows a fifteenth exemplary embodiment in which guide tube and clamping tube are again separate and in which, for controlling the power transmission means, the small piston and the large piston are coupled to one another via a hydraulic slip clutch, FIG. 16 shows a sixteenth exemplary embodiment in which the clamping tube is surrounded by individual brake rods and in which, for controlling the power transmission means, the small piston and the large piston can be coupled to one another via an electromagnetic clutch, FIG. 17 shows a view in the axial direction of the clamping tube and the brake rods surrounding it from FIG. 16, FIG. 18 shows a cross section through an individual brake rod, FIG. 19 shows a seventeenth exemplary embodiment in which the intermediate part of the power transmission means can be locked via brake shoes which are held on the frame and to which external pressure medium can be applied, FIG. 20 shows an eighteenth exemplary embodiment which is of similar construction to the sixteenth exemplary embodiment, but in which an external pressure medium can be applied on the inside to the clamping tube, and FIG. 21 shows a nineteenth exemplary embodiment in which both the small piston and the large piston of the hydraulic unit are formed as hollow pistons and accommodate the screw spindle, rotationally driven by the electric motor, of a screw drive for moving the small piston, FIG. 22 shows a twentieth exemplary embodiment which is of similar construction to the nineteenth exemplary embodiment, but in which the small piston is formed by a plurality of little pistons and in which the pressure space is connected to a piston accumulator, the capacity of which is exhausted at low pressure, FIG. 23 shows a special bearing arrangement of the one end of the screw spindle from FIG. 22, FIG. 24 shows a twenty-first exemplary embodiment which is of similar construction to the sixteenth exemplary embodiment, but in which a fluid connection between the pressure space and a hydraulic accumulator can be controlled via a directional control valve, FIG. 25 shows a twenty-second exemplary embodiment in which the small piston is formed by a plurality of little pistons and the large piston is formed by a diaphragm piston, FIG. 26 shows a twenty-third exemplary embodiment which has a double-acting hydraulic power transmission means, FIG. 27 shows a variant of the twentieth exemplary embodiment, this variant being additionally equipped with a drive device for an ejector, FIG. 28 shows a further variant of the twentieth exemplary embodiment having a drive device for a plurality of ejectors, FIG. 29 shows a view of the drive device for the ejector according to FIG. 28 in the axial direction, FIG. 30 shows a further variant of the twentieth exemplary embodiment having another drive device for a plurality of ejectors, and FIG. 31 shows a section along line D—D from FIG. 30, FIG. 32 shows the twenty-fourth exemplary embodiment, in which, as in the exemplary embodiment according to FIG. 15, the small piston and the large piston can be hydraulically coupled to one another, and the small piston, as in the exemplary embodiment according to FIG. 16, has an annular area as effective area for the power transmission, FIG. 33 shows the twenty-fifth exemplary embodiment, in which the small piston can be hydraulically coupled to the intermediate part of the hydraulic unit, FIG. 34 shows the twenty-sixth exemplary embodiment, in which the small piston can likewise be coupled to the intermediate part of the power transmission means, and the power transmission means is constructed so as to be double-acting, FIG. 35 shows the twenty-seventh exemplary embodiment, which is of similar construction to that according to FIG. 34, but in which the clutch space between the small piston and the intermediate part is at the same time also a sectional space of a pressure space of the power transmission means.

DETAILED DESCRIPTION OF THE PREFERRED EMBODIMENT

According to FIG. 1, an electric motor 11 and a hydraulic power transmission means 12 of circular-cylindrical cross section on the outside are accommodated by a stepped bore 9 of a machine frame 10. A housing 13 of the electric motor 11 is essentially composed of two bearing plates 14 and 15 and a housing shell 16. Sitting on the latter on the inside is the stator 17 of the electric motor. The rotor 18 of the electric motor sits on a hollow drive shaft 19 which is rotatably mounted in two rolling-contact bearings 20 held in the bearing plates 14 and 15 and in which a ball groove thread 21 is formed on the inside.

Located inside the hollow drive shaft 19 is a stroke spindle 25 which is locked against rotation and has a first section 26 which constitutes the actual stroke spindle and has a diameter which is approximately equal to the inside diameter of the drive shaft 19 and is provided on the outside with a ball groove thread 27. Located between the latter and the ball groove thread 21 of the drive shaft 19 are balls 28, via which the drive shaft 19 and the stroke spindle 25 are coupled to one another. The stroke spindle 25 has a second section 28 which has a circular-cylindrical shape and is smaller in diameter than the first section 26. A restoring disk 29 is fastened to the free end of the section 28.

The second section 28 of the stroke spindle 25 constitutes part of the hydraulic power transmission means 12. Specifically, it is the small piston with the smaller effective area and plunges into a pressure space 35, filled with a hydraulic fluid, of the hydraulic power transmission means 12. In addition, the latter has a large piston 36 with a large effective area and also an intermediate part 37 which is at rest when the force transmission is being utilized and, in all the exemplary embodiments shown, is a cylinder accommodating the large piston 36. In the exemplary embodiment according to FIG. 1, the cylinder is composed of a first end flange 38 with a central opening 39, the diameter of which corresponds to the diameter of the small piston 28 and through which the piston 28 enters the pressure space 35 in a sealed-off manner. The restoring disk 29 is fastened inside the pressure space 35 to the end face of the piston 28. A second end flange 40 of the cylinder 37 likewise has a central opening 41. Its diameter is larger than the diameter of the opening 39 in the flange 38. A piston rod 42 of the large piston 36 is located in the opening 41. Extending between the two flanges 38 and 40 and tightly connected to them is the tubular cylinder envelope 43, which, except for two annular, inwardly directed widened portions at its ends, these widened portions serving for fastening to the flanges, is formed to be so thin-walled that it can be extended elastically outward by an internal pressure. When the cylinder envelope 43 is not extended, there is a slight clearance between the envelope and the bore 9, which has a slightly larger diameter in the region of the electric motor than in the region of the power transmission means 12.

The large piston 36 is essentially formed in two pieces and has a pot-shaped outer part 44 with a base 45 and an envelope 46, which extends from the base 45 at a radial distance from the cylinder envelope 43 in the direction of the flange 40 of the cylinder 37 and has an outer flange 47 at its free end, at which outer flange 47 the large piston 36 and cylinder 37 are guided on one another and sealed off from one another at a point 50. A further guide 49 between the piston 36 and the cylinder 37 is located in the region of the base 45. This guide 49 is interrupted in sections, so that the space outside the envelope 46 of the pot 44 is freely connected to the space between the base 45 of the pot 44 and the flange 38. Furthermore, there are spacers 48 between the base 45 and the flange 38 of the cylinder 37, so that the base 45 cannot bear flat against the flange 38 and there is a free connection of all the clearance spaces between the flange 38 and the large piston 36, these clearance spaces forming the pressure space 35.

A central opening 55 in which the piston rod 42 is fastened is located in the base 45 of the outer part 44 of the large piston 36. The small piston 28 together with the restoring disk 29 can plunge into a blind hole 56, open toward said small piston 28, of the piston rod 42.

The outside diameter of the piston rod 42 is smaller than the inside diameter of the envelope 46 of the outer part 44, so that an annular groove 57 is produced in the piston 36, this annular groove 57 being open toward the flange 40 of the cylinder 37 and accommodating a helical compression spring 60 which is secured in position between the base 45 of the piston 36 and the flange 40 of the cylinder 37 and thus loads these two parts in such a direction that the piston 36 bears against the flange 38 of the cylinder 37 via the spacers 48. When said piston 36 comes to bear, the helical compression spring 60 is loaded in such a way that it can transmit the force required for the regulating movement of the platen of an injection molding machine for plastics without increasing the preloading.

The pressure space 35 including the blind hole 56 is filled with a pressure fluid, to be precise with a silicone oil, which has good thermal stability and ages substantially more slowly than a mineral oil. The space between the flange 40 and the piston 36 is connected to the atmosphere via holes in the flange 40.

In FIG. 1, the drive device is shown in a state in which the mold of an injection molding machine for plastics is completely open. The restoring plate 29 of the small piston 28 and the large piston 36 bear against the flange 38 of the cylinder 37. The pressure in the pressure space 35 is thus lower than the pressure equivalent to the helical compression spring 60. However, it is higher than the pressure which is necessary in order to transmit the force required for the regulating movement of the platen.

If the mold is now to be closed, the electric motor is activated in such a way that its rotor rotates in a direction in which an axial movement of the stroke spindle 25 is effected to the right as viewed according to FIG. 1. Since the pressure in the pressure space 35 is sufficiently high, the large piston 36 immediately follows the movement of the small piston 28 and also carries along the cylinder 37 via the helical compression spring 60. Finally, the mold is closed, so that a high resistance counteracts the further movement of the large piston 36. The stroke spindle continues to be moved, so that the small piston 28 plunges deeper into the pressure space 35. As a result, the pressure in the pressure space 35 increases, in the course of which the helical compression spring 60, subjected to appropriately high preloading, first of all prevents the cylinder 37 from giving way to the left. Finally, by further pressure increase, the cylinder envelope 43 is widened to such an extent that it abuts on the inside against the wall of the bore 9. As a result, the cylinder 37 is held in its position by clamping, that is by friction grip, even if this can no longer be effected solely by the helical compression spring 60. The mold is now locked with a high closing force, which results from the product of the pressure in the pressure space 35 and the effective area of the large piston 36 less the force of the helical compression spring 60. On the other hand, the reaction force on the stroke spindle 25 is determined by the product of the pressure in the pressure space 35 and the substantially smaller effective area of the small piston 28. The loading of the ball screw drive is therefore low.

To open the mold, the electric motor 11 is driven in the opposite direction. The stroke spindle 25 travels to the left and finally, via the restoring plate 29, the cylinder 37, the helical compression spring 60 and the large piston 36, carries along the platen with the mold half fastened thereto.

In the embodiment shown in FIG. 1, the restoring plate 29 acts on the flange 38 of the cylinder 37. It is also conceivable, according to a variant, shown in FIG. 1a, of the embodiment according to FIG. 1, for the restoring plate 29 to engage behind a shoulder 30 on the piston 36 and for the retraction of the platen by the stroke spindle 25 to take place directly via the large piston 36. In this case, it is advantageous that the platen, during the closing of the mold, can be braked directly via the stroke spindle 25 and the large piston 36 and not via the helical compression spring 60. According to FIG. 1a, the restoring plate 29 has opposite flats. The shoulder 30 comprises only two opposite individual projections, between which the inside radius of the piston rod 42 is equal to the radius of the blind hole 56. The gaps between the two projections are so large that the large piston 36 and the small piston 38 can be inserted one inside the other and be released from one another in a bayonet-like manner. Since the two pistons 28 and 36 are locked against rotation in the ready-to-operate state, they cannot be released from one another. Via the flats on the restoring disk 29 and the gaps between the projections 30, there is a free fluidic connection between the blind hole 56 and the remaining parts of the pressure space 35.

The exemplary embodiment shown in FIG. 2 essentially shows only the hydraulic unit 12. This hydraulic unit 12 again has a cylinder 37, a large piston 36 and a small piston 28 with a restoring plate 29 which engages behind an end flange 38 of the cylinder 37. The latter, in the exemplary embodiment according to FIG. 2, is only formed in two pieces and, in addition to the flange 38, has a dimensionally stable envelope 63, to which the flange 38 is screwed and which, at a distance from the flange 38, has an inner shoulder 64, on which the helical compression spring 60, also present in the second exemplary embodiment, is supported and which serves as a travel limit for the large piston 36. Behind the inner shoulder 64, an annular groove 65 runs on the outside around the envelope 63. The large piston 36 is constructed in a similar manner to the same piston of the first embodiment and has a blind hole 56 which is part of the pressure space 35, an annular groove 57 which accommodates the helical compression spring 60, and a piston rod 42 which moves freely outward inside the shoulder 64. The space in which the helical compression spring 60 is located is connected to the atmosphere in exactly the same way as in the embodiment according to FIG. 1.

The cylinder 37 is axially guided in a ring 70 which, with an external thread 71, interacts with an internal thread of the machine frame 10. At one end, the ring 70, with a stop 72, overlaps the outside diameter of the cylinder 37 toward the inside and thus limits the travel of the cylinder 37 in the one direction. In front of the stop 72, an annular groove 73 open to the inside is made in the ring 70. Running at equal angular distances from one another between the other end of the ring 70 and the annular groove 73 are a plurality of axial holes 74, through which bolts 75 are inserted, of which each carries a locking element 76 at one end in the annular groove 73. The bolts 75 can be turned by acting on the other end. The bolts 75 can assume a rotary position in which the locking elements 76 do not engage in the groove 65 of the cylinder 37. This is shown at the top in FIG. 2. The cylinder 37 is then freely movable within its stroke range. If the cylinder 37 bears against the stop 72 of the ring 70, the locking elements 76 can be swung into the annular groove 65 by turning the bolts 75. The cylinder 37 of the hydraulic power transmission means 12 is then locked in a positive manner against movement. The functioning of the exemplary embodiment according to FIG. 2 is the same as that of the exemplary embodiment according to FIG. 1. However, locking of the cylinder 37 is not now possible in every position. In order to bring the locking position of the cylinder 37 into conformity with a certain closing position of the platen, the ring 70 is rotated in the machine frame 10 and as a result the stop 72 and the locking elements 72 are axially adjusted.

In the exemplary embodiment according to FIG. 3, the cylinder 37 can again be locked by friction grip and thus in any desired position. In this case, however, the locking device, compared with the embodiment according to FIG. 1, is formed in such a way that very high reaction forces can be withstood. The locking device in this case comprises two stacks of metal sheets 77 and 78 and one or more actuators (not shown in any more detail). The two outermost metal sheets 77 are fastened to the outer surfaces of the cylinder 37 via screws 79, of which only one is shown in FIG. 3. The other metal sheets 77 are held on the cylinder by screws 80 which run outside the cylinder 37 and also pass through the two outermost metal sheets, a spacer 81 being arranged in each case between two metal sheets. The stack of metal sheets 78 is firmly connected to the machine frame (not shown in any more detail) and held together via screws 82, a spacer 81 also being arranged here in each case between two metal sheets. The two stacks of metal sheets interlock and can be pressed against one another by the actuators like the disks of a multiple-disk brake. In this way, frictional locking of the cylinder 37 even against high acting forces is also possible.

The embodiment according to FIG. 4, in which only one half of the hydraulic power transmission means of this embodiment is shown, largely corresponds to that according to FIG. 1. The hydraulic power transmission means 12 again has a small piston 28, which is axially movable by an electric motor via a spindle drive, a large piston 36 and a cylinder 37. The cylinder has a flange 38, a flange 40 and a cylinder envelope 43 which can be widened by an internal pressure and pressed against a wall of the machine frame 10. A helical compression spring 60 is again secured in position between piston 36 and cylinder 37, the seal between the cylinder envelope 43 and the piston 36 now being located in front of the piston-side end of the compression spring 60 and the power transmission means accordingly being constructed to be longer than in the embodiment according to FIG. 1. The space in which the compression spring 60 is located is again connected to the atmosphere. The pressure space 35 is filled with a pressure fluid. So that heat can be dissipated from the latter, a cooling coil 85 through which cold water can be conducted leads through the pressure space 35.

The exemplary embodiment according to FIG. 5 is largely constructed like the exemplary embodiment according to FIG. 1 in its variant according to FIG. 1*a*. The same parts are therefore provided with the same designations as in FIG. 1 without this being dealt with in more detail here. Only the differences shall be considered below.

According to FIG. 5, the large piston of the fifth exemplary embodiment is produced from a single piece.

Compared with the exemplary embodiment according to FIG. 1, the distance between the electric motor 11 and the base 38 of the cylinder 37 is increased. Accordingly, the second section 28 of the stroke spindle 25 is lengthened. Arranged in the space created between the electric motor 11 and the cylinder 37 is a clutch 85, via which the stroke spindle 25 can be coupled directly to the cylinder 37. The clutch is actuated electromagnetically, an electric winding 86 being accommodated in an axially open groove of the base 38 of the cylinder 37. When the winding is not energized, a flat armature 87 is held at a distance from the base 38 by springs 88. A plurality of elastically deformable hooks 89 are fastened to the base 38 around the section 28 of the stroke spindle 25, these hooks 89 being bent inward by a movement of the flat armature 87 toward the base 38 and engaging in annular grooves 90 of the stroke spindle 25. The clutch thus comes into effect by energizing the winding 86.

In the exemplary embodiment according to FIG. 5, the clutch 85 enables the hydraulic unit 12 and the movable platen, fastened to the piston 36, of an injection molding machine for plastics to be accelerated very rapidly by a very high force which exceeds the force which can be transmitted by the spring 60. When the mold is closed, the clutch 85 is released. The stroke spindle 25 continues to be moved, so that the small piston 28 plunges deeper into the pressure space 35. As a result, the pressure in the pressure space 35 increases, in the course of which the helical compression spring 60, which is preloaded to the same extent as in the first exemplary embodiment, first of all prevents the cylinder 37 from giving way to the left. Finally, by further pressure increase, the cylinder envelope 43 is widened to such an extent that it abuts on the inside against the wall of the bore 9.

To open the mold, the electric motor 11 is driven in the opposite direction and carries along the platen directly via the restoring plate 29 and the large piston 36 without a spring in between.

If, in a variant (not shown) of the fifth exemplary embodiment, the cylinder 37 is not locked by being acted upon by the pressure prevailing in the pressure space 35 but, independently thereof, is locked mechanically or hydraulically, the helical spring is not necessary. However, it is The same pressure as in the pressure space 35 thus prevails in the clearance space 96 and therefore on the inside of the outer tube 92. When a pressure is therefore built up in the pressure space 35 by the small piston 28 plunging into the pressure space 35, pressure is also applied outward to the outer tube 92 and the latter clamps the cylinder 37 in place in the bore 9 (omitted in FIG. 6). The size of the clamping surface can thus now be selected independently of the size of the large piston 36. In addition, the guidance and sealing of the large piston 36 at the cylinder 37 is not influenced by the clamping. This is because the tube 94 is so robust that it is scarcely deformed inward by the pressure acting on it from the outside.

There is also a helical compression spring 60 in the embodiment according to FIG. 6, via which helical compression spring 60 the cylinder 37 can be carried along by the large piston 36, and, after the closing of the mold, the cylinder 37 can be held until a pressure, by which the cylinder 37 is clamped, has built up due to the piston 28 continuing to plunge into the pressure space 35.

Also in the exemplary embodiment according to FIG. 7, the clamping diameter for the cylinder 37 of the hydraulic unit 12 is different from the guidance and sealing diameter of the piston 36. The latter, as in the exemplary embodiments according to FIGS. 1 and 5, is again formed in two pieces with an outer part 44 and an inner part with piston rod 42. At its end facing the base 38 of the cylinder 37, the inner part has an inner shoulder 101, behind which a restoring disk 29 on the small piston 28 engages. The piston 36 is now continuously hollow centrally, so that the restoring disk 29 can be fastened to the small piston 28 from the free end of the piston rod 42. In this case, it is pushed over a threaded stem 102 of the piston 28 up to an outer shoulder and is secured by a nut 103. From the free end, the piston rod 42 has an internal thread, into which a connecting piece 104 for the movable platen is screwed in a sealed-off manner.

As in the embodiments according to FIGS. 1 and 5, the cylinder 37 has a base 38, a flange 40 and an inner tube 94 which runs between these two parts and which has a large wall thickness and is accordingly dimensionally stable. The large piston 36 is guided axially in the tube 94 by means of the outer part 44 at two points which are at a considerable distance from one another and correspond to the points 49 and 50 of the exemplary embodiments according to FIGS. 1 and 5. The clearance space axially between these two points 49 and 50 and radially between the piston 36 and the cylinder 37, unlike in the exemplary embodiments according to FIGS. 1 and 5, is not filled with pressure fluid but is now connected via radial holes 104 in the outer part 44 of the piston 36 to the annular groove 57 accommodating the helical compression spring 60 and thus to the atmosphere. Accordingly, the guidance of the piston 36 at the point 50 need not be tight. On the other hand, there must be a sound seal at the point 49 and at the passage of the piston 28 through the base 38 of the cylinder 37. In the exemplary embodiment according to FIG. 7, therefore, sealing rings 106 which are permanent magnets are used at the point 49 and between the piston 28 and the base 38 of the cylinder 37. Located in the pressure space 35 is a pressure fluid which is magnetorheological. Such a fluid has a viscosity which depends on the strength of a magnetic field passing through it. The stronger the magnetic field, the higher the viscosity. Thus the pressure fluid used in the exemplary embodiment according to FIG. 7 in the region of the sealing rings 106 is highly viscous, so that an extremely effective seal is possible.

Made in the outside of the tube 94 of the cylinder 37 is a spiral groove 97 which is fluidically connected to the pressure space 35 via a plurality of radial holes 98 passing through the tube 94. Compared with the exemplary embodiment according to FIG. 6, the tube 94 is surrounded by a very thin-walled outer tube 92 which bears against the inner tube 94 when there is absence of force between the individual turns of the spiral groove 97. The outer tube 92 therefore does not give way inwardly during the final machining of its outside, e.g. by grinding, so that the hydraulic unit 12 can be produced with an accurate external dimension and there is little risk of jamming in the bore 9 during the regulating movement. The tube 92 bears with a certain prestress against the tube 94, so that the pressure which occurs in the pressure space 35 during the regulating movement and which is thus also applied in the spiral groove 97 still cannot widen the tube 92 outward.

In FIG. 7, the hydraulic unit is shown in a state in which the mold of an injection molding machine for plastics is completely open. The restoring plate 29 of the small piston 28 bears against the large piston 36 and the latter in turn bears against the cylinder 37. If the mold is now to be closed, the small piston 28 is moved to the right in the view according to FIG. 7. If the pressure in the pressure space 35 was already sufficiently high at the start, the large piston 36 directly follows the movement of the small piston 28 and also carries along the cylinder 37 via the helical compression spring 60. In the process, the pressure in the pressure space 35, which is also applied in the spiral groove 97, is not yet sufficient in order to widen the outer tube 92. Finally, if the mold is closed, a high resistance opposes the further movement of the large piston 36 and the pressure in the pressure space 35 increases as the small piston 28 plunges deeper into the pressure space 35, of which the cavity in the piston 36 is a part. First of all, the helical compression spring 60, subjected to appropriately high preloading, prevents the cylinder 37 from giving way to the left. Finally, by further pressure increase, the outer tube 92 is widened, so that it abuts on the inside against the wall of the bore 9. The cylinder 37 is then held by clamping in the bore 9, and, by further movement of the small piston 28, the pressure in the pressure space 35 can be further increased in order to exert a high locking force for the mold.

The exemplary embodiments according to FIGS. 8, 9 and 10 are only shown in a highly schematic manner and are therefore also described below without dealing with every detail.

According to FIG. 8, the eighth exemplary embodiment also has a cylinder 37 with a base 38, a small piston 28 with a restoring plate 29, and a large piston 36 which is loaded by a helical compression spring 60 in the direction of the base 38 of the cylinder 37. As in the exemplary embodiments according to FIGS. 6 and 7, in that according to FIG. 8 various components also fulfill the guidance function for the large piston 36 and the function for clamping the cylinder 37 in the bore 9. Outside the guide wall 94 for the piston 36, the cylinder 37 has an annular passage 110 in which an annular wedge 111 is located approximately centrally, this annular wedge 111 bearing on the outside against the guide wall 94 and running conically on the outside from its one end face to the other end face in a conical or wedge surface 112. Located on the one side of the annular wedge 111 is an annular piston 113 which, on its side remote from the annular wedge 111, defines an annular space 114 which is fluidically connected to the pressure space 35 via passages 115. The annular wedge 111 has its largest outside diameter at its axial end face facing the piston 113. A spring stack of several disk springs 116 is secured in position between the end face of the wedge 111 having the smaller outside diameter and the one end of the annular passage 110. An outer annular wedge 117 having a conical or wedge surface 118 rests on the annular wedge 111. This annular wedge 117 is held in an axially secure position in an aperture 119, leading outward from the annular passage 110, of the cylinder 37 and is able to bear against the wall of the bore 9. It has a slot so that it can expand radially. However, it may also be replaced by individual separate outer wedges.

In FIG. 8, the hydraulic unit 12 is shown in a state as assumed by it during the regulating movement of a movable platen of an injection molding machine for plastics. The restoring plate 29 of the small piston 28 bears against the large piston 36 and the latter bears against the base 38 of the cylinder 37. The pressure prevailing in the pressure space 35 and thus also in the annular space 114 is not able to displace the piston 113 and the wedge 111 against the disk springs 116. The wedge 117 is at a small distance from the wall of the bore 9 or slides along the wall virtually without any applied pressure. It is not until the mold is closed and the pressure in the pressure space 35 and in the annular space 114 increases above a certain value that the piston 113 displaces the wedge 111 against the force of the disk springs 116, as a result of which the wedge 117 is pressed outward against the wall of the bore 9. Since no movement can take place axially between the wedge 117 and the cylinder 37, the cylinder is locked by the clamping of the wedge 117 in its position. During the opening of the mold, the pressure in the pressure space 35 and in the annular space 114 decreases and the disk springs 116 are able to release the clamping between the wedges 111 and 117 and thus between the wedge 117 and the machine frame. The entire hydraulic unit 12 can be moved back into its initial position.

In the ninth exemplary embodiment according to FIG. 9, as in the eighth exemplary embodiment in FIG. 8, the small piston 28, the large piston 36, the cylinder 37 and the compression spring 60 loading the large piston in the direction of the base 38 of the cylinder 37 are also shown. The platen 125 of an injection molding machine for plastics can also be seen, this platen 125 being fastened to the loose piston 36 and being guided in a movable manner on longitudinal spars 124. The spars 124 also pass through the cylinder 37. Outside the spars 124, the cylinder 37, as in the exemplary embodiment according to FIG. 8, has an annular passage 110, in which an annular wedge 111 is again accommodated, and this annular wedge 111 can be loaded in the one direction by a piston 113 and in the opposite direction by a spring stack of disk springs 116. However, this wedge 111 is now the outer wedge of two wedges and interacts with an inner wedge or several wedges 117 corresponding to the number of spars. These wedges 117 are in turn accommodated in an axially secure position in apertures 119 of the cylinder 37, which, however, now open the annular passage 110 toward the spars 124. An annular space 114 behind the annular piston 113 is again fluidically connected to the pressure space 35 by one or more connecting passages 115. As in the exemplary embodiment according to FIG. 8, the cylinder 37 in that according to FIG. 9 is also clamped in place by the action of the wedges 111 and 117 during a pressure increase in the pressure space 35 above a certain value. The cylinder 37 is not clamped in place toward the outside in a bore of a machine part but is now clamped in place relative to the spars 124 guiding the platen 125.

Also in the exemplary embodiment according to FIG. 10, the cylinder 37 of the hydraulic unit 12 is clamped with the spars 124 of an injection molding machine for plastics. The exemplary embodiment according to FIG. 10, in the same way as that according to FIG. 9, has a small piston 28 and a large piston 36, to which the movable platen 125 is fastened and which is loaded by the helical compression spring 60 in the direction of the base 38 of the cylinder 37. The arrangement of the two wedges 111 and 117 is also the same as in the exemplary embodiment according to FIG. 9. However, the stack of disk springs 116 and the annular piston 113 are now transposed. The disk springs 116 act on the outer wedge 111 for clamping the cylinder 37 with the spars 124. The annular piston 113 adjoins an annular space 126 which, in a manner not shown, can be connected via a valve to a pressure-medium source or relieved to a pressure-medium supply reservoir.

If the annular space 126 is connected to the pressure-medium supply reservoir, no external force counteracts the disk springs 116. The disk springs 116 are therefore able to displace the wedge 111 to the right in the view according to FIG. 10, as a result of which the wedge or wedges 117 are pressed against the spars 124 and the cylinder 37 is clamped with the spars 124. By the feeding of pressure medium into the annular space 126, the clamping by the wedge 117 is released against the force of the disk springs 116.

In the exemplary embodiment according to FIG. 10, it is possible, irrespective of the build-up of pressure in the pressure space 35, to clamp the cylinder 37 in place at any desired point of the travel, e.g. at a short distance from the closing position of the platen 125. In this case, the clamping is ensured with a high degree of certainty, since this is effected via the disk springs 116 and not by a separate external drive. If this drive fails, the cylinder 37 is clamped immediately.

Of course, the disk springs 116 and the piston 113 may also be transposed relative to the wedges 111 and 117 in the exemplary embodiment according to FIG. 8. It is likewise possible to reverse the inclination of the wedge surfaces 112 and 118, in which case, in order to achieve the same functioning as in FIG. 8, the stack of disk springs 116 and the annular piston 113 must of course also be transposed.

In an exemplary embodiment in which the cylinder 37 is not clamped by the pressure in the pressure space 35 but is, as it were, separately clamped, as is the case in the exemplary embodiment according to FIG. 10, the helical compression spring 60 need only be preloaded to such an extent that it can transmit the force required for accelerating and moving the platen 125 and the cylinder 37. The pressure in the pressure space 35 builds up independently of the helical compression spring 60.

The small piston 28 with the restoring plate 29, the large piston 36, the cylinder 37, and the helical compression spring 60 of the hydraulic unit 12 can again be seen in the exemplary embodiment according to FIG. 11. The large piston 36, at an outer flange 45 on its end close to the base 38 of the cylinder 37, is tightly guided in a sliding manner on the envelope of this cylinder. A second guide point having a small diameter is located on the flange 40 of the cylinder 37.

The cylinder 37 is not located in a bore 9 of the machine frame, which has essentially the same diameter throughout, but is now located in a blind hole 127 having a base 128. Formed between the latter and the base 38 of the cylinder 37 is a second pressure space 129, the outside diameter of which corresponds to the outside diameter of the cylinder 37 and the inside diameter of which corresponds to the outside diameter of a bush 130 in which the small piston 28 of the hydraulic unit 12 is tightly guided. The bush 130 also passes through the base 128 and is sealed off relative to the latter. This ensures that the pressure media, which are possibly different, from the pressure spaces 35 and 129 do not intermix.

Pressure medium from a pressure-medium supply reservoir 131 can flow to the pressure space 129. Likewise, pressure medium can be displaced from the pressure space 129 into the pressure-medium supply reservoir 131. The fluidic connection between pressure space 129 and pressure-medium supply reservoir 131 is controlled with a check valve 132, which stops the flow from the pressure space 129 to the pressure-medium supply reservoir 131, and a 2/2-way directional seat valve 133 which is arranged in a bypass of the check valve 132, stops the flow in a rest position and can be brought into a straight-through position by an electromagnet. The pressure-medium supply reservoir 131 may be open to the atmosphere. However, it may also be closed off from the atmosphere by a diaphragm 134 as indicated in FIG. 11a. The diaphragm may be under a certain prestress, so that the pressure medium is always acted upon by a pressure which is above the atmospheric pressure.

In FIG. 11, the hydraulic unit 12 is shown in a state in which the movable platen of an injection molding machine for plastics assumes the end position assigned to the open mold. If the mold is now to be closed, the piston 28, as in all the other exemplary embodiments, is also moved to the right in the view according to FIG. 11 and in the process also moves the large piston 36 and the cylinder 37 in this direction. The pressure space 129 increases and pressure medium flows into it from the supply reservoir 131 via the check valve 132. If the mold is closed, the pressure in the pressure space 35 increases, so that the cylinder 37 is acted upon by a force directed to the left. The cylinder 37 is held in its position against this force by the pressure medium trapped in the pressure space 129, a pressure building up in the pressure space 129 which produces a force on the base 38 of the cylinder 37, this force balancing the force produced on the base 38 by the pressure in the pressure space 35 together with the force of the helical compression spring 60.

If the mold is to be opened, first of all the pressure in the pressure space 35 is reduced by retracting the small piston 28, as a result of which the large piston 36 moves up to the base 38 of the cylinder 37. Then the valve 133 is put into its straight-through position, so that, during the subsequent retraction of the hydraulic unit 12 and the movable platen fastened to the large piston, pressure medium can be displaced from the pressure space 129 into the pressure-medium supply reservoir 131.

In the exemplary embodiment according to FIG. 12, the movable platen 125 is movably guided on two spars 124 and, as in the exemplary embodiment according to FIG. 7, is connected to the large piston 36 of the hydraulic unit 12 via a connecting piece 104. The hydraulic unit 12 is formed essentially in the same way as in the exemplary embodiment according to FIG. 7. One difference consists essentially only in the fact that the cylinder 37 is not formed with a double wall but rather has only one dimensionally stable envelope 94. In addition, the hydraulic unit 12 is not located in a bore of the machine frame but between the spars 124.

The spars 124 are put through a fixed supporting plate 140 at a distance from the movable platen 125 and are firmly connected to this supporting plate 140. Also fastened to the supporting plate 140 is the electric motor 11, which essentially corresponds to the electric motor 11 from FIG. 1 or from FIG. 5 and whose parts are therefore provided with the same designations as in FIGS. 1 and 5.

The essential difference from the motors according to FIGS. 1 and 5 consists in the fact that the hollow drive shaft 19 is widened in front of the housing flange 15 to form a flange 141 which forms the input part of a slip clutch 142. A hollow spindle 143, through which the stroke spindle 25 passes centrally, can be driven by the electric motor 11 via this slip clutch 142, and this hollow spindle 143 is provided with an external thread 144 having the same pitch as the external thread 27 of the stroke spindle 25 and has a flange 145 axially opposite the flange 141. The hollow spindle 143 is axially supported on the hollow shaft 19 of the electric motor via a rolling-contact bearing 146. The hollow shaft 19 in turn is supported on the supporting plate 140 via a rolling-contact bearing 147. The rolling-contact bearing 146 and the slip clutch 142 are matched to one another in such a way that the friction linings of the slip clutch can only be pressed against one another up to a certain force. Forces exceeding this force are transmitted directly to the hollow shaft 19 via the rolling-contact bearing 146. The external thread 144 of the hollow spindle 143 is in engagement with the internal thread 148 of a spindle nut 149 which is guided on the spars 124 and acts as an axial stop for the cylinder 37. Secured in position between the latter and the spindle nut 149 is a helical compression spring 150 which attempts to push the two parts apart axially, the distance between the two parts possibly being a few tenths of a mm. The position of the restoring plate 29 on the small piston 28 is of course designed for such a distance. The threads 144 and 148 are Trapezoidal threads which intermesh in a self-locking manner.

To close the mold, the electric motor 11 drives the stroke spindle 25 via the hollow shaft 19 and at the same time the hollow spindle 143 via the slip clutch 142. Since the intermeshing threads between hollow shaft 19 and stroke spindle 25 have the same pitch as the intermeshing threads 144 and 148 of hollow spindle 143 and spindle nut 149, the spindle nut 149 moves at the same speed as the stroke spindle 25. It thus runs behind the cylinder 37 of the power transmission means 12 at the distance ensured by the spring 150.

As soon as the mold is closed, the pressure in the pressure space 35 increases, so that the cylinder 37 gives way to the rear until the clearance between it and the spindle nut 149 has been used up. Further rotation of the hollow shaft 19 leads to an increase in the moment in the Trapezoidal threads 144 and 148. The slip clutch 142 slips, so that subsequently only the small piston 28 of the hydraulic unit 12 continues to be moved and, since the cylinder 37 is axially supported via the spindle nut 149, the closing force is produced by build-up of pressure in the pressure space 35 via the large piston 36 of the hydraulic unit 12.

During opening of the mold, the hollow shaft 19 rotates in the opposite direction, so that the small piston 28 is moved back and the pressure in the pressure space 35 is reduced. The compression spring 150 pushes the cylinder 37 up to the piston 36 and the latter up to the restoring disk 29 and resets the distance between the cylinder 37 and the spindle nut 149. The moment in the screw drive 144, 149 drops, the slip clutch 142 engages and the spindle nut 149 is moved back via the hollow spindle 143.

If it is to be possible to be able to stop the spindle nut 149 irrespective of the increase in the friction moment between it and the hollow spindle 143, a brake 150 may be provided for the hollow spindle 143, as indicated in FIG. 12. There, the flange 145 of the hollow spindle 143 is enlarged outward to form a type of brake disk, against which brake shoes 151 can be pressed. The cylinder 37 of the hydraulic unit 12 can then be supported in a position which does not correspond to the closing position of the platen 125.

The exemplary embodiment according to FIG. 13, with regard to the fixed supporting plate 140, the spars 124, the movable platen 125, is identical to the exemplary embodiment according to FIG. 12. The electric motor 11 is largely the same as the electric motor 11 from FIG. 12 but now again has a simple hollow drive shaft 19. Its housing 13, unlike the previously shown electric motors 11 from FIGS. 1, 5 and 12, is provided with an extension 155 which points toward the hydraulic unit 12 and has an external thread 156. The construction of the hydraulic unit 12 according to FIG. 13 is in principle identical to the construction of the hydraulic unit according to FIG. 12. An outer flange 157 of the cylinder 37 is merely set back slightly relative to an end face of the cylinder.

A rolling-contact thrust bearing 159 is arranged between the flange 157 and a plate 158 which is located in front of this flange toward the electric motor 11 and is rotatable relative to the cylinder 37, via which rolling-contact thrust bearing 159 the plate and the cylinder can be supported axially against one another. The plate 158 is coupled in the direction of rotation to a nut 160 which, with an internal thread 161, engages in the external thread 156 of the housing extension 155. The two threads 156 and 161 are again formed so as to be self-locking. Secured axially in position between the nut 160 and the plate 158 is a compression spring which has the same function as the compression spring 150 from FIG. 12 and is therefore likewise provided with the designation 150. This compression spring attempts to hold the plate 158 at a small axial distance of a few tenths of a mm from the nut 160. For the rotary driving, the nut 160, with individual claws, engages in the plate 158, the axial distance also existing between the claws and the plate 158. The nut 160 is provided on the outside with a tooth system, with which it meshes with a gear 162 which can be driven by a second, smaller electric motor 163. The electric motor 163 is arranged in a fixed position. The gear 162 has the appropriate axial length, so that it remains in engagement with the nut 160 within the entire range of movement of the latter.

During the closing of the mold, the electric motor 11 and the electric motor 163 are driven at such rotational speeds that the spindle 25 and the nut 160 move forward with the same axial speed. The small distance between the nut 160 and the plate 158 ensures that the hydraulic unit 12 is not loaded via the nut 160 and possible jamming of the drives does not occur. Since the rotational speeds of the electric motors 11 and 163 are selectable, the threads 156 and 161 need not have the same pitch as the external thread on the stroke spindle 25 and the internal thread on the hollow shaft 19 of the electric motor 11. Otherwise, the sequence of movement in the exemplary embodiment according to FIG. 13 is the same as in that according to FIG. 12, so that reference shall be made here only to the corresponding parts of the description.

There are also two electric motors in the exemplary embodiment according to FIG. 14 in order to drive, firstly, a stroke spindle 25 which has a section constituting the small piston 28 of the hydraulic unit 12 and an axial stop for the cylinder 37 of the hydraulic unit 12. In a different manner from that shown previously, the electric motor 170 for the drive of the recirculating ball spindle 25 is now arranged in a fixed position eccentrically to the latter and drives a spindle nut 172 via a pinion 171, this spindle nut 172 having an internal thread which is in engagement with the thread of the screw spindle 25 via balls 28. To this extent, the spindle nut 172 fulfills the function of the hollow shaft 19 of exemplary embodiments already described and, like the latter, is also axially supported via a rolling-contact bearing 147.

A hollow spindle 174 is rotatably mounted on the spindle nut 172 via radial bearings 173. This hollow-spindle is supported axially on the spindle nut 172 via a rolling-contact thrust bearing 175 and maintains its axial position during operation. It is provided in sections on the outside with a tooth system 176, with which it meshes with a pinion 162 which can be driven by the electric motor 163. In addition, the hollow spindle 174 is provided on the outside in sections with a trapezoidal thread 144, with which it engages in a trapezoidal thread 148 on the inside on a hollow body 177 formed in one piece with the cylinder 37 of the hydraulic unit. The engagement of the threads 144 and 148 is again self-locking.

With regard to the large piston 36, the helical compression spring 60 and the engagement of a restoring plate 29 of the small piston 28 on individual inwardly projecting claws 178 of the large piston 36, the exemplary embodiment according to FIG. 14 is identical to that according to FIG. 11.

In the exemplary embodiment according to FIG. 14, in order to close the mold, the two electric motors 163 and 170 are operated at such rotational speeds that the rate of motion imposed on the cylinder 37 via the stroke spindle 25 is identical to that which results from the rotation of the hollow spindle 174 relative to the hollow body 177, which is guided longitudinally in a rotationally locked manner with the cylinder 37. In this case, there is certain play in the threads 144 and 148, which has the function of the axial distance between the spindle nut 149 and the cylinder 37 in the exemplary embodiment according to FIG. 12 and between the nut 160 and the plate 158 in the exemplary embodiment according to FIG. 13. The hollow spindle 147 is thus only freely rotated by the electric motor 163.

To close the mold, the electric motor 170 drives the spindle nut 172, so that the spindle 25 and with it the large piston 36 and, carried along via the helical compression spring 60, the cylinder 37 travel in the closing direction. The electric motor 163 is driven in such a way that the movement of the cylinder 37 is not impaired by the rotation of the hollow spindle 174. If the mold is closed, the electric motor 163 is stopped, and the cylinder 37, via the thread turns still in engagement, is supported on the hollow spindle 174 and via the latter is supported on the frame of the machine via the rolling-contact bearing 175, the spindle nut 172 and the rolling-contact bearing 147 when the high locking pressure is built up by further plunging of the small piston 28 into the pressure space 35.

During the opening of the mold, first of all the pressure in the pressure space 35 is reduced by retraction of the small piston 28, so that the piston 28 again moves up to the cylinder 37 and carries the latter along to the rear. The electric motor 163 is driven in the opposite direction compared with the closing of the mold and freely rotates the hollow spindle 174 with it.

The exemplary embodiment according to FIG. 15, in the construction of the cylinder 37 of the hydraulic unit 12, is similar to the exemplary embodiment according to FIG. 7. The cylinder 37 has a base 38, a flange 40 and an inner tube 94, which runs between these two parts and which has a large wall thickness and is accordingly dimensionally stable, and a thin-walled outer tube 92 surrounding the tube 94. The base 38 and flange 40 overlap the end faces of both the tube 94, to which they are firmly screwed with machine screws, and the tube 42, which is held axially free of clearance between base and flange. Axially within two radial seals which are arranged close to the base and flange between the two tubes 92 and 94, there is a small distance between the two tubes which has produced an annular admission space 183.

According to FIG. 15, the large piston 36 is formed as a stepped piston and is axially guided in the tube 94 approximately in the center of its longitudinal extent at the section 181 having the large diameter. With the section 182 of smaller diameter, the piston 36 projects from the cylinder 37 through the flange 40. The piston 36 may also be axially guided at the section 182, for example on the flange 40. A helical compression spring 60 is secured in position at the step between the two sections 181 and 182 of the piston 36, on the one hand, and at an inner collar of the tube 94 of the cylinder 37, on the other hand, this helical compression spring 60 loading the piston 36 and the cylinder 37 for retracting the piston 36 into the cylinder 37. The space in which the spring 60 is located is open to the atmosphere. Close to the step, in addition to the guidance point, a sealing point is also located between the section 181 of the piston 36 and the tube 94 of the cylinder 37. In front of the guidance and sealing point, the section 181 of the piston 36 is turned down slightly on the outside up to the end face 184 facing the base 38 of the cylinder 37. The annular space which is produced as a result is part of the pressure space 35. Leading through the tube 94 are radial holes 98, via which the admission space 183 is fluidically connected to said annular space and thus to the pressure space 35.

The small piston 28 of the power transmission means 12 enters the pressure space 35 through a guide and sealing bush 185 inserted into the base 38 of the cylinder 37 and projects into the piston 36. In the latter, the small piston 28 first of all crosses a cavity (clutch space) 186 of circular-cylindrical cross section before it plunges into a blind hole 56 starting from the cavity. The blind hole 56, via passages 187 in the piston 36, which open freely into said blind hole 56 irrespective of the relative position of the two pistons, is connected to the outer annular space at the section 181 and thus to part of the pressure space 35. Inside the clutch space 186, the cross-sectional area of which is substantially larger than the cross-sectional area of the piston 28 and which is sealed off both toward the space in front of the end face 184 of the piston 36 and toward the blind hole 56 in each case by a seal between the pistons 28 and 36, the piston 28 carries a separating disk 188 which divides the clutch space 186 into two sectional spaces sealed off from one another. Two check valves 189 and 190 used as clamping valves are inserted into the separating disk in an antiparallel arrangement, the closing springs of these check valves 189 and 190 being preloaded to a pressure of, for example, up to 20 bar. The preloading of the two closing springs is different. The small piston 28 has the same diameter on both sides of the separating disk 188, so that, with the separating disk 188 included, it forms with the large piston a type of synchronous cylinder. The parts just described form a hydraulic slip clutch 180 which firmly couples the two pistons to one another up to a certain force to be transmitted, which is different in the opposed directions.

Also in the exemplary embodiment according to FIG. 15, the small piston 28 is a section of a stroke spindle 25 which is locked against rotation. The stroke spindle interacts with a spindle nut 192 mounted on the machine frame 10 independently of the electric motor 11. The electric motor 11 is a conventional variable-speed motor, is fastened to the machine frame outside the axis of the stroke spindle 25 and drives the spindle nut 192 via a belt 193.

In FIG. 15, the hydraulic unit is shown in a state in which the mold of an injection molding machine for plastics is completely open. The large piston 36, with its end face 184, is located at the base 38 of the cylinder 37 preferably via short spacers. The small piston 28 assumes a position in which the separating disk 188 is located at the end of the clutch space 186. If the mold is now to be closed, the small piston 28 and with it the separating disk 188 are moved to the right in the view according to FIG. 15 by appropriate activation of the electric motor 11. The movement of the separating disk, via the pressure fluid in the clutch space 186, this pressure fluid being prestressed to a certain pressure, is transmitted directly to the large piston 36 and thus to the movable platen. The large piston 36 also carries along the cylinder 37 via the helical compression spring 60. The pressure in the pressure space 35 does not change.

Once the mold has finally been closed, a high resistance opposes the further movement of the large piston 36. The piston 28, on the other hand, continues to move and plunges deeper into the blind hole 56, from which pressure fluid is displaced via the passages 187. As a result, the pressure in the pressure space 35 increases. First of all, the helical compression spring 60, preloaded to an appropriately high degree, still prevents the cylinder 37 from giving way to the left. Finally, by further pressure increase in the pressure space 35, the outer tube 92 is widened, so that it abuts against the wall of the bore 9 on the inside. The cylinder 37 is then held by clamping in the bore 9, so that, by further movement of the small piston 28, the pressure in the pressure space 35 can be increased further in order to exert a high locking force for the mold. During the movement of the piston 28 relative to the piston 36, pressure fluid, via the one check valve 189, flows over from a (first) sectional space into the other (second) sectional space of the clutch space 186.

To open the mold, the electric motor 11 is driven in the opposite rotary direction, so that the piston 28, as viewed according to FIG. 15, moves to the left. The check valve 190 is only slightly preloaded and opens, so that pressure fluid can flow back inside the clutch space 186 from the second sectional space into the first sectional space. The pressure in the pressure space 35 is reduced. Finally, the piston 28 carries along the piston 36 and the latter carries along the cylinder 37 in the opening direction of the mold.

Also in the exemplary embodiment according to FIG. 16, the cylinder 37 of the power transmission means 12 has a base 38, a flange 40 and an inner dimensionally stable tube 94 running between these two parts and a thin-walled outer tube 92 surrounding the tube 94. Unlike in the exemplary embodiment according to FIG. 15, however, the tube 92 does not itself bear directly against the wall of the machine frame 10. Rather, the tube 92 is surrounded on the outside by a plurality of individual brake rods 196 which, when resting on the relieved tube 92, complement one another to form a closed ring and which are overlapped radially by the base 38 and the flange 40 and are held axially between base and flange with slight play which permits their free mobility in the radial direction. Each brake rod 196 is provided with a brake lining 197 on the outside. In the relieved state of the tube 92, the brake rods are at a distance from the wall of the machine frame 10. Again located between the tubes 92 and 94 is the annular admission space 183, which is fluidically connected to the pressure space 35 via radial holes 98 running through the tube 94.

Compared with the representation according to FIG. 15, the large piston 36 is depicted in slightly more detail from the design point of view in FIG. 16. A two-piece construction of the piston 36 can be seen in FIG. 16, the one part 182 having essentially a small diameter and emerging outward through the flange 40, and the other part 181 with the larger diameter serving to guide the piston and seal off the pressure space 35. A helical compression spring 60 is again secured in position between the piston 36 and the cylinder 37.

Like the piston 36 from FIG. 15, the piston 36 of the exemplary embodiment according to FIG. 16 also has in the interior a cavity (clutch space) 186 which accommodates a coupling device 195 for coupling the two pistons 36 and 28. This coupling device is an electromagnetically actuated clutch, the electric coil 198 of which is accommodated by an annular groove 199 which is open toward the space 186 and is sunk into that wall of the piston 36 which closes off the clutch space 186 toward the base 38 of the cylinder 37. The clutch space 186 is connected to the atmosphere via holes 200 and the space accommodating the spring 60.

The small piston 28, with a certain diameter, enters the pressure space 35 in a sealed-off manner through the base 38 of the cylinder 37. Its cross section is reduced therein in a step 201, following which is a piston extension 202 of smaller diameter. After crossing a blind hole 56 of the piston 36, this blind hole 36 being open toward the base 38 of the cylinder 37 and its diameter being so large that the piston 28 can plunge into it with its larger diameter, the piston extension 202 enters the clutch space 186 in a sealed-off manner. Inside this space, an armature plate 203 of the clutch 195 is fastened to the piston extension. The yoke of the electromagnetic clutch 195 is formed by the one part of the piston 36.

In FIG. 16, the hydraulic unit is shown in a state in which the mold of an injection molding machine for plastics is completely open. The large piston 36, with its end face 184, is located at the base 38 of the cylinder 37 via short spacers. The small piston 28 assumes a position in which the armature plate 203 is located at the yoke. If the mold is now to be closed, the coil 198 is energized, that is to say the clutch 195 comes into effect and the small piston 28 is moved to the right in the view according to FIG. 16 by appropriate activation of the electric motor 11. Via the armature plate 203, the large piston 36 is carried along synchronously and thus the movable platen is moved. The large piston 36 also carries along the cylinder 37 via the helical compression spring 60. The pressure in the pressure space 35 does not change.

Once the mold has finally been closed, a high resistance opposes the further movement of the large piston 36. The coil 198 is de-energized. The piston 28 continues to move and plunges deeper into the blind hole 56 and displaces pressure fluid with its annular surface 201. As a result, the pressure in the pressure space 35 increases. First of all, the helical compression spring 60, preloaded to an appropriately high degree, still prevents the cylinder 37 from giving way to the left. Finally, by further pressure increase in the pressure space 35, the outer tube 92 is widened, so that the brake rods 196 abut on the inside against the wall of the bore 9. The cylinder 37 is then held by clamping in the bore 9, and the pressure in the pressure space 35 can be increased further by further movement of the small piston 28, so that the preloading force of the spring 60 is overcome and the high locking force for the mold is built up.

To open the mold, the electric motor 11 is driven in the opposite rotary direction, so that the piston 28, as viewed according to FIG. 16, moves to the left. In the process, the piston 36 is also carried along without engaged clutch 195.

The exemplary embodiment according to FIG. 19 is completely identical to the exemplary embodiment according to FIG. 16 insofar as this has just been described. To this extent, therefore, the same designations have been entered without the description being repeated here.

Unlike the exemplary embodiment according to FIG. 16, the cylinder 37 of the hydraulic unit 12 in that according to FIG. 19 can also be locked without a resistance which opposes the movement of the large piston 36. To this end, the machine frame has individual radial openings 210 which are distributed over the periphery of the bore 9 and open into the latter and into which brake shoes 211 which can be loaded hydraulically toward the inside are inserted. On the outside, each opening 210 is closed by a cap 212 having a central connection hole 213. Via the latter, external pressure fluid, that is pressure fluid which is not exchanged with the pressure space 35, can pass into the admission spaces 183 between the brake shoes and the caps and flow off from there. The hydraulic circuit for the pressure-medium supply of the brake shoes 211 is a closed circuit and comprises a hydraulic pump 214 of constant stroke volume, which can be driven by a small electric motor 209, a low-pressure hydraulic accumulator 215 in a low-pressure branch and a high-pressure hydraulic accumulator 216 in a high-pressure branch of the circuit. The high-pressure branch, via a 2/2-way directional seat valve 217, and the low-pressure branch, via a 2/2-way directional seat valve 218, can be connected to the admission spaces 183 or can be shut off from the latter. The two valves 217 and 218 are each actuated by an electromagnet. Arranged between the hydraulic accumulator 216 and the hydraulic pump 214 is a check valve 219 shutting off toward the latter, so that the hydraulic accumulator 216 does not discharge via the hydraulic pump when the latter is stopped. The hydraulic components 214, 215, 216, 217, 218 and 219 are located in a fixed position on the machine frame 10.

The cylinder 37 has a base 38 enlarged like a pot and having an envelope 220 which is so long that the brake shoes 211 can be pressed against it within the range of movement provided in every position of the cylinder.

The exemplary embodiment according to FIG. 19 functions in exactly the same way as that according to FIG. 16. However, the cylinder 37 can be locked at any desired point even without a motion resistance for the large piston 36. Because no pressure is required in the pressure space 35 for locking the cylinder 37, the spring can be preloaded solely from the point of view that it can transmit the force required for carrying along the cylinder 37 by the piston 36 as far as possible without said spring having to be compressed further. The cylinder 37 then follows the piston 36 directly. It is then also conceivable to initially lock the cylinder with the brake shoes 211 and a relatively low external pressure and primarily by admission of pressure to the tube 92 after a pressure increase in the pressure space 35.

In addition, when the brake shoes 211 are to be inoperative, the valve 218 is operated, as shown in FIG. 19. The pressure in the low-pressure accumulator is slightly above atmospheric pressure, so that the brake shoes bear against the envelope 220 with a fairly low force. In order to press the brake shoes 211 against the cylinder 37, the valve 218 is put into the shut-off position and the valve 217 is opened. The compression quantity required for the pressure increase can now flow from the hydraulic accumulator 216 toward the admission spaces 183 behind the brake shoes 211. The brake acts very quickly.

The drive device according to FIG. 19 is especially suitable for "injection-compression molding". In this case, a movable platen is moved up close to a fixed platen by the piston 28 being moved when the clutch 195 is effective. The cylinder 37 is then locked by admission of pressure to the brake shoes 211. A molding compound is then injected between the two mold halves, the piston 36 being supported by bearing against the base 38 of the cylinder 37 and by the latter being locked directly on the machine frame 10. To compress the injected molding compound, the small piston 28, with clutch 195 released, is moved further and as a result the large piston 36 is moved together with the movable platen until coming to bear against the fixed platen, in the course of which the pressure in the pressure space 35 can be built up to a desired value.

From the design point of view, the exemplary embodiment according to FIG. 20 is largely identical to the exemplary embodiment according to FIG. 16 insofar as this has been described above. To this extent, therefore, the same reference numbers are entered without the description being repeated here.

The difference consists in the fact that, in the exemplary embodiment according to FIG. 20, there are no radial holes 98 passing through the tube 94, and external pressure medium can be fed to the annular admission space 183 between the two tubes 92 and 94 via a connection passage 221 leading outward through the tube 94 and the base 38. The hydraulic circuit for the pressure loading and relief of the admission space 183 is constructed in exactly the same way as in the exemplary embodiment according to FIG. 19 and comprises the hydraulic pump 214, which can be driven by the electric motor 209, the hydraulic accumulators 215 and 216 and also the valves 217, 218 and 219. These components are not fastened to the machine frame 10 but are now fastened to the cylinder 37, so that fixed bores or fixed tubing can be provided for the fluid paths of the circuit.

The functioning of the exemplary embodiment according to FIG. 20 corresponds to that of the exemplary embodiment according to FIG. 19, it being possible for a spring 60 subjected to relatively low preloading to be used again, since the pressure in the admission space 183 is built up independently of the spring force.

The construction of the exemplary embodiment according to FIG. 21, with regard to the clamping of the cylinder 37, is identical to the exemplary embodiment according to FIG. 16, so that the description in this respect can be dispensed with here. However, the corresponding designations are entered in FIG. 21.

Also in the exemplary embodiment according to FIG. 21, as in that according to FIG. 16, a small piston, which is designated by 228 on account of the completely different configuration from the exemplary embodiment according to FIG. 16, and the large piston 36 may be directly coupled to one another via an electromagnetically actuable clutch 195 which is located in a cavity (clutch space) 186 of the large piston. The electric coil 198 is again accommodated by an annular groove which is open toward the space 186 and is sunk in that end wall of the piston 36 which closes off the clutch space 186 toward the base 38 of the cylinder 37. The large piston 36, with a piston rod 42 which is smaller than the effective piston diameter and whose length is matched to the stroke, required for closing the mold, of the hydraulic unit 12 and which is fastened to the movable platen (not shown), emerges from the cylinder 37 through the flange 40 of the latter. The piston rod is hollow throughout from its outer end right into the clutch space 186, the cavity being designated by 231 and being essentially circular in cross section. A narrow groove 232 runs axially along merely in the wall of the cavity. The clutch space 186 is connected to atmosphere via the cavity 231.

The small piston 228 is composed essentially of three hollow disk- or bush-shaped parts and is very short overall. A first bush 233 is guided with a certain diameter in the base 38 of the cylinder 37 in such a way as to be sealed off to the outside. The cross section of the bush 233 decreases in a step or annular surface 201 which, in the state shown in FIG. 21 and corresponding to an open injection mold, is located inside the base 38 and, depending on the travel of the small piston relative to the large piston during the build-up of the locking force, remains in the base or emerges more or less from the base. The respectively free annular space in front of the annular surface 201 is part of the pressure space 35 defined by the two pistons and the cylinder. With the smaller cross section, the bush 233 enters the clutch space 186 in a sealed-off manner through the above-mentioned end wall of the large piston 36 and has an adjoining external thread on an extension which is stepped once again.

A second bush 234 of the piston 228 is formed as a spindle nut and is guided in an axially displaceable manner in the cavity 231 of the large piston 36 via a plain bearing 235. In the state of the hydraulic unit 12 according to FIG. 21, the spindle nut 234 is located at that end of the cavity 231 which opens into the clutch space 186. Toward the part 233, the spindle nut 234 has an extension which is provided with an internal thread and with which it is screwed to the bush 233. A disk 203, as a third part of the piston 228, is clamped in place axially between the extension of the spindle nut 234 and the bush 233, this disk 203 extending radially beyond the coil 198 and forming the armature of the clutch 195. With a radially projecting nose 236, the spindle nut 234 engages in the groove 232 of the piston 36, so that the small piston 228 cannot be rotated relative to the large piston 36. Since, on the other hand, the large piston is locked against rotation by the connection to the movable platen, the small piston 228 cannot rotate either. The clutch space 186 may be connected to atmosphere by, for example, a hole in the nose 236.

The hydraulic unit 12 is located in a tube 240 which is closed on both sides by a respective flange 241. Only the flange 241 toward which the base 38 of the cylinder 37 faces is shown in FIG. 21. The piston rod 42 can emerge from the tube 240 through the other flange. A rolling-contact bearing 242 is inserted into a central passage of the flange 241.

In a completely different manner from the exemplary embodiments described hitherto, the stroke spindle 25 is not arranged axially next to the hydraulic unit 12 and in front of the small piston, but now extends from an outer circular-cylindrical drive stub 243, which passes with an interference fit through the rolling-contact bearing 242 and projects outward beyond the flange 241, through the hollow small piston 228 and the hollow large piston 36 up to the other end of the tube 240. The stroke spindle 25, starting from a point close to the flange 241 and extending up to the other end, is provided with a recirculating ball screw, in which balls run along, which on the other hand also engage in the thread of the spindle nut 234 formed as a recirculating ball sleeve. The stroke spindle 25 cannot move axially but can only be driven in a rotational manner. To this end, a toothed disk 244 is fastened to the drive stub 243, and this toothed disk 244 is coupled via a toothed belt 246 to a second toothed disk 247 fastened to the drive shaft 245 of an electric motor 11. The electric motor 11 is located outside the tube 240 on the same side of the toothed disks 244 and 247 as the tube and is connected to the latter by a fastening flange 248, put onto the flange 241 and screwed together with the flange 241 to the tube 240, to form a construction unit.

It may also be mentioned that, in the exemplary embodiment according to FIG. 21, the helical compression spring 60 from the preceding exemplary embodiments is replaced by a disk spring stack 60.

In addition, it is also indicated in FIG. 21 that the power supply to the coil 198 is effected via a bore in the base of the piston 36, a tube 249 bridging the clutch space 186 outside the armature 203, a further bore in the piston 36, an annular space between the piston 36 and the cylinder 37, a bore in the cylinder 37 and an axial bore through the flange 40.

In FIG. 21, the hydraulic unit is shown in a state in which the mold of an injection molding machine for plastics is completely open. The large piston 36, with its end face 184, is located at the base 38 of the cylinder 37 via short spacers. The small piston 228 assumes a position in which the armature plate 203 is located at the yoke. If the mold is now to be closed, the coil 198 is energized, that is to say the clutch 195 is engaged. The electric motor 11 rotates the stroke spindle 25 in such a direction that the recirculating ball sleeve 234 and thus the entire small piston 228 is moved to the right in the view according to FIG. 21. Via the armature plate 203, the large piston 36 is carried along synchronously and thus the movable platen is moved. The large piston 36 also carries along the cylinder 37 via the disk spring stack 60. The pressure in the pressure space 35 does not change.

Once the mold has finally been closed, a high resistance opposes the further movement of the large piston 36. The coil 198 is de-energized. The piston 228 continues to move and displaces pressure fluid with its annular surface 201. As a result, the pressure in the pressure space 35 increases. First of all, the disk spring stack 60, preloaded to an appropriately high degree, still prevents the cylinder 37 from giving way to the left. Finally, by further pressure increase in the pressure space 35, the outer tube 92 is widened, so that the brake rods 196 abut on the inside against the tube 240. The cylinder 37 is then held by clamping in the tube 240, and the pressure in the pressure space 35 can be increased further by further movement of the small piston 228, so that the preloading force of the disk spring stack 60 is overcome and the high locking force for the mold is built up.

To open the mold, the electric motor 11 is driven in the opposite rotary direction, so that the piston 228, as viewed according to FIG. 21, moves to the left. In the process, the piston 36 is also carried along without engaged clutch 195.

The construction of the exemplary embodiment according to FIG. 22, with regard to the clamping of the cylinder 37 and the arrangement of the screw spindle 25, the hydraulic unit 12 and the electric motor 11, is identical to the construction of the exemplary embodiment according to FIG. 21, so that a description in this respect can be dispensed with here. However, the corresponding designations are entered in FIG. 22. The exemplary embodiment according to FIG. 22 is described below essentially only with regard to the differences from the exemplary embodiment according to FIG. 21.

There is a spindle nut in the form of a recirculating ball sleeve 253, which is located in a central passage of the cylinder flange 38 and is provided with an outer shoulder 254 in front of this flange 38. On the flange side, a hardened supporting disk 255 rests on the outer shoulder 254, and supported on said supporting disk 255 at equal angular distances apart are a plurality of little pistons 256, which are guided axially in holes, open toward the pressure space 35, of the flange 38, are pressed against the disk 255 by springs (not shown in any more detail in FIG. 22) and form in their entirety the small piston of the hydraulic unit 12. The pressure space 35, in the exemplary embodiment according to FIG. 22, comprises an annular sectional space which is defined radially on the outside by the cylinder tube 94, radially on the inside by a collar 257 integrally formed on the flange 38, and axially on the one side by the flange 38 and on the other side by an annular section 258, plunging in a sealed-off manner between the cylinder wall 94 and the collar 257, of the large piston 36.

Screwed into the cylinder flange 38 from outside is a small piston accumulator 260 which has a piston 261 which separates a pressure fluid space 262, fluidically connected to the pressure space 35 through the flange 38, from an air space 263 connected to atmosphere. Accommodated in the air space 263 is a helical compression spring 264 which loads the piston 261 in the direction for reducing the pressure fluid space 262. The travel of the piston 261 in the direction for increasing the pressure fluid space 262 and for greater loading of the spring 264 is limited by a stop in such a way that a pressure within the range of 5 to 10 bar in the pressure space 35 corresponds to the spring force when the piston 261 bears against the stop. This pressure is lower than the pressure equivalent to the force of the disk spring stack 60. With the piston accumulator 260, volumetric changes of the pressure fluid located in the pressure space 35 which accompany temperature changes can be compensated for without a substantial pressure change. On the other hand, if a pressure is to be built up in the pressure space 35 by retraction of the little pistons 256, pressure fluid can no longer be displaced into the piston accumulator 260 as soon as the piston 261 has reached the stop. The idle stroke of the little pistons 256 which is due to the piston accumulator 260 is therefore only small.

Whereas the electromagnetic clutch 195 in the exemplary embodiment according to FIG. 21 is arranged between the spindle nut and the small piston on the one hand and the large piston on the other hand, such a clutch in the exemplary embodiment according to FIG. 22 is located between the spindle nut 253 and the small piston 256 on the one hand and the cylinder 37 of the hydraulic unit 12. To this end, a yoke disk 267 located on the outside of the cylinder flange 38 and having a coil 198 is firmly held on the cylinder 37 at a distance from the flange via rods 268. An armature plate 203, which is fastened to the spindle nut 253, is located between the yoke disk 267 and the flange 38 and is firmly held on the yoke disk when the coil 198 is energized, so that the spindle nut 253 is then coupled to the cylinder 37 of the hydraulic unit 12.

In the exemplary embodiment according to FIG. 22, the second end of the screw spindle 25 is provided with a bearing journal 269, onto which the inner ring of a rolling-contact bearing 270 is pressed. The outer ring of the rolling-contact bearing is guided longitudinally in the cavity 231 of the large piston 36 and is locked against rotation. By the bearing 270, wobbling movements of the screw spindle 25 and thus accompanying alternating loading of the screw drive are avoided.

In FIG. 22, the hydraulic unit 12 is shown in a state in which the mold of an injection molding machine for plastics is completely open. The large piston 36 is located at the flange 38 of the cylinder 37. The little pistons 256 assume a position in which the armature plate 203 is located at the yoke disk 267. If the mold is now to be closed, the coil 198 is energized, that is to say the clutch 195 is engaged. The electric motor 11 rotates the stroke spindle 25 in such a direction that the recirculating ball sleeve 253 and thus the little pistons 256 are moved to the right in the view according to FIG. 22. Via the armature plate 203, the cylinder 37 and, via the latter, the large piston 36 are carried along synchronously and thus the movable platen is moved. In the meantime, the pressure in the pressure space 35 does not change.

If the mold has finally been closed, a high resistance opposes the further movement of the large piston 36. The coil 198 is de-energized. The spindle nut 253 and the little pistons 256 continue to move and displace pressure fluid. As a result, the pressure in the pressure space 35 increases. The piston 261 of the piston accumulator 260 reaches its stop. First of all, the disk spring stack 60, preloaded to an appropriately high degree, still prevents the cylinder 37 from giving way to the left. Finally, by further pressure increase in the pressure space 35, the outer tube 92 is widened, so that the brake rods 196 abut on the inside against the tube 240. The cylinder 37 is then held by clamping in the tube 240, and the pressure in the pressure space 35 can be increased further by further movement of the little pistons 256, so that the preloading force of the disk spring stack 60 is overcome and the high locking force for the mold is built up.

To open the mold, the electric motor 11 is driven in the opposite rotary direction, so that the spindle nut 253, as viewed according to FIG. 22, moves to the left. In the process, the cylinder 37 and, by the cylinder 37 via the disk spring stack 60, the large piston 36 are also carried along without engaged clutch 195. The little pistons 256 follow the supporting plate 253 on account of the springs which load them.

If the one end of the screw spindle 25, as can be seen from FIG. 22, is mounted directly in the large piston 36 via a rolling-contact bearing, the large piston 36 and the screw spindle must be in very precise alignment with one another, which requires high-precision and thus expensive production. On the other hand, a type of bearing arrangement according to FIG. 23 permits alignment errors between piston 36 and screw spindle 25 but at the same time prevents wobbling movements of the screw spindle. To this end, a radial movement of the rolling-contact bearing 270 and of the spindle end is permitted if the acting transverse force exceeds a certain magnitude.

According to FIG. 23, the outer ring 271 of the rolling-contact bearing 270 is pressed into a bush 272, the outside diameter of which is smaller than the diameter of the cavity 231 and which, with an inner collar 273, is located axially between two friction disks 274 and 275. The latter are guided one inside the other and are loaded toward one another by a spring 276 secured in position between them, so that the inner collar 273 of the bush 272 is clamped in place with a certain force between the two friction disks. The friction disk 274 is guided longitudinally in the piston 36 with tight radial clearance and is locked against rotation in the process.

Small forces which could be the cause of a wobbling movement while the screw spindle is being rotated cannot overcome the friction forces acting between the bush 272 and the friction disks 274 and 275, so that, to this extent, the end of the screw spindle 25 is kept steady and the type of bearing arrangement is that of a fixed bearing. However, an alignment error between the screw spindle 25 and the large piston 36, which alignment error will also change with a change in the relative position of the large piston relative to the screw spindle during a working cycle, causes transverse forces between the friction partners 272, 274 and 275 which exceed the friction forces and lead to a change in position between the bush 272 on the one hand and the friction disks 274 and 275 on the other hand, so that the bending stress, caused by the alignment error, of the screw spindle 25 and the stress of their bearings remains limited.

The exemplary embodiment according to FIG. 24, with regard to its mechanical construction, corresponds entirely to the exemplary embodiment according to FIG. 16. Therefore, all the designations from FIG. 16 are found in FIG. 24. Otherwise, reference is made to the corresponding parts of the description.

Additional components in the exemplary embodiment according to FIG. 24 are a hydraulic accumulator 280, which may be, for example, a piston accumulator or a bubble accumulator and is designed for a low pressure within a range of between 5 and 10 bar, and a 2/2-way directional seat valve 281, with which a fluid connection between the hydraulic accumulator 280 and the pressure space 35 can be controlled. In an off position of the valve 281, the fluid connection is shut off. By energizing an electromagnet 282, the valve 281 is brought into a straight-through position, so that a fluid exchange can take place between the hydraulic accumulator 280 and the pressure space 35. The electromagnet is in each case activated in parallel with the electromagnetic clutch 195, as indicated by the common electrical switch 283. The clutch 195 is actuated during the regulating movement, so that a temperature-induced volumetric change in the pressure fluid can be compensated for in each case during this movement. To build up the high locking force, the clutch 195 is disengaged and the valve 281 is brought into the blocking position. No pressure fluid can now be displaced from the pressure space 35 into the hydraulic accumulator 280. The entire travel of the small piston 28 is used for compressing the pressure fluid located in the pressure space 35.

The screw spindle 25 also passes through the hydraulic unit 12 in the exemplary embodiment according to FIG. 25. The screw spindle 25 is in engagement with a spindle nut 253 which is formed as a recirculating ball sleeve and which, as indicated, has a spherical outer surface and carries on the latter the armature plate 203 of an electromagnetic clutch 195, this armature plate 203 being complemented radially on the inside to form a multi-piece cup. The spindle nut and the cup are located essentially in a central passage of a yoke disk 267, in front of one end face of which the armature plate 203 lies and which accommodates the coil 198 in an annular groove 199 open axially toward the armature plate.

The yoke disk 267 belongs to an intermediate part 287 of the hydraulic unit 12, this intermediate part 287, in the same way as the exemplary embodiments according to FIGS. 16, 19, 20, 21, 22 and 24, having an inner dimensionally stable tube 94 and a thin-walled outer tube 92 surrounding the tube 94. The tube 92 is surrounded on the outside by a plurality of individual brake rods 196 which, when resting on the relieved tube 92, complement one another to form a closed ring and which are overlapped by two annular disks 288 and 289, which are screwed onto the end faces of the tube 94, and are held axially between the two annular disks with slight play which permits their free mobility in the radial direction. Again located between the tubes 92 and 94 is the annular admission space 183, which is fluidically connected to the pressure space 35 via holes 98 running through the tube 94.

The yoke disk 267 is inserted into the tube 94 at its one end face and is screwed to this tube. At an axial distance from the yoke disk 267, an inner flange is formed in one piece with the tube 94, this inner flange corresponding in its function to the cylinder base 38 of the exemplary embodiment according to FIG. 22 and therefore being provided with the same designation. The inner flange 38 is set back slightly relative to the one end face of the tube 94. With its outer margin, an annular diaphragm 290 is fastened to the annular disk 289 screwed onto said end face, this annular diaphragm 290, at its inner margin, being fastened axially to the outer collar of a collar bush 291. The annular diaphragm is made of a high-grade steel. It forms the large piston of the hydraulic unit 12 and, together with its intermediate part 287 and the small piston, it encloses the essentially annular pressure space 35.

To seal off the pressure space 35 to the outside, a seal 292 is first of all inserted between the annular diaphragm 290 and the annular disk 289. Furthermore, a seal, to be precise a gasket, is also located between the outer collar of the bush 291 and the annular diaphragm. A seal is of course also provided between the tube 94 and the annular disk 289, even if this is not shown in any more detail. Serving to provide a seal between the bush 291 and the inner flange 38 is an arrangement of two further metallic annular sealing diaphragms 294 and 295, of which the sealing diaphragm 294, with its inner margin, is clamped in place between the gasket referred to and the outer collar of the bush 291. The other sealing diaphragm 295 is fastened at its inner margin to the inner flange 38 with a clamping ring 296, there being a seal 297 between the inner flange 38 and the sealing diaphragm 295. At their outer margins, the two sealing diaphragms are connected to one another via two outer clamping rings 298 and an intermediate ring 299 lying between them, a seal 300 being located between the intermediate ring and each sealing diaphragm. The pressure space 35 is therefore sealed off from the space between the two sealing diaphragms 294 and 295 and thus from the gap, which changes in size during operation, between the bush 291 and the clamping ring 296 and from the atmosphere.

The small piston of the exemplary embodiment according to FIG. 25, as in the exemplary embodiment according to FIG. 22, is formed by a plurality of little pistons 256 which are at the same angular distances from one another and are guided in guide bushes 301 inserted into the inner flange 38 and projecting beyond the inner flange in the direction of the armature plate 203. The guide bushes result in a large guidance and sealing length for the little pistons 256. In addition, the bushes 301 serve as guides for compression springs 302, of which each is supported on the inner flange 38 and via a spring plate 303 on a little piston 256, and the little piston remains in contact with the armature plate 203.

The hydraulic unit 12 of the exemplary embodiment according to FIG. 26, which is shown in a highly schematic form, is constructed so as to be double-acting inasmuch as power transmission in two opposite directions is possible with it. The hydraulic unit has, as intermediate part, a cylinder 317 which is symmetrical relative to a center radial plane and has two inner flanges 38 and 40 at a distance from the two end faces of a dimensionally stable cylinder tube 94. The space between the two inner flanges is divided axially by a piston collar 319 of the large piston 318 into two annular spaces 320 and 321 which are each part of a pressure space 35.

Via a check valve 316 which can be opened by pilot control in a manner not shown in any more detail, each sectional space 320, 321 can be connected to the clearance space 183 which exists between the dimensionally stable cylinder tube 94 and the deformable outer tube 92, on the outside of which the brake rods 196 are located.

The large piston 318 is a synchronous piston with two piston rods 322 and 323 projecting away from the piston collar 319 on opposite sides and directed outward through the inner flanges. Each piston rod is surrounded by a preloaded helical compression spring 324 which is supported, on the one side, on a spring plate 325 which can bear both against a shoulder 326, pointing away from the piston collar 319, of the piston rod and against the outer end face of an inner flange. The distance between the two shoulders 326 on the two piston rods is exactly the same size as the distance between the two outer end faces of the two inner flanges. On the other side, each helical compression spring 324 is supported on the corresponding piston rod via a spring plate 327 and a snap ring 328. In this way, the cylinder 317 is centered in a center position relative to the large piston 318 by the helical compression springs 324, as long as no force exceeding the preloading of a spring is acting.

The large piston 318 has a circular-cylindrical cavity 332 which lies with its axis in the axis of the piston and at whose two end faces central passages 333, the diameter of which is smaller than the diameter of the cavity 332, lead outward. A small piston 334 of the hydraulic unit 12 is located in the cavity 332 and in the passages 333, and this small piston 334, with a piston collar 335, divides the cavity 332 into two small sectional spaces 336 and 337, of which the one sectional space 336, via a fluid path 338 running through the large piston 318, is fluidically connected to the sectional space 320 of substantially larger cross section and the sectional space 337, via a fluid path 339, is fluidically connected to the sectional space 321 of substantially larger cross section at the piston collar 319 of the large piston 318. The sectional spaces connected to one another and the corresponding fluid path in each case form a pressure space 35. Starting from the piston collar 335 on each side of the same is a piston rod 340 or 341, respectively, which emerges outward through the passage 333. In a manner not shown in any more detail, the piston rod 340 is coupled to a drive element, for example a screw spindle, which can be moved axially in opposite directions by an electric motor.

The other piston rod 341 has an outer shoulder 342 which points away from the piston collar 335 and from which a guide and supporting mandrel 343 for a helical compression spring 344 extends and which lies in the plane of the end face 345 of the piston rod 322 of the large piston 318 when the piston collar 335 of the small piston 334 is located centrally in the cavity 337. An annular groove 199 in the end face 345 accommodates the coil 198 of an electromagnetically actuable clutch 195. The latter also includes an armature plate 203 which surrounds the mandrel 343 of the piston rod 341 and is loaded in the direction of the outer shoulder 342 and the end face 345 by the spring 344 supported on the mandrel 343.

In FIG. 26, the hydraulic unit 12 is shown in a state in which the mold of an injection molding machine for plastics is completely open. The large piston 318 is centered relative to the cylinder 317 by the springs 324. The small piston 334 assumes a central position relative to the large piston 318 in which the armature plate 203 is located at the outer shoulder 342 and at the end face 345 of the large piston. If the mold is now to be closed, the coil 198 is energized, that is to say the clutch 195 is engaged, and the small piston 334 is moved to the right in the view according to FIG. 26 by appropriate activation of the electric motor (not shown). Via the armature plate 203, the large piston 318 is carried along synchronously and thus the movable platen fastened to the large piston is moved. The large piston 318 also carries along the cylinder 37 via the left-hand helical compression spring 324 in the figure. The pressure in the pressure spaces 35 does not change.

If the mold has finally been closed, a high resistance opposes the further movement of the large piston 318. The coil 198 is de-energized. The small piston 334 continues to move in the direction for reducing the small sectional space 337. As a result, the pressure in the corresponding pressure space 35 increases and, via the one check valve 316, the pressure in the clearance space 183 also increases. First of all, the preloaded left-hand helical compression spring 324 still prevents the cylinder 317 from giving way to the left. Finally, by further pressure increase in the pressure space 35, the outer tube 92 is widened, so that the brake rods 196 abut on the inside against the wall of the bore 9. The cylinder 37 is then held by clamping in the bore 9, and the pressure in the pressure space 35 can be increased further by further movement of the small piston 334, so that the preloading force of the left-hand helical compression spring 324 is overcome and the high locking force for the mold is built up.

To open the mold, for which purpose a relatively high opening force is now necessary to begin with, the electric motor is driven in the opposite rotary direction, so that the small piston 334, as viewed according to FIG. 26, moves to the left, while the large piston 318 remains in its position. By the movement of the piston 334 relative to the piston 318, the small sectional space 337 is enlarged and the pressure in the corresponding pressure space 35 is reduced. The armature plate 203 passes again to the end face 345 of the large piston 318. The state shown in FIG. 26 is achieved again.

The small piston 334 is moved further to the left and as a result a pressure is built up in the other pressure space 35, this pressure finally producing a force at the large piston which is sufficient for opening the mold. While the small piston moves relative to the large piston, the helical compression spring 344 is loaded to a greater extent, since its one end is carried along by the small piston, whereas the other end is supported via the armature plate 203 on the static, large piston. If the mold has been opened, the large piston, on account of the helical compression spring 344, follows the small piston until the armature plate 203 bears against the outer shoulder 342. The two pistons are subsequently moved together. A pressure drop in the one pressure space 35 having the sectional space 320 indicates that the mold has opened. After the mold has opened, the clearance space 183 is relieved of pressure, so that the cylinder 317 is centered relative to the large piston 318 and is subsequently moved to the left together with the pistons.

In the exemplary embodiment shown, two pilot-operated check valves 316 are provided for the admission of pressure to the clearance space. In order to be able to exert the high locking force, pressure is applied to the clearance space from the large sectional space 321 via the one check valve. After the molding operation, the check valve is opened by pilot control, so that, with the drop in the pressure in the sectional space 321 resulting from the movement of the small piston 334 to the left, the pressure in the clearance space 183 is also reduced and the cylinder 317 is centered relative to the large piston 318. During the subsequent pressure build-up in the large sectional space 320, pressure is also admitted again to the clearance space 183 via the other check valve and as a result the cylinder 317 is clamped in place again. After the mold has been opened, the check valve is opened by pilot control.

In a variant, it is also possible for only the one check valve to be provided between the large sectional space 321 and the clearance space 183. This check valve is not opened until after the mold has been opened, so that the cylinder remains clamped in place without interruption from the start of the locking until after the opening of the mold.

While pressure is being built up in the one pressure space 35 by the movement of the small piston relative to the large piston, in order to avoid a vacuum arising in the other pressure space 35, it is conceivable to connect each pressure space to a hydraulic accumulator according to the exemplary embodiment according to FIG. 22 or the exemplary embodiment according to FIG. 24. It is also conceivable to prestress the two pressure spaces to equally high pressures, so that, during a relative movement between the two pistons, the pressure in the one pressure space increases and the pressure in the other pressure space drops, although not below atmospheric pressure. In this case, external admission of pressure to the clearance space according to the exemplary embodiment according to FIG. 20 appears favorable.

In FIGS. 27 to 31, a drive device according to the invention constructed in each case in principle like the exemplary embodiment according to FIG. 22 is supplemented by a purely electromechanical drive device 400 for actuating one or more ejectors for the molding. The components of this drive device are located on the piston rod 42 of the large piston 36 and on the movable platen 401, which forms a motion unit with the large piston.

In the exemplary embodiment according to FIG. 27, a spindle nut 403 is rotatably mounted in the piston rod 42 via rolling-contact bearings 402, this spindle nut 403 having a toothed driving wheel 404, via which it can be rotationally driven via a driving belt 405 by an electric motor 406 which is fastened to the platen and can be reversed in its direction of rotation. Extending through the spindle nut is a screw spindle 407 which is locked against rotation and to which an ejector pin 408 passing through the platen is fastened. The ejector pin 408 is moved to and fro by rotation of the electric motor 406 in opposite directions.

In the exemplary embodiment according to FIGS. 28 and 29, a plurality of ejector pins 408 are located on a plate 410, into which three spindle nuts 403 are inserted in a rotationally locked manner. Passing through each spindle nut is a screw spindle 407 which is rotatably mounted and held in place axially in a rolling-contact bearing 402 fastened on the outside to the piston rod 42 and which carries a toothed driving wheel 404 in a rotationially locked manner between the rolling-contact bearing and the plate 410. Again fastened to the platen 401 is an electric motor 406 which, via a pinion sitting on its shaft and via a driving belt 405 placed around this pinion and the three driving wheels 404, can drive the screw spindle 407 in a rotary manner and, as a result, depending on the direction of rotation, can move the plate 410 and with the latter the three ejector pins 408 to and fro.

There is a discrepancy between the two FIGS. 28 and 29 with regard to the arrangement of one screw spindle 407, which in FIG. 28 is depicted rotated through 90 degrees relative to FIG. 29 in order to be able to show a plurality of screw spindles in FIG. 28.

In the exemplary embodiment according to FIGS. 30 and 31, the drive device 400 for a plurality of ejector pins 408 has a slider-crank mechanism with a sliding body 411, to which the ejector pins 408 are fastened and which is guided in the axial direction of the piston rod and of the screw spindle 25 and in the direction of movement of the platen 401 in an adapter piece 412 attached to the piston rod 42 and connected to the platen 401. Fastened to an extended motor shaft 413 of an electric motor 406 held vertically on the platen 401 is a crank 414 which is connected to the sliding body 411 in an articulated manner via a coupling rod 415. The sliding body 411 and the ejector pins 408 are moved forward and backward by rotation of the motor shaft 413 in two opposite directions. So that the ejector pins do not have to be too long, the articulation point of the coupling rod 415 is sunk in the sliding body 411 and the necessary recesses are made in the latter in order not to hit the motor shaft, the crank and the coupling rod.

The exemplary embodiment according to FIG. 32 has a power transmission means 12 with a cylinder 37 which, in its configuration with the base 38, the flange 40 and the tubes 94 and 92, the clearance space 183 in between and the brake rods 196, corresponds to the cylinder 37 from FIG. 16.

The large piston 36, only schematically shown, has a piston-rod-like part 182, which is of smaller diameter and emerges outward through the flange 40, and a piston-collar-like part 181, which is of larger diameter and serves to guide the piston and seal off the pressure space 35. A helical compression spring 60 is again secured in position between the piston 36 and the cylinder 37.

Like the piston 36 from FIG. 16, the piston 36 of the exemplary embodiment according to FIG. 32 also has, in the interior, a cavity (clutch space) 186, which accommodates a coupling device 180 for coupling the two pistons 36 and 28. The small piston 28, with a certain diameter, enters the pressure space 35 in a sealed-off manner through the base 38 of the cylinder 37. Its cross section is reduced therein in a step 201, following which is a piston extension 202 of smaller diameter. After crossing a blind hole 56 of the piston 36, this blind hole 36 being open toward the base 38 of the cylinder 37 and its diameter being so large that the piston 28 can plunge into it with its larger diameter, the piston extension 202 enters the clutch space 186 in a sealed-off manner. In the latter, the small piston 28 is reduced once again in diameter and, with a pump piston section 420 of smaller diameter compared with the extension 202, plunges in a sealing manner into an axial blind hole 421 starting from the clutch space 186. The pump piston section 420 and the blind hole 421 form the displacement means and the displacement space of a simple plunger pump. Pressure fluid can flow to the blind hole 421 from a low-pressure accumulator 423 via a check valve 422 opening toward the blind hole 421. Via a check valve 424 blocking flow toward the blind hole, pressure fluid can be displaced from the blind hole into a high-pressure accumulator 425.

Inside the clutch space 186, the cross-sectional area of which is substantially larger than the cross-sectional area of the piston extension 202 or of the pump piston section 420 of the small piston 28, the piston 28, at the transition from the extension 202 to the pump piston section 420, carries a piston disk 188 which divides the clutch space 186 into two spaces 426 and 427 sealed off from one another. The space 427 (air space) on the side of the extension 202 is open to the atmosphere, that is to say it is filled with air. The other space 426 (fluid space) is filled with pressure fluid and is connected to an electromagnetically actuable 3/2-way directional control valve 428 which fluidically connects the fluid space 426 to the high-pressure accumulator 425 in the off position and to the low-pressure accumulator 423 in the actuated position. Inserted between the two hydraulic accumulators is a spill valve 429 which opens from the high-pressure accumulator to the low-pressure accumulator if a certain pressure difference between the two hydraulic accumulators is exceeded.

In FIG. 32, the hydraulic unit is shown in a state in which the mold of an injection molding machine for plastics is completely open. The large piston 36, with its end face 184, is located at the base 38 of the cylinder 37 via short spacers. The small piston 28 assumes a position in which the piston disk 188 is located at the end of the clutch space 186. The directional control valve is in its off position, so that pressure is applied in the fluid space 426. This pressure is so high that the pressure fluid transmits the force required for the regulating movement of the movable platen like a rigid mechanism. If the mold is now to be closed, the small piston 28 and with it the piston disk 188 are moved to the right in the view according to FIG. 32 by appropriate activation of the electric motor (not shown in FIG. 32). The movement of the piston disk, via the pressure fluid in the fluid space 426, is transmitted directly to the large piston 36 and thus to the movable platen. The large piston 36 also carries along the cylinder 37 via the helical compression spring 60. The pressure in the pressure space 35 does not change.

If the mold has finally been closed, the directional control valve 428 is changed over, so that the pressure fluid in the fluid space 426 expands to a low pressure and, during the further movement of the small piston 28 relative to the large piston 36, can be displaced with little force from the fluid space 426 into the low-pressure accumulator 423. The piston 28 continues to move and plunges deeper into the blind hole 56 and displaces pressure fluid with its annular surface 201. As a result, the pressure in the pressure space 35 increases, so that the cylinder 37 is clamped in place and the high locking force is built up.

During the further movement of the small piston 28, its pump piston section 420 plunges deeper into the blind hole 421 and displaces pressure fluid from it into the high-pressure accumulator 425. The displaced quantity is slightly larger than the quantity which has flowed away into the low-pressure accumulator 423 during the preceding decompression of the fluid space 426 and which will flow from the high-pressure accumulator into the fluid space during the subsequent compression. The excess quantity is kept as small as possible and passes from the high-pressure accumulator via the spill valve 429 into the low-pressure accumulator again, so that the pressure difference between the two accumulators does not exceed a certain value.

To open the mold, the electric motor is driven in the opposite rotary direction, so that the piston 28, as viewed according to FIG. 32, moves to the left. Pressure fluid flows from the low-pressure accumulator 423 via the directional control valve 428 into the expanding fluid space 426 and via the check valve 422 into the expanding displacement space 421. The pressure in the pressure space 35 is reduced. Finally, the piston 28, via the piston disk 188, carries along the piston 36 and the latter carries along the cylinder 37 in the opening direction of the mold. The directional control valve is brought into its off position again and as a result the high pressure prevailing in the hydraulic accumulator 425 is applied to the fluid space 426.

Of the exemplary embodiment according to FIG. 33, only the one half produced by dividing along the direction of movement of a movable platen is shown. The other half is constructed in mirror image thereto.

Fastened in a fixed platen 433 outside the center axis 434 is an electric hollow-shaft motor 11, the hollow shaft of which has a recirculating ball screw 21 on the inside and is in engagement via balls 24 with a threaded section 27 of a rectilinearly movable stroke spindle 25 locked against rotation. From the threaded section 27, a piston rod 340 of the small piston 334 of a hydraulic power transmission means 12 extends parallel to the center axis right into a cylindrical cavity 435 of a plate-shaped intermediate part 437 of the power transmission means 12, this plate-shaped intermediate part 437, in a manner not shown in any more detail, being guided on spars along the axis 434. Fastened inside the cavity 435 to the piston rod 340 is a piston collar 335, which, on the piston-rod side, defines a sectional space 337, filled with pressure fluid, of a pressure space 35 of the power transmission means and, on the side remote from the piston rod, is exposed to the atmosphere.

Before entry to the cavity 435, the piston rod 340 crosses a clutch space 186 which is located in the plate 437 and in which the piston disk 188 of a hydraulic coupling device 180 is fastened to the piston rod. As in the exemplary embodiment according to FIG. 32, the piston disk divides the clutch space 186 into two clutch sectional spaces 426 and 427 sealed off from one another. The clutch sectional space 427 situated toward the cavity 435 is permanently connected to a low-pressure accumulator 423 sitting on the plate 437. The other clutch sectional space 426, as in the exemplary embodiment according to FIG. 32, is filled with pressure fluid and connected to an electromagnetically actuable 3/2-way directional control valve 428 which fluidically connects the clutch sectional space 426 to the high-pressure accumulator 425 in the off position and to the low-pressure accumulator 423 in the actuated position. The clutch sectional spaces at the other small piston 334 are connected in the same way to the directional control valve 428 and the low-pressure accumulator 423. As in the exemplary embodiment according to FIG. 32, there is a pumping arrangement (not shown in any more detail) which delivers pressure fluid from the low-pressure accumulator to the high-pressure accumulator in order to compensate for the entrainment of pressure fluid by the pressure build-up and pressure reduction in the space 426 and for leakage via the piston disk 188.

The plate 437 accommodates the large piston 36 of the power transmission means 12 concentrically to the center axis 434. The large piston 36, with the plate 437, defines a sectional space 321 of the pressure space 35, this sectional space 321 being fluidically connected to the sectional space 337 at the small piston 334 via a passage 438 leading through the plate. Secured in position between the large piston 36 and the plate 437 is a helical compression spring 60 which loads both parts in the direction for minimizing the volume of the sectional space 321.

Fastened to the plate 437 are rods 439, with which the plate can be locked relative to the fixed platen 433, that is against movement.

The mold for the plastic part to be injection molded can be carried by the large piston 36 directly or via an additional platen.

In FIG. 33, the drive device is shown in a state in which the mold of an injection molding machine for plastics is completely open. The large piston 36 of the hydraulic unit 12, with its end face 184, is located at the base of the receptacle in the plate 437 via short spacers. The small piston 334 assumes a position in which the piston disk 188 is located at the end of the clutch space 186 and the piston collar 335 makes the sectional space 337 the maximum size. The directional control valve is located in its off position, so that pressure is applied in the clutch sectional space 426. This pressure is so high that the pressure fluid transmits the force required for the regulating movement of the movable mold half like a rigid mechanism. If the mold is now to be closed, the small piston 334 and with it the piston disk 188 are moved to the right in the view according to FIG. 33 by appropriate activation of the electric motor 11. The movement of the piston disk, via the pressure fluid in the clutch sectional space 426, is transmitted directly to the plate 437, that is to the intermediate part of the power transmission means 12, and from the intermediate part to the large piston 36 and thus to the movable mold half. The pressure in the pressure space 35 does not change.

If the mold has finally been closed, the plate 437 is locked via the rods 439 and the directional control valve 428 is changed over. The pressure fluid in the clutch sectional space 426 expands to a low pressure and, during the further movement of the small piston 334 relative to the plate 437, can be displaced from the clutch sectional space 426 into the low-pressure accumulator 423 by the piston disk 188. The piston 334 continues to move and, with its piston collar 335, reduces the volume of the sectional space 337 of the pressure space 35. As a result, the pressure in the pressure space 35 increases, so that the high locking force is built up.

To open the mold, the electric motor 11 is driven in the opposite rotary direction, so that the piston 334, as viewed according to FIG. 33, moves to the left. The pressure in the pressure space 35 is reduced. Pressure fluid flows from the low-pressure accumulator 423 via the directional control valve 428 into the expanding clutch sectional space 426. The locking of the plate 437 is then neutralized. The plate 437 is subsequently carried along by the small piston 334 via the piston disk 188, and the piston 36 is carried along by the plate 437 via the helical compression spring 60 preloaded in accordance with the force required for the regulating movement. The directional control valve is brought into its off position again and as a result the high pressure prevailing in the hydraulic accumulator 425 is applied to the fluid space 426.

In the two exemplary embodiments according to FIGS. 34 and 35, the hydraulic power transmission means 12 is of double-acting construction. In the fixed platen 433, two spindle nuts 253 are rotatably mounted axially in a fixed position diametrically opposite one another relative to the center axis 434 via self-aligning roller bearings 445, these spindle nuts 253 having a driving disk 446, via which they can be driven via a belt by an electric motor (not shown in any more detail). Each spindle nut 253 is in engagement via balls with a threaded section 27 of a rectilinearly movable stroke spindle 25 locked against rotation. As in the exemplary embodiment according to FIG. 33, from the threaded section 27 of the stroke spindle 25, a piston rod 340 of a small piston 334 of a hydraulic power transmission means 12 extends parallel to the center axis 434 in a sealed-off manner through a passage 447 right into a cavity 448, having a plurality of cylindrical sections differing from one another in their diameters, of a plate-shaped intermediate part 437 of the power transmission means 12, this plate-shaped intermediate part 437, in a manner not shown in any more detail, being longitudinally guided on spars. Following the passage 447 is first of all a cavity section 449, the diameter of which is about three times as large as the diameter of the piston rod 340. The following cavity section 450 has a larger diameter than the cavity section 449. The diameter of the adjoining cavity section 451 lies between the diameters of the sections 449 and 450. Finally, the diameter of the last, blind-hole-like cavity section 452 is slightly smaller than the diameter of the passage 447. The small piston 334, with a plunger-like piston section 455, plunges in a sealed-off manner into the cavity section 452. At the transition between the piston rod 456 and the piston section 455, a driving disk 456 is fastened to the latter, the diameter of this driving disk 456 being smaller than the diameter of the cavity section 451. In front of the driving disk, a further, stepped piston section 457 is longitudinally guided on the piston rod 340. This piston section 457 plunges in a sealed-off manner into the cavity section 449 and has an additional piston collar 458 which constitutes a further piston section of the small piston 334. The piston collar 458 has a diameter which is slightly smaller than the diameter of the cavity section 450 and is sealed off relative to the wall of this cavity section. Secured in position between the piston section 457 and the piston rod 340 is a compression spring 459 which loads the piston section in the direction of the driving disk 456 and in the direction of the step between the two cavity sections 450 and 451. The step forms a stop 460 for the piston section 457.

The plate 437 accommodates the large piston 36 of the power transmission means 12 concentrically to the center axis 434. The large piston 36 is now formed so as to be double-acting as a differential piston with a piston collar 310 and a piston rod 322 and defines, with the plate 437, a fully cylindrical sectional space 321 of a first pressure space 35, the admission of pressure to which results in the large piston being loaded in the extension direction of the piston rod, and an annular sectional space 320 of a second pressure space 35. The plate and the large piston are centered relative to one another in a spring-loaded manner by two helical compression springs 461 and 462 which surround the piston rod 322 and which are both supported on one side on an annular spring plate 463, which can be carried along by the plate 437 and by the large piston 36, and on the other side on the large piston and on the plate, respectively.

In both exemplary embodiments according to FIGS. 34 and 35, the sectional space 320 is permanently fluidically connected to the clearance space 464 in front of the piston sections 455 of the two small pistons 334. Both exemplary embodiments again include a low-pressure accumulator 423 and a high-pressure accumulator 425 and also a 3/2-way directional control valve 428. The clearance spaces 465 between the seal at the piston section 455 and the seal at the piston collar 458 are permanently fluidically connected to the low-pressure accumulator 423.

A difference between the two exemplary embodiments just considered is the fluidic connection of the clearance spaces 456 between the seal at the piston collars 458 and the seal, lying at the wall of the respective cavity section 449, of the piston section 457 and the clearance spaces 467 in front of the last-mentioned seal. In the exemplary embodiment according to FIG. 34, the clearance spaces 466 are permanently connected to the sectional space 321 at the large piston 36 and thus form sectional spaces of the first pressure space 35. The clearance spaces 467, depending on the position of the directional control valve 428, are connected either to the low-pressure accumulator or to the high-pressure accumulator. Together they form the clutch space of a hydraulic clutch device which is provided between the small piston 334 and the plate 437, that is to say the intermediate part of the hydraulic power transmission means 12, and the clutch disk of which is the smaller part of the piston section 457.

In the exemplary embodiment according to FIG. 35, the piston collars 458 correspond to the piston section 420 and the clearance spaces 466 correspond to the space 421 of the exemplary embodiment according to FIG. 32. Accordingly, pressure fluid can be displaced from these clearance spaces 466 via a check valve 424 into the high-pressure accumulator 425 and can subsequently flow from the low-pressure accumulator 423 via a check valve 422 into the clearance spaces 466. There is a 4/2-way directional control valve with an off position in which the clearance spaces 467 are connected to the high-pressure accumulator 425 and the sectional space 321 of the first pressure space 35 is connected to the low-pressure accumulator 423. The directional control valve can be brought by an electromagnet into the second operating position, in which the hydraulic accumulators are shut off toward the spaces 321 and 467 and the sectional space 321 is connected to the clearance spaces 467. In this respect, the latter are sectional spaces of the first pressure space 35. The clearance spaces 467 at the same time form the clutch space of a hydraulic clutch arranged between the small piston 334 and the plate 437.

In FIGS. 34 and 35, the two drive devices are shown in a state in which the mold of an injection molding machine for plastics is completely open. The piston collar 319 of the large piston 36 of the hydraulic unit 12 is located in a center position relative to its possible length of stroke. The piston sections 457 of the small pistons 334 bear against the stop 460. The driving disk 456 is located just behind the piston section 457. The directional control valve 428 or 475, respectively, is in its off position, so that pressure is applied in the clearance spaces 467. This pressure is so high that the pressure fluid transmits the force required for the regulating movement of the movable mold half like a rigid mechanism. If the mold is now to be closed, the piston rod 340 and, with the latter, the various sections of the small pistons 334 are moved to the right in the view according to FIGS. 34 and 35 by appropriate activation of the electric motor. The movement of the piston section 457, via the pressure fluid in the clearance spaces 467, is transmitted directly to the plate 437, thus to the intermediate part of the power transmission means 12, and from the intermediate part via the helical compression spring 461 to the large piston 36 and thus to the movable mold half. The pressure in the pressure spaces 35 does not change.

If the mold has finally been closed, the plate 437 is locked via the rods 439. In the exemplary embodiment according to FIG. 34, the directional control valve 428 is changed over. The pressure fluid in the clearance spaces 467 expands to a low pressure and, during the further movement of the small pistons 334 relative to the plate 437, can be displaced from the clearance spaces 467 into the low-pressure accumulator 423. The pistons 334 continue to move and, with the piston collars 458, reduce the volume of the sectional spaces 466 of the first pressure space 35. As a result, the pressure in the sectional space 321 of this pressure space 35 also increases, so that the high locking force is built up.

In the exemplary embodiment according to FIG. 35, after the changeover of the directional control valve 475, pressure fluid is displaced from the clearance spaces 467 into the sectional space 321 of the first pressure space 35 by the further movement of the small pistons 334, so that a high locking pressure is likewise built up. During the further movement of the small pistons 334, their piston collars 458 displace pressure fluid from the clearance spaces 466 into the high-pressure accumulator 425. As in the exemplary embodiment according to FIG. 32, the movement of the small pistons relative to a fixed part of the hydraulic power transmission means is thus used in order to deliver pressure fluid from the low-pressure accumulator into the high-pressure accumulator.

To open the mold, the small pistons 334, by reversing the direction of rotation of the driving electric motor, are moved to the left, as viewed according to FIGS. 34 and 35, in the course of which the piston section 457 follows the piston rod 340 on account of the spring 459. The pressure in the first pressure space 35 is reduced. In the exemplary embodiment according to FIG. 34, pressure fluid flows from the low-pressure accumulator 423 via the directional control valve 428 into the expanding clearance spaces 467 until the piston sections 457 bear against the stops 460. A pressure is subsequently built up by the piston sections 455 of the small pistons 334 plunging into the clearance spaces 464 in the second pressure space 35, this pressure releasing the movable mold half. The locking of the plate 437 is then neutralized. The springs 459, the preloading of which has been further increased by the further movement of the small pistons to the left, push the plate 437 and the large piston 36 in such a way as to follow the small pistons. The plate 437 and the large piston 36 then follow the small pistons 334 on account of the springs 459 and the springs 462. The directional control valve is brought into its off position again and as a result the high pressure prevailing in the hydraulic accumulator 425 is applied to the fluid space 467.

In the exemplary embodiment according to FIG. 35, after reversal of the direction of movement of the small pistons 334, pressure fluid flows out of the low-pressure accumulator 423 via the check valve 422 into the expanding clearance spaces 466. The first pressure space 35 is decompressed by the movement of the piston sections 457 up to the stops 460. The directional control valve 475 is then changed over into its off position, so that the sectional spaces 467 are connected to the high-pressure accumulator and the sectional space 321 of the first pressure space 35 is connected to the low-pressure accumulator. As in the exemplary embodiment according to FIG. 34, a pressure is subsequently built up by the piston sections 455 of the small pistons 334 plunging into the clearance spaces 464 in the second pressure space 35, this pressure releasing the movable mold half. The locking of the plate 437 is then neutralized. The mold is then opened as in the exemplary embodiment according to FIG. 34.

What is claimed is:

1. A drive device, in particular for a closing unit, an injection unit or ejectors of an injection molding machine for plastics, having a drive element (25, 234, 253) which is movable axially by an electric motor (11, 170), and having a hydraulic unit (12) which is movable in same direction as the drive element (25, 234, 253) by a movement of the drive element, wherein the hydraulic unit (12) is a power transmission means having two pistons (28, 228, 256, 334; 36, 290, 318), which include a small piston and a large piston that are movable relative to one another and differ from one another in the sizes of their effective areas, and having an intermediate part (37, 287, 317, 437) which together with the two pistons encloses a pressure space (35) filled with a pressure fluid, wherein the small piston (28, 228, 256, 334) having the smaller effective area is mechanically connected to the drive element (25, 234, 253), wherein the hydraulic unit (12) is movable as an entity for a regulating movement, and wherein for exerting a high force by the large piston (36, 290, 318) having the larger effective area, the intermediate part is locked against displacement relative to a fixed frame (10, 240, 433).

2. The drive device as claimed in claim 1, further comprising a coupling device (60, 324) with which the intermediate part (37, 287, 317) and he large piston (36, 287, 318) of the hydraulic unit (12), for regulating movement, are coupled to one another in a fixed position, and wherein for exerting the high force by the large piston (36, 318) of the hydraulic unit (12), the fixed coupling between large piston (36, 318) and intermediate part (37, 287, 317) is released.

3. The drive device as claimed in claim 2, wherein the coupling device comprises a spring (60, 324) which is secured in position between the large piston (36, 318) and the intermediate part (37, 317), wherein the large piston (36, 318) and the intermediate part (37, 327) is pressable against one another axially by the spring (30, 324), and wherein when the large piston (36, 318) and the intermediate part (37, 317) bear against one another, the preloading force of the spring (60, 324) is greater than the regulating force required for performing the regulating movement.

4. The drive deice as claimed in claim 1, wherein the intermediate part is formed as a cylinder (37) which surrounds the large piston (36) on the outside, and wherein the small piston (28, 256) projects plunger-like through a flange (38) of the cylinder (37) freely into he pressure apace (35).

5. The drive device as claimed in claim 4, wherein the large piston (36) has a blind hole (56) which is open toward the flange (38) of the cylinder (37) and into which the small piston (28) can plunge.

6. The drive device as claimed in claim 1, further comprising a coupling device (5, 180, 195) by which the drive element (25, 253) and the intermediate part (37, 287, 437) of the hydraulic unit (12) are directly coupled to one another in a fixed position for a regulating movement, and wherein for exerting the high force by the large piston (36, 290) of the hydraulic unit (12), the fixed coupling between the drive element (25, 253) and the intermediate part (37, 57, 437) is released.

7. The drive device as claimed in claim 6, further comprising a spring (60) wherein the large piston (36) and the intermediate part (37) of the hydraulic unit (12) are pressed against one another by the spring (60), a preloading force of which is lower than a regulating force required for performing the regulating movement.

8. The drive device as claimed in claim 1, further comprising a coupling device (180, 195) with which the drive element (25, 234) or the small piston (28, 228, 334), is coupled directly to the large piston 318) of the hydraulic unit (12), in a fixed position for a regulating movement, and wherein for exerting the high fore by the large piston (36, 318) of the hydraulic unit (12), the fixed coupling between the drive element (25, 234) or the small piston (28, 228, 334), and the large piston (36, 318), is released.

9. The drive device as claimed in claim 8, further comprising a spring (60, 32), wherein the large piston (35, 318) and the intermediate part (37, 317) of the hydraulic unit (12) are pressed against one another by the spring (60, 324), via which the intermediate part (37, 317) can be carried along in the closing direction by the large piston (36, 318).

10. The drive device as claimed in claim 6, wherein the coupling device (195) is an electromagnetically actuable clutch which has a coil (198) located on one part (36, 37, 287) and an armature (203) which is held on the other part (28, 228, 253), and wherein when current flows through the coil (198), the other part in held axially on the coil.

11. The drive device as claimed in 6, wherein the coupling device (180) between the drive element or the small piston (28, 334), on the one hand, and the intermediate part (437) or the large piston (36) on the other hand, is a hydraulic clutch, wherein pressure fluid, during the regulating movement, is trapped in a clutch space (186, 467) between the two parts (28, 36, 437) coupled to one another to be displaced from the clutch space (186, 467) for moving the two parts relative to one another.

12. The drive deice as claimed in claim 6, wherein the coupling device (180) is a hydraulic slip clutch, and the drive element or the small piston (28) enters a closed-off clutch space (186), filled with a fluid, of the intermediate part or of the large piston (36), wherein the drive element or the small piston carries, in the region of the clutch space (186), a separating disk (188) separating said clutch space into two clutch sectional spaces, wherein the two clutch sectional spaces are fluidically connects to one another by a valve arrangement (189, 190), and wherein the valve arrangement has two check valves (189, 190) in an antiparallel arrangement.

13. The drive device as claimed in claim 10, wherein the large piston (36) has clutch space (186), into which the drive element or the small piston (28, 228) extends, and in which the coupling device (180, 195) is located.

14. The drive device as claimed in claim 13, wherein the small piston (28, 228) is a stepped piston with a section of larger diameter and a section (202) of smaller diameter following this section of large diameter, and wherein the small piston (25, 225), with the sec ion of larger diameter, enters the pressure space (35) in a se led-off manner and, with the section (202) of smaller diameter, enters the clutch space (186), so that the differential are between the two sections of different diameters forms the effective area of the small piston (28, 228).

15. The drive device as claimed in claim 1, wherein the intermediate part (37, 287, 317) of the hydraulic unit (12) is locked against displacement relative to the fixed frame (10, 240) by friction grip with he fixed frame (10, 240).

16. The drive device as claimed in claim 15, wherein the friction grip is produced by hydraulically applying pressure to one friction-grip partner (92, 211).

17. The drive device as claimed in claim 16, wherein the pressure prevailing in the pressure space (35) is applied to the one friction-grip partner (92).

18. The drive device as claimed in claim 17, wherein pressure is applied to the one friction-grip partner (92, 211) by feeding an external pressure medium.

19. The drive device as claimed in claim 16, wherein a plurality of individual brake shoes (211), to which pressure can be applied from outside and which can be brought into contact with the intermediate part (37) toward the inside, are arranged in the frame.

20. The drive device as claimed in claim 16, wherein the intermediate part (37) of the hydraulic unit (12) has a tube section (43, 92) which can be elastically extended radially outward by internal pressure for producing a friction grip between the intermediate part and wall of a bore (9) of the fixed frame (10, 240).

21. The drive device as claimed in claim 20, wherein individual, radially movable brake rods (196) are arranged around an extensible tube section (92) of thin construction, these brake rod, (196) lying axially with slight play between the stops and the intermediate part (37, 287, 317).

22. The drive device as claimed in claim 20, wherein intermediate part (37, 287, 317) of the hydraulic unit (12)

has a tube section (43, 92) which defines the pressure space (35) and which can be elastically extended radially outward by a pressure in the pressure space (35) for producing a friction grip between the intermediate part and a wall of a bore (9) of the fixed frame (10).

23. The drive device as claimed in claim 20, wherein the intermediate part (37, 87, 317) has a dimensionally stable inner tube section (94), in which the large piston (36) is guided in a sealed-off manner, and an outer tube section (92) which surrounds the inner tube section (94) while forming a clearance space (96, 97, 183), wherein pressure can be applied to the clearance space, and wherein the outer tube section (92) can be extended radially outward by pressure applied in the clearance space (96, 97, 183).

24. The drive device as claimed in claim 15, wherein the intermediate pert (37) f the hydraulic unit (12) is lockable against displacement relative to the fixed frame (10) by clamping wedges (111, 117).

25. The drive device as claimed in claim 24, wherein the intermediate part (37) is clampable to the frame (10) by clamping the clamping wedges (111, 117) to spars (124) of the frame (10).

26. The drive device as claimed in claims 1, wherein the intermediate part (37) of the hydraulic unit (12) is lockable against a displacement relative to the fixed frame by positive locking with the fixed frame (10).

27. The drive device as claimed in claim 26, wherein the intermediate part (37) can be locked by a plurality of locking elements (76) which are a ranged around it at equal distances apart, and each locking element (76) is pivotable about an axis parallel to the axis of the hydraulic unit (12).

28. The drive device as claimed in claim 27, wherein the locking elements (76) are set in their axial position.

29. The drive device as claimed in claim 1, wherein the intermediate part (37) as lockable by an axial stop (149, 160, 174) which is moved in accordance with the regulating movement of the intermediate part (37), a force chain for axially supporting the intermediate part (37) comprising a self-locking screw drive (144, 148; 156, 161).

30. The drive device as claimed in claim 29, wherein the axial stop (160, 174) is moved by a second electric motor (13).

31. The drive device as claimed in claim 29, wherein a rotationally drivable part (174) of the screw drive (144, 148) meshes directly with a section (177), provided with a thread (148), of the intermediate part and constitutes the stop.

32. The drive device as claimed in claim 1, wherein the small piston (228) of the hydraulic unit (12) is formed as a hollow piston, a screw spindle (25) is arranged in an axially fixed position and is rotationally driven by the electric motor (11), the screw spindle (25) is accommodated by the hollow small piston (228), and wherein the small piston (228) comprises a spindle nut (234) which is in engagement with the screw spindle (25) over the entire stroke and is locked against rotation.

33. The drive device as claimed in claim 32, wherein the large piston (36) is formed as a hollow piston, the small piston (228) is hollow throughout and is formed as a stepped piston with a section of larger outside diameter and with a section of smaller outside diameter, the mall piston (228), with the section of larger outside diameter, enters the pressure space (25) in a sealed-off manner and, with the section of smaller outside diameter, enters the hollow large piston (36) in a sealed-off manner, and wherein the screw spindle (25) passing through the small piston (225) can be acommodated by the cavity (186, 231) in the large piston (36).

34. The drive device as claimed in claim 1, wherein the large piston (36, 290) is formed as a hollow piston, a screw spindle (125) arranged in n axially fixed position to be rotationally driven by the electric motor (11), the screw spindle (25) passes through a base (38) of the intermediate part (37, 287) of the hydraulic unit (12) and is accommodated by the cavity in the large piston (36, 290) and is in engagement with a spindle nut (253), and wherein the small piston is formed by a plurality of little pistons (256) which are arranged outside the axis of the hydraulic unit (12), are supported axially on the spindle nut (253) and lunge into holes of the intermediate-part base (38).

35. The drive device as claimed in claim 34, wherein the pressure space (35) comprises an annular space which is defined radially on the outside and inside by axial intermediate-part walls (94, 257) and axially on the one side by the intermediate-part base (38) and on the other side by an annular section (258), plunging between the intermediate-part walls (94, 257), of the large piston (36).

36. The drive device as claimed in claim 34, wherein the spindle nut (253) plunges into the central passage of the intermediate-part base (38).

37. The drive device as claimed in claim 1, wherein the pressure space (35) of the hydraulic unit (12) is connected to a hydraulic accumulator (260, 280, 423), and pressure fluid can be displaced from the pressure space (35) into the hydraulic accumulator (260, 280) as a function of the operating state.

38. The drive device as claimed in claim 37, wherein the hydraulic accumulator (260) is a piston accumulator and has an accumulator piston (261) which is loaded by a spring (264) and which, at a certain pressure, is pressed against a stop against the force of the spring (264).

39. The drive device as claimed in claim 37 further comprising a valve (281, 475) arranged in a fluid connection between the hydraulic accumulator (280, 423) and the pressure space (35), with which valve (281, 475) the fluid connection can be shut off.

40. The drive device as claimed in claim 39, wherein the valve (281) is actuate electrically and is operated at the same time as the release of an electromagnetically actuable clutch (195).

41. The drive device as claimed in claim 1, wherein the large piston (36) is formed as a diaphragm piston with a diaphragm (290).

42. The drive device as claimed in claim 41, wherein the diaphragm (290) is of elastic construction end forms the coupling device with which the intermediate part (287) and the large piston (36) are coupled to one another in a fixed position for the regulating movement.

43. The drive device as claimed in claim 1, wherein the power transmission mean (12) is constructed to be double-acting, and at least the large piston (36) is constructed so as to be double-acting.

44. The drive device as claimed in claim 43, wherein the intermediate part (317) of the hydraulic unit (12) is locked against a displacement relative to the fixed frame by friction grip with the fixed frame, the friction grip is produced by hydraulically applying pressure to a friction-grip partner (92), and wherein the application of pressure is effected in each case from a pressure apace (35) under pressure, a further pressure space (35) being shut off toward the friction-grip partner (92) acted upon.

45. The drive device as claimed in claim 43, further comprising at least one spring (324, 461, 462) supported between the large piston (36) and the intermediate part (317, 437) and wherein the large piston or the intermediate part (36, 317, 437) is loaded in the direction of a center position relative to the other part by the at least one spring (324, 461, 462).

46. The drive device as claimed in claim 43, further comprising a coupling device (180, 195) arranged between the small piston (334) and the large piston (36) or the intermediate part (437), the coupling device having a clutch part (203, 457) which is loaded in the direction of a shoulder (342, 456) of the small piston (334) by a spring (344, 459) supported on the small piston (334).

47. The drive device as claimed in claim 32, wherein the one end of the screw spindle (25) is mounted in a radial bearing (270) which, if a radial force exceeds a limit force, is radially adjustable relative to a guide bush (274) serving for the longitudinal guidance of the screw spindle (25).

48. The drive device as claimed in claim 6, wherein the coupling device (180), which couples the drive element (25, 253) or the small piston (33 ) as a first coupled part with the intermediate part (437) or the large piston (36) as a second coupled part, is a hydraulic clutch (180) having a clutch space (426, 467) between the two parts that are to be coupled to one another, wherein pressure fluid, during the regulating movement, is trapped in the clutch space (426, 467) between the two parts coupled to one another an is displaced from the clutch space (426, 467) for moving the two parts relative to one another, end wherein for the regulating movement, the clutch space (426, 467) is connectable to a high-pressure accumulator (425) via a directional control valve (428, 475).

49. The drive device as claimed in claim 48, wherein for moving the two parts (23, 253, 36, 437), which are to be coupled to one another, the clutch space (426, 467) is connectable to a low-pressure accumulator (423) via the directional control valve (428).

50. The drive device as claimed in claim 1, wherein the power transmission means (12) is constructed to be double-acting and has a double-acting large piston (36) with a piston collar (319) adjoining a first large pressure chamber (321) and a second large pressure chamber (320), wherein the small piston (334) has a first piston section (457) adjoining a first small pressure chamber (466, 467) from which pressure fluid can be displaced into the first large pressure chamber (321), and a second piston section (455) which is movable relative to the first piston section (457) and adjoins a second small pressure chamber (464), from which pressure fluid is displaced into the second large pressure chamber (320), wherein the second piston section (455) is carried along by the drive element (25) by positive coupling, the intermediate part (437) accommodating the small piston (334) has a stop (460) for the first piston section (457), from which stop (460) the first piston section (457), in the direction for reducing the first small pressure chamber (466, 467), is carried along by the drive element (25) in a first direction, whereas in the opposite, second direction, after the first piston section (457) bears against the stop (460), the second piston section (455) continues to be moved for reducing the second small pressure chamber (464).

51. The drive device as claimed in claim 8, wherein the coupling device (195) is an electromagnetically actuable clutch which has a coil (198) located on one part (36, 37, 287) and an armature (203) which is held on the other part (28, 228, 253), and wherein when current flows through the coil (198), the other part is held axially on the coil.

52. The drive device as claimed in 8, wherein the coupling device (180) between the drive element or the small piston (28, 334), on the on hand, and the intermediate part (437) or the large piston (36) on the other hand, is a hydraulic clutch, wherein pressure fluid, during the regulating movement, is trapped in a clutch space (186, 467) between the two parts (28, 36, 437) coupled to on another to be displaced from the clutch space (186, 467) for moving the two parts relative to one another.

53. The drive device as claimed in claim 8, wherein the coupling device (180) is a hydraulic slip clutch, end the drive element or the small piston (28) enters a closed-off clutch apace (186), filled with a fluid, of the intermediate part or of the large piston (36) wherein the drive element or the small piston carries, in the region of the clutch space (186), a separating disk (188) separating said clutch space into two clutch sectional spaces, wherein the two clutch sectional spaces are fluidically connected to one another by a valve arrangement (189, 190), and wherein the valve arrangement has two check valves (189, 190) in an antiparallel arrangement.

54. The drive device as claimed in claim 11, wherein the large piston (36) has a clutch space (186), into which the drive element or the small piston (28, 228) extends, and in which the coupling device (180, 195) is located.

55. The drive device as claimed in claim 12, wherein the large piston (36) has a clutch space (186), into which the drive element or the small piston (28, 226) extends, and in which the coupling device (180, 195) is located.

56. The drive device as claimed in claim 38, further comprising a valve (281, 415) arranged in a fluid connection between the hydraulic accumulator (280, 423) and the pressure space (35), with which valve (281, 475) the fluid connection can be shut off.

57. The drive device as claimed in claim 34, wherein the one end of the screw spindle (25) is mounted in a radial bearing (270) which, if a redial force exceeds a limit force, is radially adjustable relative to a guide bush (214) serving for the longitudinal guidance of the screw spindle (25).

58. The drive device as claimed in claim 8, wherein the coupling device (180), which couples the drive element (25, 253) or the small piston (334) as a first coupled part with the intermediate part (437) or the large piston (36) as a second coupled part, is a hydraulic clutch (180) having a clutch space (426, 467) between the two parts that are to be coupled to one another, wherein pressure fluid, during the regulating movement, is trapped in the clutch space (426, 467) between the two parts coupled to one another and is displaced from the clutch space (426, 467) for moving the two parts relative to one another, and wherein for the regulating movement, the clutch space (426, 467) is connectable to a high-pressure accumulator (425) via a directional control valve (428, 475).

* * * * *